(12) United States Patent
Li et al.

(10) Patent No.: US 12,481,186 B2
(45) Date of Patent: Nov. 25, 2025

(54) DISPLAY DEVICE

(71) Applicant: HISENSE VISUAL TECHNOLOGY CO., LTD., Qingdao (CN)

(72) Inventors: Kuibao Li, Qingdao (CN); Hui Zhou, Qingdao (CN); Dengyin Zhang, Qingdao (CN); Jinlong Li, Qingdao (CN); Zhiqiang Xu, Qingdao (CN); Chao Wang, Qingdao (CN); Yingrui Wang, Qingdao (CN); Tianhua Wang, Qingdao (CN); Yuanen Jiang, Qingdao (CN); Xu Cheng, Qingdao (CN); Qingmei Gao, Qingdao (CN); Peili Lei, Qingdao (CN); Haiying Wang, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/805,237

(22) Filed: Aug. 14, 2024

(65) Prior Publication Data

US 2024/0402526 A1    Dec. 5, 2024

Related U.S. Application Data

(63) Continuation of application No. PCT/CN2023/081853, filed on Mar. 16, 2023.

(30) Foreign Application Priority Data

Mar. 21, 2022 (CN) .......................... 202210279174.0
Mar. 21, 2022 (CN) .......................... 202210281470.4
May 31, 2022 (CN) .......................... 202210610379.2

(51) Int. Cl.
*H04R 1/02* (2006.01)
*G02F 1/1333* (2006.01)
(Continued)

(52) U.S. Cl.
CPC .. *G02F 1/133317* (2021.01); *G02F 1/133603* (2013.01); *G02F 1/133606* (2013.01);
(Continued)

(58) Field of Classification Search
CPC ......... G02F 1/133317; G02F 1/133603; G02F 1/133606; G02F 1/133608; G02F 1/1339;
(Continued)

(56) References Cited

U.S. PATENT DOCUMENTS

2010/0119101 A1    5/2010   Fratti
2018/0317000 A1*  11/2018   Ham ...................... H04R 1/025
2021/0345028 A1*  11/2021   Kim ...................... H04N 5/642

FOREIGN PATENT DOCUMENTS

CN    1633825 A     6/2005
CN    108806556 A   11/2018
(Continued)

OTHER PUBLICATIONS

The World Intellectual Property Organization (WIPO) International Search Report for PCT/CN2023/081853 Jul. 14, 2023 6 Pages (including translation).

*Primary Examiner* — Donald L Raleigh
(74) *Attorney, Agent, or Firm* — ANOVA LAW GROUP, PLLC

(57) ABSTRACT

A display apparatus includes a liquid crystal display panel and a backlight module, a first sealed air cavity formed inside the liquid crystal display panel, and the backlight module being located on one side of the liquid crystal display panel and forming a second sealed air cavity with the liquid crystal display panel; and a sound-emitting board and a sound-emitting exciter, the sound producing board being fixed to the surface of the backlight module far away from the liquid crystal display panel, and a vibration output terminal of the sound-emitting exciter being fixed to the
(Continued)

surface of the sound-emitting board far away from the backlight module.

20 Claims, 35 Drawing Sheets

(51) Int. Cl.
*G02F 1/13357* (2006.01)
*G02F 1/1339* (2006.01)
*H04R 1/28* (2006.01)
*H04R 9/06* (2006.01)

(52) U.S. Cl.
CPC ...... *G02F 1/133608* (2013.01); *G02F 1/1339* (2013.01); *H04R 1/025* (2013.01); *H04R 1/028* (2013.01); *H04R 1/2896* (2013.01); *H04R 9/06* (2013.01); *H04R 9/066* (2013.01); *H04R 2499/15* (2013.01)

(58) Field of Classification Search
CPC ......... G02F 1/133394; G02F 1/133314; G02F 1/133308; G02F 1/1333; G02F 1/1336; H04R 1/025; H04R 1/028; H04R 1/2896; H04R 9/06; H04R 9/066; H04R 2499/15; H04R 1/20; H04R 7/045; H04N 5/642; H04N 5/64; G09F 9/35
See application file for complete search history.

(56) References Cited

FOREIGN PATENT DOCUMENTS

| | | | |
|---|---|---|---|
| CN | 208314412 U | 1/2019 |
| CN | 109326236 A | 2/2019 |
| CN | 112601166 A | 4/2021 |
| CN | 112771836 A | 5/2021 |
| CN | 215268711 U | 12/2021 |
| CN | 113973251 A | 1/2022 |
| CN | 114143674 A | 3/2022 |
| CN | 215956626 U | 3/2022 |
| CN | 217467423 U | 9/2022 |
| CN | 115145074 A | 10/2022 |
| CN | 115145075 A | 10/2022 |
| KR | 20190018784 A | 2/2019 |

* cited by examiner

DISPLAY DEVICE

CROSS REFERENCE TO RELATED APPLICATIONS

The disclosure is a continuation of International Application No. PCT/CN2023/081853, filed on Mar. 16, 2023, which claims the priority to Chinese Patent Application No. 202210279174.0 filed on Mar. 21, 2022, Chinese Patent Application No. 202210281470.4 filed on Mar. 21, 2022 and Chinese Patent Application No. 202210610379.2 filed on May 31, 2022, which are incorporated herein in their entireties by reference.

TECHNICAL FIELD

The disclosure relates to the technical field of display, in particular to a display apparatus.

BACKGROUND

A speaker of a display apparatus, such as a television, is generally small-sized and outputs sound from below or back due to its mounting position and an ultra-thin appearance of the television. As a result, difference in positions of a formed sound image and an image occurs, watch experience is poor, and audio-visual experience of sound-image synchronization cannot be provided.

Theoretically, a flat-panel display apparatus can generate sound waves as long as its display panel can be directly vibrated through a sound-emitting exciter. For example, an organic light-emitting diode (OLED) screen has integrated self-sound-emitting technology, that is, the OLED panel achieves the audio-visual effect of sound-image synchronization by performing a display function, and a sound-emitting function of a speaker diaphragm. However, a liquid crystal display (LCD) panel has numerous independent and stacked layers, and needs a backlight source at its back for uniform illumination. It is impossible to mount the sound-emitting exciter on the panel since illumination of the backlight source cannot be blocked, and vibration cannot be effectively transmitted to the LCD panel due to a large distance between the backlight sources and the display panel. These bottleneck problems have led to the lack of a solution for LCD panels to emit sound.

SUMMARY

The disclosure provides a display apparatus. The display apparatus includes: a liquid crystal display panel and a backlight module; where a first sealed air cavity is formed in the liquid crystal display panel, and the backlight module is located at a side of the liquid crystal display panel and forms a second sealed air cavity with the liquid crystal display panel; and a sound-emitting board and a sound-emitting exciter; where the sound-emitting board is fixed to a surface, far away from the liquid crystal display panel, of the backlight module; a vibration output terminal of the sound-emitting exciter is fixed to a surface, far away from the backlight module, of the sound-emitting board; and the sound-emitting exciter is configured to excite, through the vibration output terminal, the sound-emitting board to vibrate to drive the backlight module to vibrate.

DETAILED DESCRIPTION

In order to make objectives and implementation modes of the disclosure clearer, illustrative implementations of the disclosure will be described clearly and completely below with reference to accompanying drawings in illustrative embodiments of the disclosure. Apparently, the described illustrative embodiments are merely some embodiments rather than all embodiments of the disclosure.

It should be noted that brief description of terms in the disclosure is merely used for conveniently understanding the implementations described below, but is not intended to limit the implementations of the disclosure. Unless otherwise specified, these terms should be understood according to ordinary and usual meanings thereof.

Figure 1:
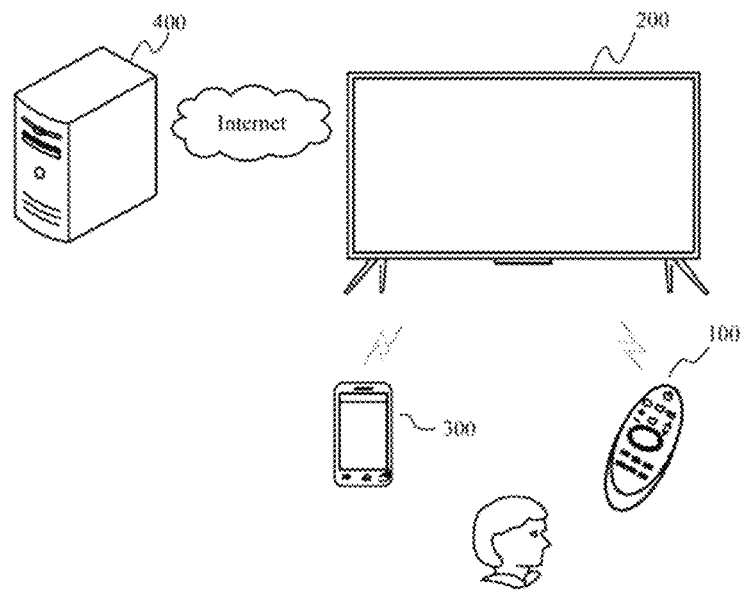
FIG. 1 is a schematic diagram of an operation scenario between a display apparatus and a control device according to some embodiments of the disclosure.
Figure 2:
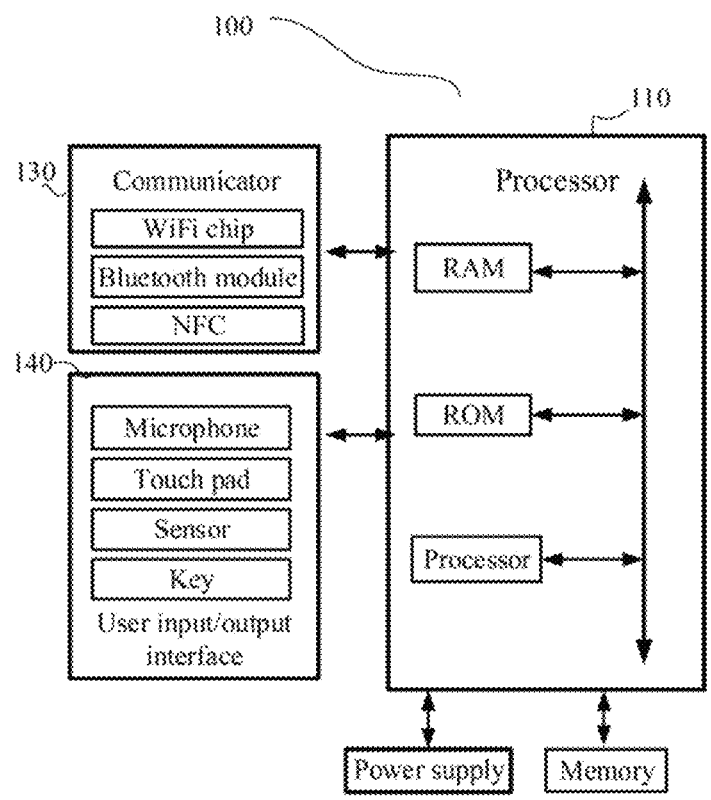
FIG. 2 is a block diagram of configuration of a control device according to some embodiments of the disclosure.

A display apparatus according to the implementation of the disclosure may have various implementation forms, for example, a television, a smart television, a monitor, an electronic bulletin board and an electronic table, etc. FIGS. 1 and 2 are specific implementations of a display apparatus of the disclosure.

FIG. 1 is a schematic diagram of an operation scenario between a display apparatus and a control device according to some embodiments of the disclosure. As shown in FIG. 1, a user may operate the display apparatus 200 through a smart device 300 or the control device 100.

In some embodiments, the control device 100 may be a remote control, and communication between the remote control and the display apparatus 200 includes infrared protocol communication or Bluetooth protocol communication, and other short-distance communication modes. The display apparatus 200 is controlled in a wireless or wired mode. The user may control the display apparatus 200 by inputting a user command through keys on the remote controller, voice input, control panel input, etc.

In some embodiments, the display apparatus 200 may be further controlled with the smart device 300 (such as a mobile terminal, a tablet computer, a computer and a notebook computer). For example, the display apparatus 200 is controlled with an application running on the smart device.

In some embodiments, the display apparatus 200 may receive user control through a touch, a gesture, etc., instead of receiving the command through the smart device or the control device described above.

In some embodiments, the display apparatus 200 may further be controlled in a mode besides the control device 100 and the smart device 300, for example, by directly receiving voice command control from the user through a voice command obtainment module configured inside the display apparatus 200, or by receiving voice command control from the user through a voice control device configured outside the display apparatus 200.

In some embodiments, the display apparatus 200 further communicates data with a server 400. The display apparatus 200 may be allowed to communicate through a local area network (LAN), a wireless local area network (WLAN) and other networks. The server 400 may provide all types of contents and interactions for the display apparatus 200.

FIG. 2 is a block diagram of configuration of a control device according to some embodiments of the disclosure. As shown in FIG. 2, the control device 100 includes a processor 110, a communicator 130, a user input/output interface 140, a memory and a power supply. The control device 100 may receive an operation command input by the user. The communicator 130 is in a communication connection to the display apparatus. The control device 100 converts the operation command into a recognizable instruction to which the display apparatus 200 may respond, to play an interactive intermediary role between the user and the display apparatus 200.

Figure 3:
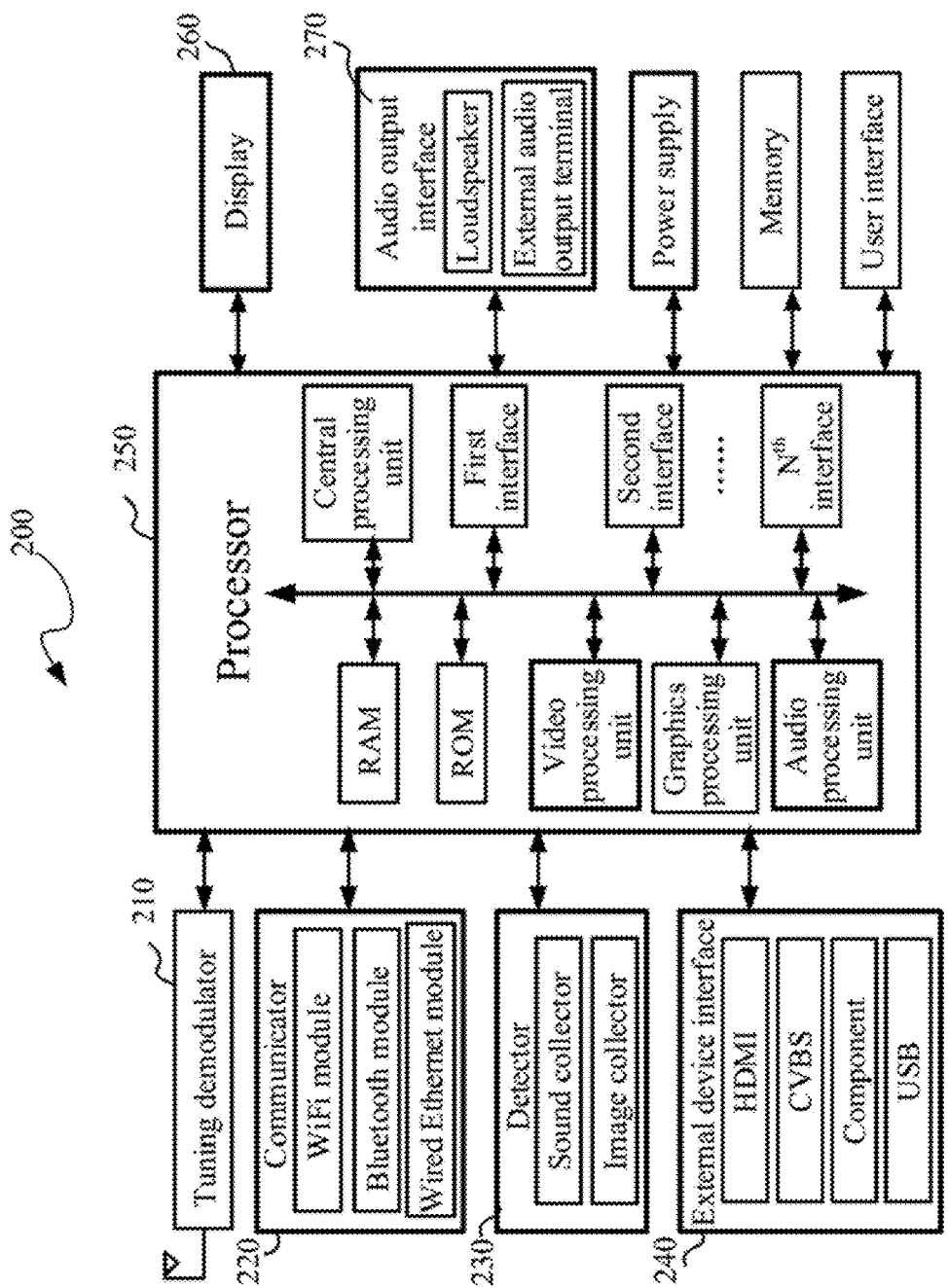
FIG. 3 is a block diagram of configuration of a display apparatus according to some embodiments of the disclosure.

FIG. 3 is a block diagram of configuration of a display apparatus according to some embodiments of the disclosure. As shown in FIG. 3, the display apparatus 200 includes at least one of a tuning demodulator 210, a communicator 220, a detector 230, an external device interface 240, a processor 250, a display 260, an audio output interface 270, a memory, a power supply, and a user interface.

In some embodiments, the processor(s) 250 includes a central processing unit, a video processing unit, an audio processing unit, a graphics processing unit, a random-access memory (RAM), a read-only memory (ROM), and a first interface to an $n^{th}$ interface for input/output.

The display 260 is configured to display an interface and includes a display component for displaying a picture, and a drive component for driving an image to be displayed, a component for receiving an image signal output by the controller, displaying video contents, image contents and a menu manipulation interface, and a manipulation user interface (UI).

The communicator 220 is a component for communicating with an external device or a server according to various types of communication protocols. For example, the communicator may include at least one of a WiFi module, a Bluetooth module, a wired Ethernet module and other network communication protocol chips or near-field communication protocol, as well as an infrared receiver. The display apparatus 200 may be in a communication connection to the control device 100 or the server 400 through the communicator 220, that is, establishing transmission and reception of a control signal and a data signal.

The user interface may be configured to receive the control signal of the control device 100 (such as an infrared remote control).

The detector 230 may be configured to collect signals of an external environment or interaction with the outside. For example, the detector 230 includes an optical receiver, a sensor for collecting an ambient light intensity. Alternatively, the detector 230 includes an image collector, such as a camera, which may be configured to collect an external environment scenario, an attribute of the user or an interaction gesture of the user. Alternatively, the detector 230 includes a sound collector, such as a microphone, for receiving external sounds.

The external device interface 240 may include, but is not limited to, one or more of a high-definition multimedia interface (HDMI), an analog or data high-definition component input interface (component), a composite video input interface (CVBS), a universal serial bus (USB) input interface, an RGB port, etc. The external device interface 240 may also be a combined input/output interface formed by the above interfaces.

The tuning demodulator 210 receives a broadcast television signal in a wired or wireless reception mode, and demodulates audio and video signals, such as an electronic program guide (EPG) data signal, from a plurality of wireless or wired broadcast television signals.

In some embodiments, the processor 250 and the tuning demodulator 210 may be located in different split devices, that is, the tuner demodulator 210 may also be located in an external device of a main device of the processor 250, such as an external set-top box.

The processor 250 controls working of the display apparatus and responds to a user operation through various software control programs stored in the memory. The processor 250 controls an overall operation of the display apparatus 200. For example, in response to receiving a user command for selecting an UI object to be displayed on the display 260, the processor 250 may perform an operation related to the object selected according to the user command.

In some embodiments, the processor 250 includes at least one of a central processing unit (CPU), a video processing unit, an audio processing unit, a graphics processing unit (GPU), a RAM, a ROM, a first interface to a $n^{th}$ interface for input/output, and a communication bus.

The user may input the user command on a graphical user interface (GUI) displayed on the display 260, and a user input interface receives the user command from the user through the GUI. Alternatively, the user may input the user command by inputting a specific sound or gesture, and the user input interface identifies the sound or gesture through a sensor, to receive the user command from the user.

Figure 4:
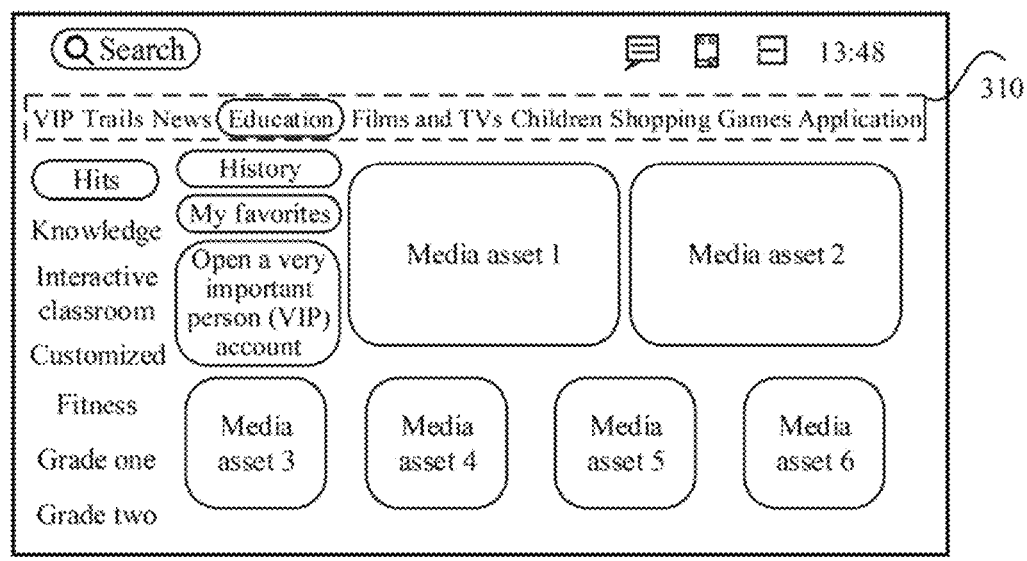
FIG. 4 is a schematic diagram of an interface of a video-on-demand program according to some embodiments of the disclosure.

In some embodiments, after being started, the display apparatus may directly enter an interface of a preset video-on-demand program. As shown in FIG. 4, the interface of the video-on-demand program may at least include a navigation bar 310 and a content display region below the navigation bar 310, and contents displayed in the content display region may change as a selected control in the navigation bar changes. A program in an application layer may be integrated into a video-on-demand program and displayed through a control in the navigation bar, or may be further displayed after an application control in the navigation bar is selected.

In some embodiments, after being started, the display apparatus may directly enter a display interface of a last selected signal source or a signal source selection interface. The signal source may be a preset video-on-demand program, or at least one of an HDMI interface, a live television interface, etc. After the user selects different signal sources, the display may display contents obtained from different signal sources.

Figure 5:
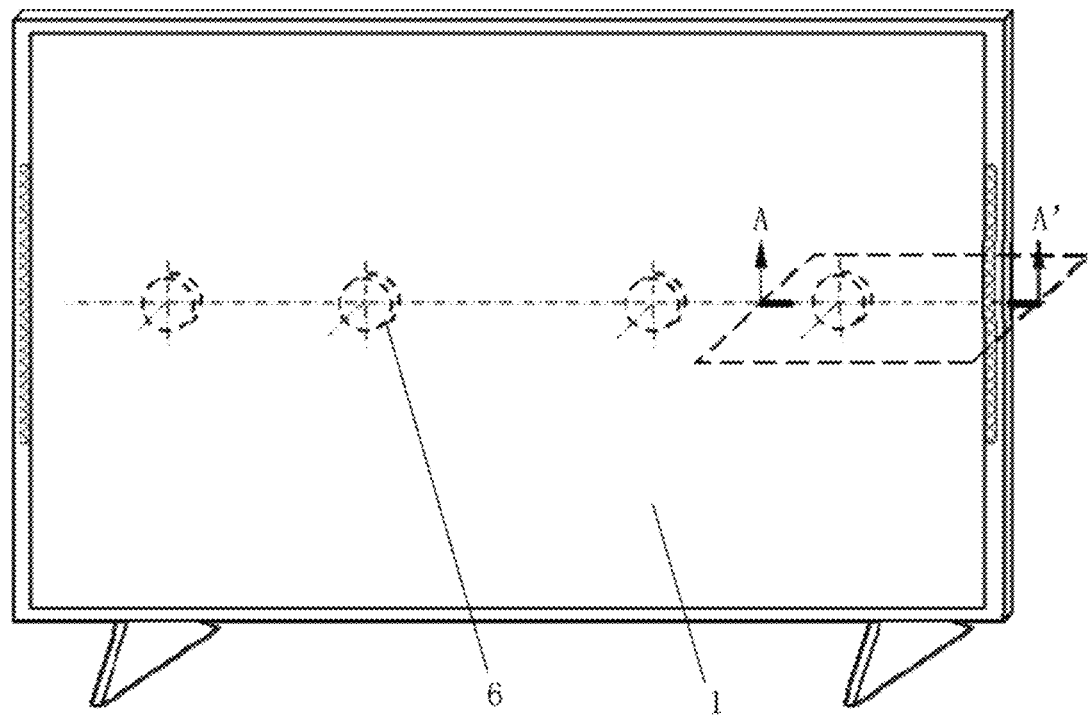
FIG. 5 is a schematic diagram of a three-dimensional structure of a display apparatus according to some embodiments of the disclosure.
Figure 6:
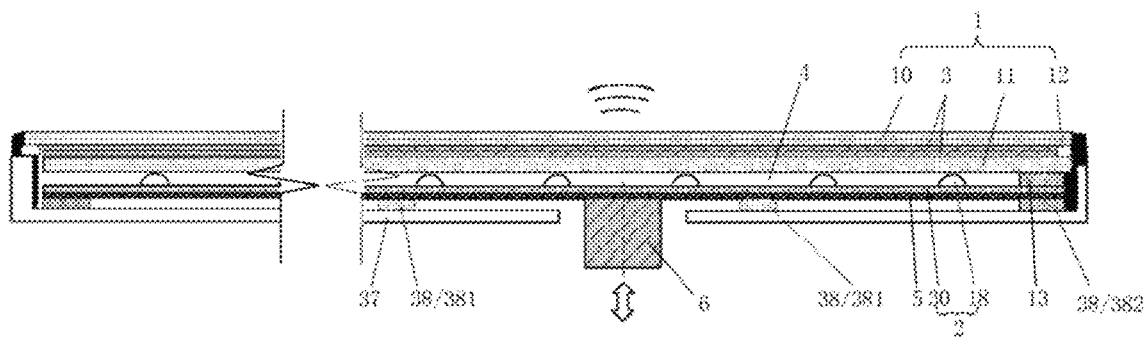
FIG. 6 is a schematic structural diagram of a section in a direction AA' in FIG. 5 according to some embodiments of the disclosure.

FIG. 5 is a schematic diagram of a three-dimensional structure of a display apparatus according to some embodiments of the disclosure. FIG. 6 is a schematic structural diagram of a section in a direction AA' in FIG. 5 according to some embodiments of the disclosure. With reference to FIGS. 5 and 6, the display apparatus includes a liquid crystal display panel 1 and a backlight module 2. A first sealed air cavity 3 is formed in the liquid crystal display panel 1, and the backlight module 2 is located at a side of the liquid crystal display panel 1 and forms a second sealed air cavity 4 with the liquid crystal display panel 1. The display apparatus further includes a sound-emitting board 5 and a sound-emitting exciter 6. The sound-emitting board 5 is fixed to a surface, far away from the liquid crystal display panel 1, of the backlight module 2; a vibration output terminal of the sound-emitting exciter 6 is fixed to a surface, far away from the backlight module 2, of the sound-emitting board 5; and the sound-emitting exciter 6 is configured to excite, through the vibration output terminal, the sound-emitting board 5 to vibrate to drive the backlight module 2 to vibrate.

Specifically, some embodiments of the disclosure provide a liquid crystal display apparatus having a screen of self sound emitting, which belongs to the multimedia technical field of the display apparatus and electro-acoustics. With reference to FIGS. 5 and 6, the first sealed air cavity 3 is formed in the liquid crystal display panel 1, and the backlight module 2 is located at the side of the liquid crystal display panel 1 and forms the second sealed air cavity 4 with the liquid crystal display panel 1. Air in air gaps formed by the first sealed air cavity 3 and the second sealed air cavity 4 is viscous, and has a kinematic viscosity that is several times (for example, 15 times) higher than a kinematic viscosity of water. The sealed air gaps between the liquid crystal display panel 1 and the backlight module 2 and inside the liquid crystal display panel 1 are equivalent to a damping spring. The sound-emitting exciter 6 is configured to excite, through the vibration output terminal, the sound-emitting board 5 to vibrate to drive the backlight module 2 to vibrate. Then, by using the damping spring equivalent to the sealed air gaps, vibration force of the sound-emitting exciter 6 vibrating a backlight board 30 in the backlight module 2 is transmitted to a front panel of the liquid crystal display panel 1 through the equivalent damping spring, such that the liquid crystal display panel 1 vibrates and emits sound. In addition, the sound-emitting exciter 6 is located on the surface, far away from the backlight module 2, of the sound-emitting board 5; and thus an arrangement of the sound-emitting exciter 6 has no influence on display on the display apparatus. In addition, the backlight module 2 includes the backlight board 30 and a light-emitting structure 18 on the backlight board 30. There is a certain distance between a lower surface of the liquid crystal display panel 1 and a top of the light-emitting structure 18, such as a lamp bead, on the backlight board 30. The air gap between the liquid crystal display panel 1 and the backlight board 30 in the backlight module 2 may have the same height as the light-emitting structure 18 or may be slightly higher than the height of the light-emitting structure 18.

Illustratively, the sound-emitting board 5 may be a honeycomb board or a carbon fiber board. In the case that a screen size of the display apparatus is 65 inches and an aluminum honeycomb is used as the sound-emitting board 5, a thickness of the sound-emitting board 5 may be, for example, 1 mm to 4 mm. A core material of the sound-emitting board 5 includes, but is not limited to, paper, aramid fiber, metal or other hard foam materials. A skin material of the sound-emitting board 5 includes, but is not limited to, glass fiber, carbon fiber, glass-carbon mixed fiber, plastic or light aluminum. In addition, the sound-emitting board 5 may also be used as a heat conducting and heat radiating board for the backlight board 30 in the backlight module 2.

Figure 7:
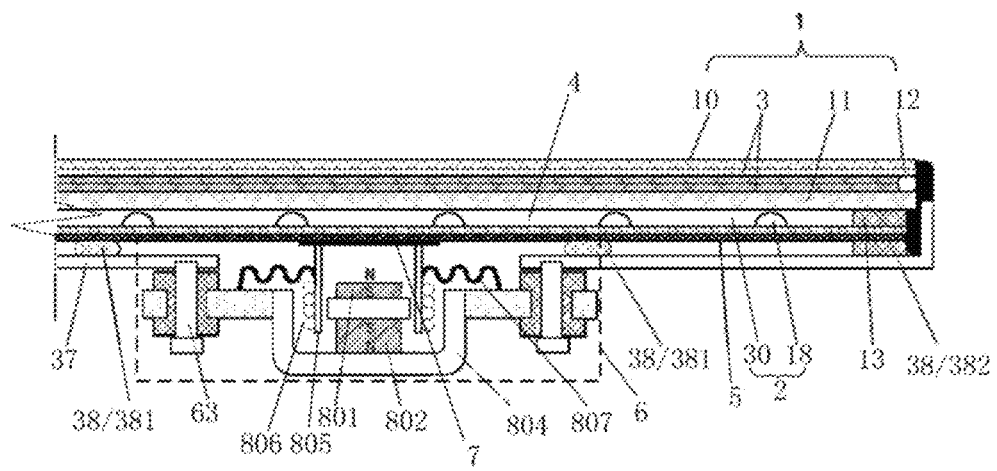
FIG. 7 is another schematic structural diagram of a section of a display apparatus according to some embodiments of the disclosure.
Figure 8:
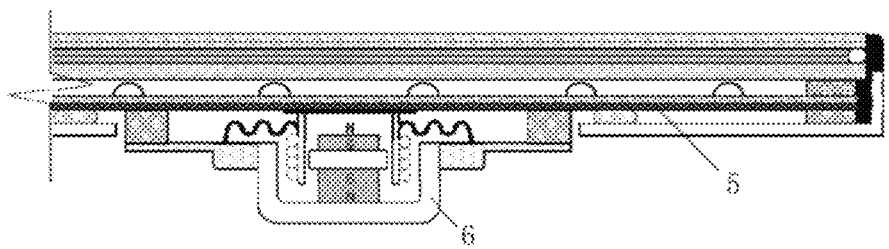
FIG. 8 is yet another schematic structural diagram of a section of a display apparatus according to some embodiments of the disclosure.

FIG. 7 is another schematic structural diagram of a section of a display apparatus according to some embodiments of the disclosure. FIG. 8 is yet another schematic structural diagram of a section of a display apparatus according to some embodiments of the disclosure. With reference to FIGS. 5-8, the sound-emitting exciter 6 may be, for example, an electromagnetic vibration exciter. The sound-emitting exciter 6 includes coil tubes 805 and 806, magnetic field circuits 801, 802 and 804, a damper 807, a buffer pad, etc. The sound-emitting exciter 6 vibrates the sound-emitting board 5 in an inertial drive mode. The inertial drive is implemented by the sound-emitting exciter 6 and its support stabilization structure. A back of the sound-emitting exciter 6 does not need to be additionally supported and fixed during inertial drive. The sound-emitting exciter 6 as a whole vibrates along with the display apparatus.

In some embodiments, the vibration output terminal 7 of the sound-emitting exciter 6 is directly connected to a side of the sound-emitting board 5. A central axis of the sound-emitting exciter 6 is perpendicular to a plane of the sound-emitting board 5. A vibration output direction is along the central axis of the sound-emitting exciter 6 and perpendicular to a surface of the display apparatus, that is, a vertical direction in FIG. 7. Under the action of a magnetic field, electromagnetic force makes a lighter coil tube generate high-frequency resonance, so as to directly vibrate the sound-emitting board 5 and the backlight module 2. Reaction force of the electromagnetic force makes a body of the heavier sound-emitting exciter 6 generate low-frequency resonance, and then vibrates the sound-emitting board 5 and the backlight module 2 through the buffer pad at a fulcrum. The body of the sound-emitting exciter 6 is not fixedly supported, but vibrates along with the vibration of the sound-emitting board 5 and the backlight module 2 that are driven, which is also the biggest difference from an excitation mode that a body of a sound-emitting exciter 6 of an organic light-emitting diode (OLED) screen is fixed on a support.

Figure 9:
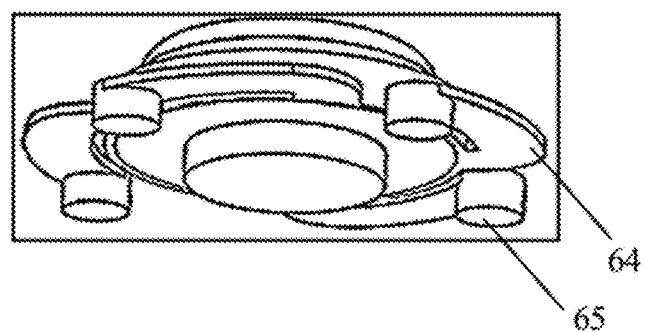
FIG. 9 is a schematic diagram of a three-dimensional structure of a sound-emitting exciter according to some embodiments of the disclosure.
Figure 10:
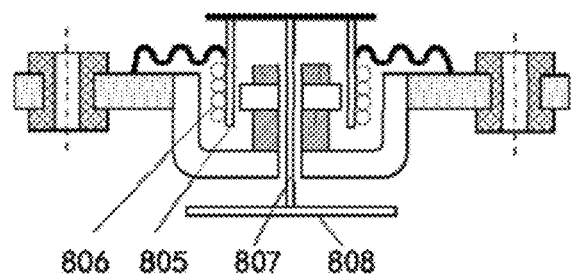
FIG. 10 is a schematic structural diagram of a section of a sound-emitting exciter according to some embodiments of the disclosure.

As shown in FIG. 7, a position of the middle bezel backplane 37 is provided with a fixing pin 63, and the sound-emitting exciter 6 is connected to the fixing pin 63 through an I-shaped silica gel isolation pad. In this way, the sound-emitting exciter 6 may be supported and fixed, through the silica gel isolation pad, in a suspended manner with a certain degree of freedom to move back and forth. Alternatively, as shown in FIG. 8, the sound-emitting exciter 6 may be directly fixed to the sound-emitting board 5. FIG. 9 is a schematic diagram of a three-dimensional structure of a sound-emitting exciter according to some embodiments of the disclosure. With reference to FIGS. 8 and 9, the sound-emitting exciter 6 has three or four flaky elastic support legs 64 that extend away from a center with a low elastic coefficient. The flaky elastic support leg 64 extends circularly or radially away from the center. An end, far away from the center, of the flaky elastic support leg 64 is fixed to the sound-emitting board 5 through a damping block 65; and the damping block 65 may be, for example, a ethyl vinyl acetate (EVA) copolymer with a double-sided tape on a surface. FIG. 10 is a schematic structural diagram of a section of a sound-emitting exciter according to some embodiments of the disclosure. As shown in FIG. 10, the sound-emitting exciter 6 has a guide rod 807 and a diaphragm 808. High-frequency resonance generated on the coil tubes 805 and 806 is transmitted to a back diaphragm 808 through the guide rod 807. In this way, radiation of high-frequency sound waves can be increased and a high-frequency response is enhanced.

It should be noted that besides the electromagnetic vibration exciter described in the embodiments described above, the sound-emitting exciter 6 may also implement excitation vibration in a piezoelectric drive mode. Some embodiments of the disclosure do not limit a specific implementation type and structure of the sound-emitting exciter 6, and a specific working principle of the sound-emitting exciter 6 is well known to those skilled in the art, which will not be described herein.

In addition, FIG. 5 merely shows distribution positions of the sound-emitting exciters 6 in the display apparatus illustratively. Some embodiments of the disclosure do not specifically limit the distribution positions of the sound-emitting exciters 6 in the display apparatus, and the distribution positions of the sound-emitting exciters 6 may be specifically set according to a sound-emitting demand of the display apparatus.

Thus, according to some embodiments of the disclosure, the sound-emitting board 5 and the two sealed air cavities with internally viscous air are utilized, such that the sound-emitting exciter 6 can transmit vibration to the front panel of the liquid crystal display panel 1 through the sound-emitting board 5, the backlight module 2, the second sealed air cavity 4 and the first sealed air cavity 3 successively, and the liquid crystal display panel 1 vibrates and emits sound accordingly. Since the vibration output terminal 7 of the sound-emitting exciter 6 is fixed to the surface, far away from the backlight module 2, of the sound-emitting board 5, an arrangement of the sound-emitting exciter 6 has no influence on display on the display apparatus, so that sound emitting of a screen of a traditional liquid crystal display apparatus is made probable, the user is provided with audio-visual experience of sound-image synchronization that sound is emitted from an image, and an industrial bottleneck problem that sound emitting of the liquid crystal display panel is difficult to implement is overcome.

Figure 11:
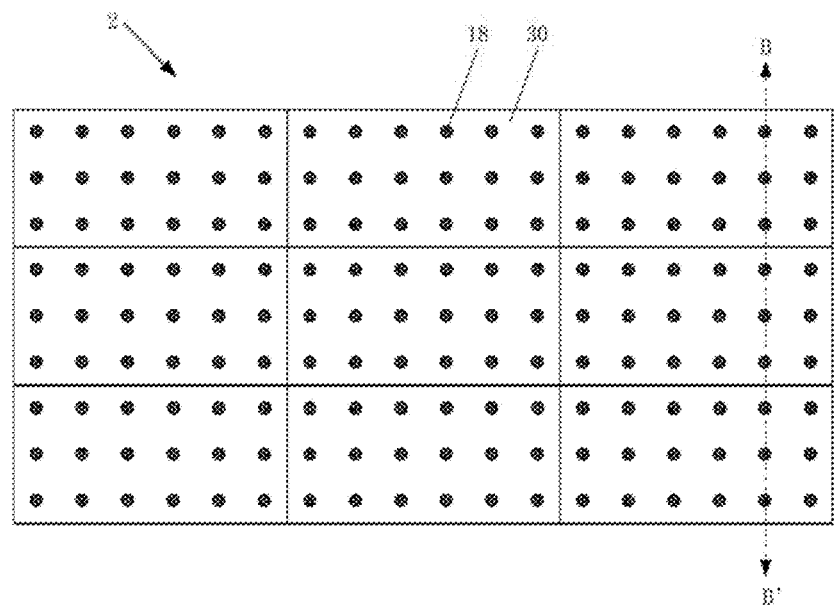
FIG. 11 is a schematic structural diagram of a top view of a backlight module according to some embodiments of the disclosure.
Figure 12:
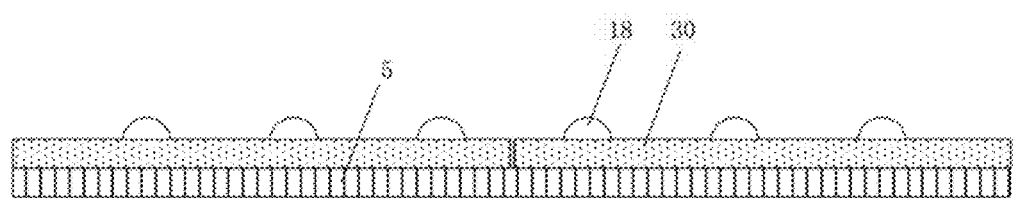
FIG. 12 is a schematic structural diagram of a section in a direction BB' in FIG. 11 according to some embodiments of the disclosure.

In some embodiments, FIG. 11 is a schematic structural diagram of a top view of a backlight module according to some embodiments of the disclosure. FIG. 12 is a schematic structural diagram of a section in a direction BB' in FIG. 11 according to some embodiments of the disclosure. With reference to FIGS. 6-8 and FIGS. 11-12, the sound-emitting board 5 is fixed to the backlight module 2 through a first adhesive buffer structure (not shown in FIG. 12).

In some embodiments, in consideration of a processing yield and cost requirements of the display apparatus, the backlight module 2 in the display apparatus may include a plurality of backlight boards 30. The plurality of backlight boards 30 are uniformly distributed and spliced to form the backlight module 2. Both the sound-emitting board 5 and the backlight board 30 may be set as rectangular flat plates, and the first adhesive buffer structure may be a double-sided tape. The backlight boards 30 are uniformly distributed and attached to the sound-emitting board 5 through the first adhesive buffer structures, and the sound-emitting board 5 causes adjacent backlight boards 30 to be connected to each other, so as to connect all the backlight boards 30 into an entire board. There is a tight seam between the backlight boards 30. In addition, the first adhesive buffer structure further plays a buffer role between the sound-emitting board 5 and the backlight module 2, so as to avoid the case that noise generated by hard collision between the sound-emitting board and the backlight module during vibration affects a display effect of the display apparatus.

In some embodiments, with reference to FIGS. 7 and 8, the vibration output terminal 7 is fixed to the sound-emitting board 5 through the second adhesive buffer structure (not shown in FIGS. 7 and 8). Specifically, the vibration output terminal 7 may also be in direct contact with the sound-emitting board 5, and may also drive the sound-emitting board 5 to vibrate. However, when the sound-emitting exciter 6 vibrates downwards, the vibration output terminal 7 of the sound-emitting exciter gets separated from the sound-emitting board 5, and the liquid crystal display panel 1 may not be excited to emit sound. When the sound-emitting exciter 6 vibrates upwards, the sound-emitting exciter may have a hard collision with the sound-emitting board 5 to generate noise. In some embodiments of the disclosure, the vibration output terminal 7 is fixed to the sound-emitting board 5 through the second adhesive buffer structure, and the second adhesive buffer structure may be, for example, a double-sided tape. In this way, the problem that when the sound-emitting exciter 6 vibrates downwards, the vibration output terminal 7 of the sound-emitting exciter gets separated from the sound-emitting board 5, and the liquid crystal display panel 1 cannot be excited to emit sound, and the problem that when the sound-emitting exciter 6 vibrates upwards, the sound-emitting exciter has a hard collision with the sound-emitting board 5 to generate noise are solved.

Figure 13:
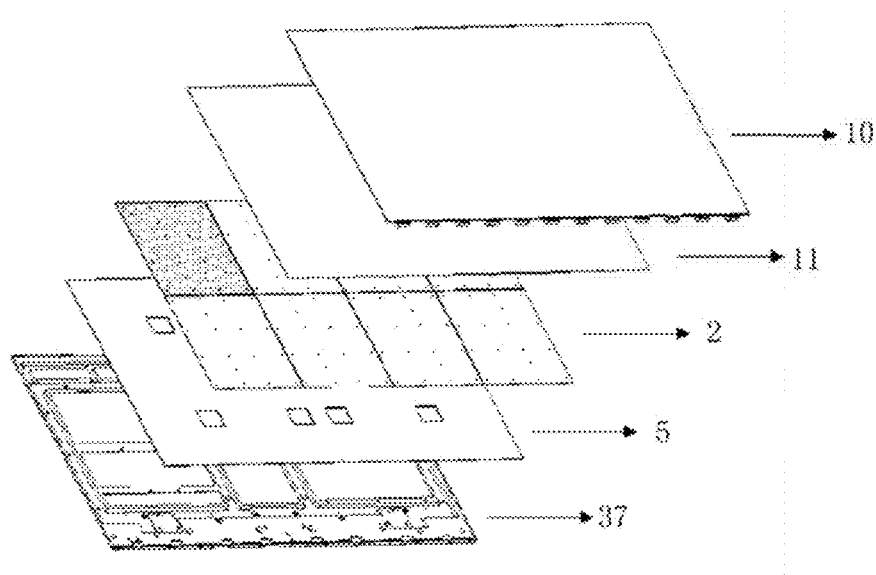
FIG. 13 is a schematic structural diagram of an exploded view of a display apparatus according to some embodiments of the disclosure.

In some embodiments, FIG. 13 is a schematic structural diagram of an exploded view of a display apparatus according to some embodiments of the disclosure. With reference to FIGS. 6-8 and FIG. 13, the liquid crystal display panel 1 includes a liquid crystal film layer 10 and an optical diffusion film layer 11. A first annular sealing structure 12 is arranged at a position that is between the liquid crystal film layer 10 and the optical diffusion film layer 11 and corresponding to a bezel of the liquid crystal display panel 1. The liquid crystal film layer 10 and the optical diffusion film layer 11 form the first sealed air cavity 3 through the first annular sealing structure 12.

In some embodiments, the first annular sealing structure 12 may be, for example, an optical adhesive. The first annular sealing structure 12 makes the air in the air gap of the first sealed air cavity 3 viscous. The sound-emitting exciter 6 is configured to excite, through the vibration output terminal 7, the sound-emitting board 5 to vibrate to drive the backlight module 2 to vibrate. Then, by using a damping spring equivalent to the sealed air gap, vibration force of the sound-emitting exciter 6 vibrating the backlight board 30 in the backlight module 2 is transmitted to the front panel of the liquid crystal display panel 1 through the equivalent damping spring, such that the liquid crystal display panel 1 vibrates and emits sound. Thus, in some embodiments of the disclosure, a fully bonded structure of the liquid crystal display panel 1 is achieved by using the optical adhesive. The optical diffusion film layer 11 may include an optical film and a diffusion plate. A display structure and a corresponding working principle of the liquid crystal display panel 1 are well known to those skilled in the art, and are not repeated herein. The liquid crystal film layer 10, the optical film and the diffusion plate are bonded by the optical adhesive, such that a multi-layer film structure becomes a component, and is equivalent to a single-layer screen. Thus, vibration generated by the sound-emitting exciter 6 can be transmitted to a front of the liquid crystal display panel 1 through the liquid crystal display panel 1 in the fully bonded structure. Illustratively, the diffusion plate is made from materials including but not limited to such as glass, acryl or polycarbonate and other light transparent organic plates.

It should be noted that the optical diffusion film layer 11 may include the optical film and the diffusion plate, and the optical film is located at a side, adjacent to the liquid crystal film layer 10, of the diffusion plate. Illustratively, in FIG. 6, an air cavity is formed between the optical film and the liquid crystal film layer 10; or an air cavity is between the optical film and the diffusion plate; or air cavities are formed between the optical film and the liquid crystal film layer 10, and between the optical film and the diffusion plate. In addition, corresponding to a position of a part of a bezel of the display apparatus, both the optical film and the diffusion plate are arranged in contact with the middle bezel backplane 37. For example, at a position of a right bezel in FIG. 6, both the optical film and the diffusion plate are arranged in contact with the middle bezel backplane 37. At a position of the remaining bezel, the optical film and diffusion plate are suspended relative to the middle bezel backplane 37. For example, at a position of a left bezel in FIG. 6, the optical film and diffusion plate are suspended relative to the middle bezel backplane 37.

Thus, the air cavity described above is in communication with the air cavity between the backlight board 30 and the diffusion plate through the suspended position, such as the position of the left bezel in FIG. 6, so as to form the second sealed air cavity 4 between the backlight module 2 and the liquid crystal display panel 1. Thus, conduction of the sound of the sound-emitting board to a front side of the display panel is implemented, and then sound emitting of the screen is implemented. That is, in this case, the second sealed air cavity 4 includes the air cavity between the backlight board 30 and the diffusion plate, and further includes the air cavity between the optical film and the liquid crystal film layer 10, or the air cavity between the optical film and the diffusion plate.

Alternatively, the air cavity may not be formed between the optical film and the liquid crystal film layer 10 or between the optical film and the diffusion plate, that is, the optical film is in direct contact with the liquid crystal film layer 10, and the optical film is in direct contact with the diffusion plate. In this case, the second sealed air cavity 4 includes the air cavity between the backlight board 30 and the diffusion plate, and further includes the suspended position, such as an air gap at the position of the left bezel in FIG. 6; and the air cavity is in communication with the air gap to form the sealed air cavity.

Figure 14:
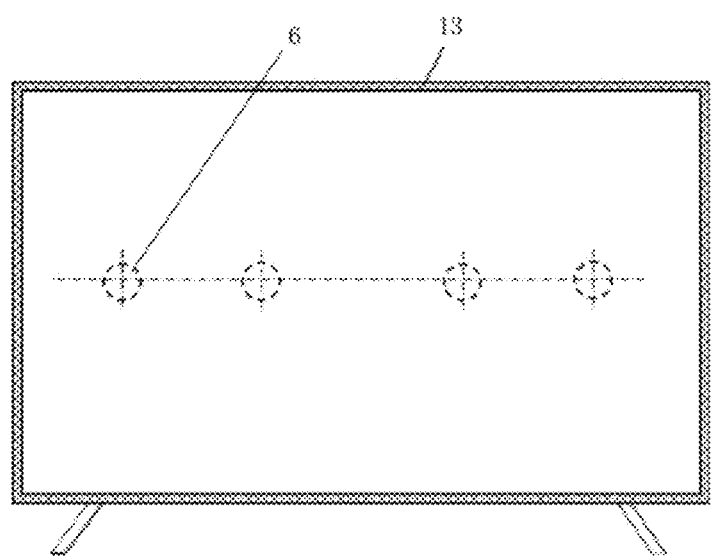
FIG. 14 is yet another schematic diagram of a three-dimensional structure of a display apparatus according to some embodiments of the disclosure.

In some embodiments, FIG. 14 is yet another schematic diagram of a three-dimensional structure of a display apparatus according to some embodiments of the disclosure. With reference to FIGS. 6-8, FIG. 13 and FIG. 14, a second annular sealing structure 13 is arranged at a position between the backlight module 2 and the liquid crystal display panel 1 and corresponding to the bezel of the liquid crystal display panel 1, and the backlight module 2 and the liquid crystal display panel 1 form the second sealed air cavity 4 through the second annular sealing structure 13.

In some embodiments, the second annular sealing structure 13 may be, for example, an optical adhesive. The second annular sealing structure 13 is arranged around the position of the bezel of the liquid crystal display panel 1, and makes the air in the air gap of the second sealed air cavity 4 viscous. The sound-emitting exciter 6 is configured to excite, through the vibration output terminal 7, the sound-emitting board 5 to vibrate to drive the backlight module 2 to vibrate. Then, by using a damping spring equivalent to the sealed air gap, vibration force of the sound-emitting exciter 6 vibrating the backlight board 30 in the backlight module 2 is transmitted to the front panel of the liquid crystal display panel 1 through the equivalent damping spring, such that the liquid crystal display panel 1 vibrates and emits sound. Illustratively, a height of the air gap formed by the second sealed air cavity 4 may be at most 10 mm, for example, 1 mm. In addition, the first annular sealing structure 12 may also be arranged around the position of the bezel of the liquid crystal display panel 1 similar to the second annular sealing structure 13.

Thus, if a stacking structure for sound emitting of display apparatus described in some embodiments of the disclosure, especially an airtight layer between the liquid crystal display panel 1 and the backlight module 2 is circumvented, an effect of coupling vibration to the liquid crystal display panel 1 for sound emitting cannot be achieved or seriously degraded. Similarly, if the fully bonded structure inside the liquid crystal display panel 1 is circumvented, a vibration transmission effect is seriously degraded, and full-band responses at low, medium and high frequencies of the display apparatus are affected.

Figure 15:
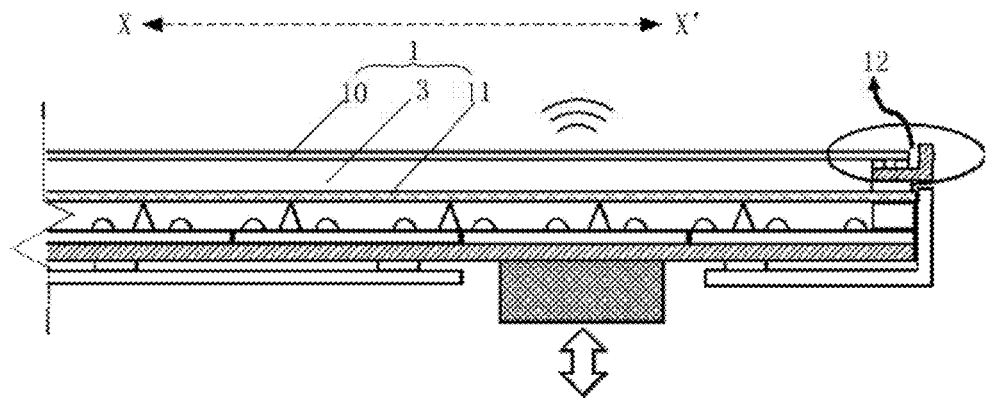
FIG. 15 is yet another schematic structural diagram of a section of a display apparatus according to some embodiments of the disclosure.
Figure 16:
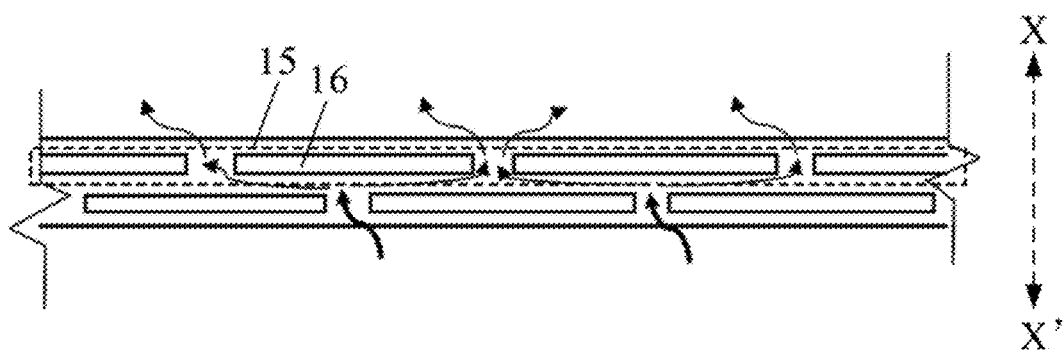
FIG. 16 is a schematic structural diagram of a top view of a low-frequency airflow channel according to some embodiments of the disclosure.

In some embodiments, FIG. 15 is yet another schematic structural diagram of a section of a display apparatus according to some embodiments of the disclosure. FIG. 16 is a schematic structural diagram of a top view of a low-frequency airflow channel according to some embodiments of the disclosure. On the basis of the embodiments described above, with reference to FIGS. 15 and 16, the first annular sealing structure 12 includes a plurality of low-frequency airflow channels. An arrow in FIG. 16 indicates an airflow direction in the low-frequency airflow channel. The low-frequency airflow channel is configured for communication of the first sealed air cavity 3 with an external environment where the display apparatus is located.

Specifically, an air gap between the liquid crystal film layer 10 and the optical diffusion film layer 11 inside the liquid crystal display panel 1 forms the first sealed air cavity 3 by using the first annular sealing structure 12. The vibration of the optical diffusion film layer 11 is transmitted to the liquid crystal film layer 10, a glass cover plate in front of the liquid crystal display panel 1 and the like through the first sealed air cavity 3, so as to cause the liquid crystal display panel 1 to vibrate and emit sound. However, when vibration with a low frequency and a large amplitude is transmitted, the first sealed air cavity 3 is subjected to a large pressure, and squeezes the liquid crystal film layer 10, to cause the liquid crystal film layer 10 to be pressed and deformed, thus leading to the display problem. If vibration energy is reduced or a thickness of the first sealed air cavity 3 is increased, transmission efficiency of the vibration energy can be reduced in turn, and an improvement in a sound frequency is not facilitated.

In some embodiments of the disclosure, the first annular sealing structure 12 includes the plurality of low-frequency airflow channels, and the low-frequency airflow channel is configured for communication of the first sealed air cavity 3 with the external environment where the display apparatus is located. The first annular sealing structure 12 at an edge of the liquid crystal display panel 1 is used for arranging the plurality of low-frequency airflow channels, that is, filtration structures are arranged. An air pressure leaks outwards from the low-frequency airflow channel during low-frequency vibration, and low-frequency sound waves radiate outwards through the low-frequency airflow channel. Thus, the problem that display is affected since the liquid crystal film layer 10 is seriously pressed when the optical diffusion film layer 11 has a large amplitude is avoided, achieving that the low-frequency sound waves are directly output outwards from the low-frequency airflow channels, and improving the efficiency of low-frequency transmission radiation. By arranging the low-frequency airflow channel structure, the low-frequency airflow channel fails in the case of medium-high frequency vibration. However, an amplitude of the optical diffusion film layer 11 is small in the case of high-frequency vibration, and the liquid crystal film layer 10 will not cause display problems due to pressing.

In some embodiments, with reference to FIGS. 15 and 16, along a plane parallel to the liquid crystal display panel 1, the first annular sealing structure 12 includes a plurality of rows of channel forming structures 15 arranged in a first direction XX', one row of the channel forming structures 15 include a plurality of barrier structures 16 spaced by a set distance, and barrier structures 16 in different rows of channel forming structures 15 are staggered. The first direction XX' is perpendicular to an extension direction of the bezel of the liquid crystal display panel 1.

Specifically, for example, an equivalent diameter that is three times a size of an area of a section of the low-frequency airflow channel may be set to be less than or equal to a length of the channel. Under this design, the low-frequency airflow channel may be equivalent to an acoustic device tube. Resonance with a certain frequency is formed when air in the tube vibrates, which may be equivalent to resonance between a compliance device and a mass device, that is, resonance between air elasticity and confined air mass. Thus, the plurality of low-frequency airflow channels have a high-frequency filtration function, that is, high-frequency vibration cannot be transmitted outwards through a pipe. The low-frequency airflow channel is equivalent to channel sealing in the case of a high frequency, so as to ensure sufficient support between the liquid crystal film layer 10 and the optical diffusion film layer 11. The low-frequency airflow channel has no filtering effects in the case of a low frequency, and is equivalent to channel opening in the case of vibration at a low frequency. Illustratively, as shown in FIGS. 15 and 16, the first annular sealing structure 12 includes two rows of channel forming structures 15 arranged in the first direction XX'. Of course, channels with other row number may also be arranged. The number of rows of channel forming structures 15 arranged in the first direction XX' included in the first annular sealing structure 12 is not specifically limited in some embodiments of the disclosure.

Figure 17:
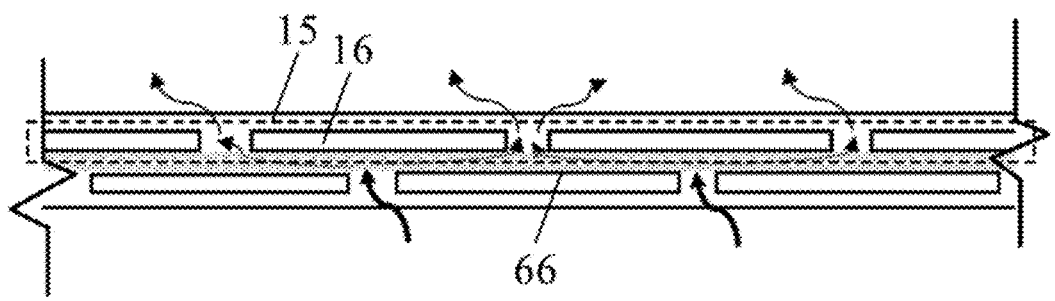
FIG. 17 is another schematic structural diagram of a top view of a low-frequency airflow channel according to some embodiments of the disclosure.

In some embodiments, FIG. 17 is another schematic structural diagram of a top view of a low-frequency airflow channel according to some embodiments of the disclosure. With reference to FIGS. 16 and 17, in order to prevent external dust from entering the display apparatus through the low-frequency airflow channel, a porous damping material 66 is added in the low-frequency airflow channel, so as to further optimize a filtration performance of the low-frequency airflow channel and avoid entrance of foreign matters. Alternatively, a double-layer adhesive tape as shown in FIGS. 15-17 that constitutes the low-frequency airflow channel may be directly replaced with a microporous breathable adhesive tape. Thus, a low-cost filtration solution and a dustproof effect are achieved.

In some embodiments, the backlight module 2 is a Mini-LED backlight module. Specifically, the Mini-LED backlight module is small in size. The Mini-LED backlight module is used as the backlight module 2, such that the air gap between the liquid crystal display panel 1 and the backlight module 2 can be effectively reduced. In addition, air in the air gap is viscous by sealing the peripheries of the liquid crystal display panel 1 and the backlight module 2. The air gap sealed is equivalent to a damping spring between the liquid crystal display panel 1 and the backlight module 2, such that vibration force of the sound-emitting exciter 6 vibrating the backlight module 2 is transmitted, through the damping spring, to the liquid crystal display panel 1 to emit sound.

It should be noted that the backlight module 2 may include a plurality of backlight boards 30, that is, light boards, or a plurality of light bars, which is not specifically limited in some embodiments of the disclosure. The backlight module 2 includes, but is not limited to the Mini-LED backlight module, and other self-luminous structures may be adopted as the backlight module 2. It should be noted that the backlight module 2 may include a plurality of backlight boards 30, that is, light boards, or a plurality of light bars, which is not specifically limited in some embodiments of the disclosure.

Figure 18:
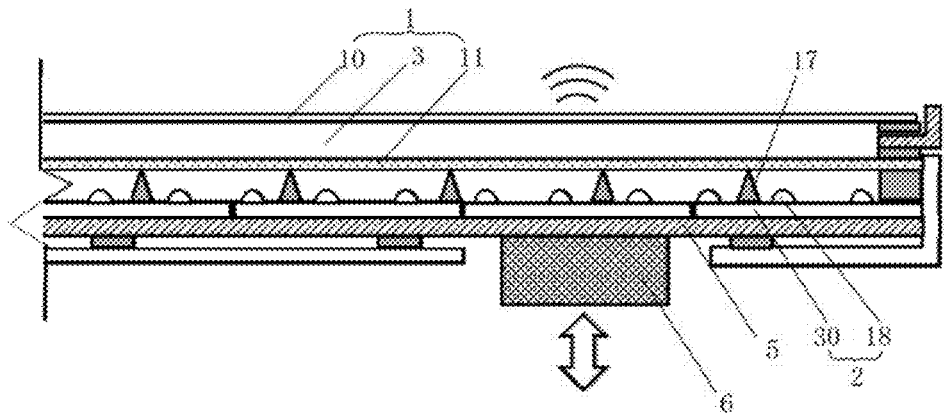
FIG. 18 is yet another schematic structural diagram of a section of a display apparatus according to some embodiments of the disclosure.
Figure 19:
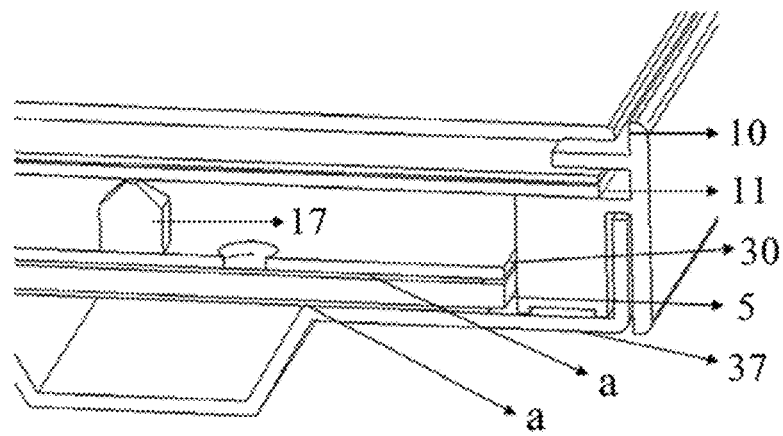
FIG. 19 is yet another schematic diagram of a three-dimensional structure of a display apparatus according to some embodiments of the disclosure.

In some embodiments, FIG. 18 is yet another schematic structural diagram of a section of a display apparatus according to some embodiments of the disclosure. FIG. 19 is yet another schematic diagram of a three-dimensional structure of a display apparatus according to some embodiments of the disclosure. On the basis of the embodiments, with reference to FIGS. 18 and 19, the display apparatus further includes a plurality of elastic support members 17. The elastic support member 17 is arranged between the backlight module 2 and the liquid crystal display panel 1 in an interference manner; a side, adjacent to the liquid crystal display panel 1, of the backlight module 2 includes a plurality of light-emitting structures 18; and the elastic support member 17 is located between the light-emitting structures 18.

Specifically, there are problems in a vibration transmission process of the sound-emitting exciter 6. The thickness of the air gap between the liquid crystal display panel 1 and the backlight module 2 varies greatly due to influence from a material tolerance, an assembly process tolerance, a self-gravity, etc. Thus, consistency of vibration transmission efficiency cannot be guaranteed, and bonding between the liquid crystal display panel 1 and the backlight module 2 leads to vibration noise and abrasion. In order to avoid the risk, the elastic support member 17 is added between the liquid crystal display panel 1 and the backlight module 2 in some embodiments of the disclosure. The elastic support member 17 has features as follows: one side is in contact with the liquid crystal display panel 1, the other side is in contact with the backlight module 2, and one side or both sides are connected to contact positions through a mechanical structure, bonding, or other fixed manners. The elastic support member 17 may be, for example, a high resilience material or a combination of materials with a resilience function, such as silica gel. The elastic support member 17 may ensure a stable size of the air gap between the liquid crystal display panel 1 and the backlight module 2, and avoid noise of abnormal collision between the liquid crystal display panel 1 and the backlight module 2. In addition, the solid elastic support member 17 improves the transmission efficiency of vibration from the backlight module 2 to the liquid crystal display panel 1. In addition, a position a in FIG. 19 may be an adhesive tape.

Specifically, the elastic support member 17 is arranged between the backlight module 2 and the liquid crystal display panel 1 in an interference manner. That is, the combination of two sides of the elastic support member 17 with the liquid crystal display panel 1 and the backlight module 2 is designed in size interference fit. That is, a size of the elastic support member 17 is greater than a design size of a height between the liquid crystal display panel 1 and the backlight module 2.

Figure 20:
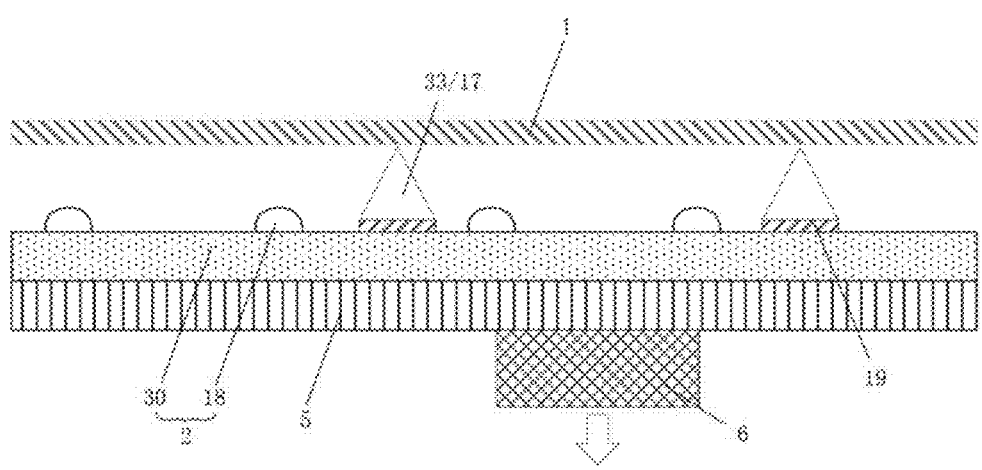
FIG. 20 is yet another schematic structural diagram of a section of a display apparatus according to some embodiments of the disclosure.
Figure 21:
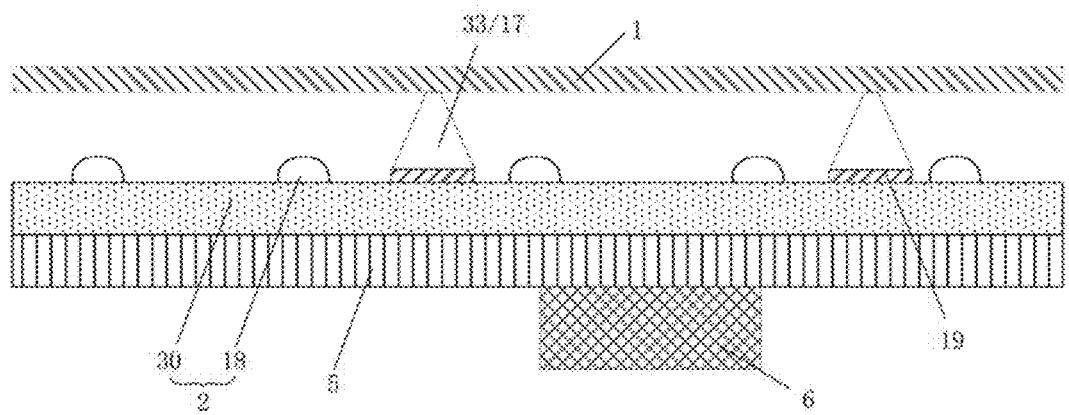
FIG. 21 is yet another schematic structural diagram of a section of a display apparatus according to some embodiments of the disclosure.
Figure 22:
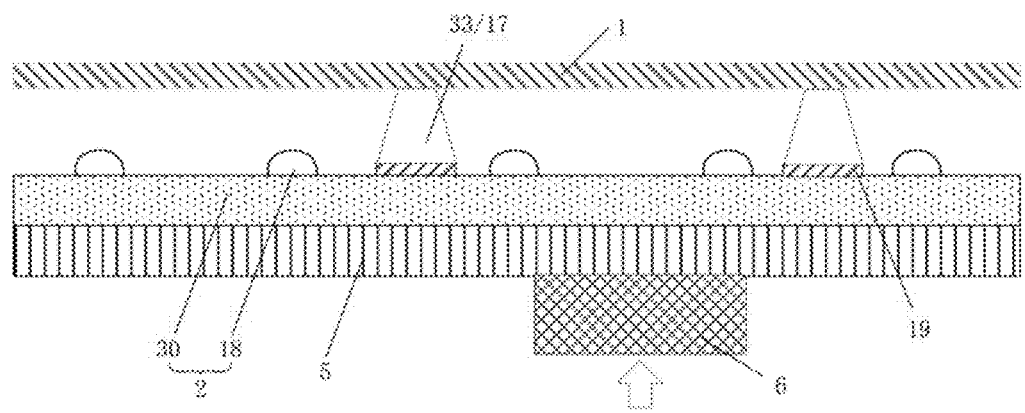
FIG. 22 is yet another schematic structural diagram of a section of a display apparatus according to some embodiments of the disclosure.

FIG. 20 is yet another schematic structural diagram of a section of a display apparatus according to some embodiments of the disclosure, in which when a vibrator of the sound-emitting exciter 6 vibrates backwards, the elastic support member 17 is in a free contact state. FIG. 21 is another schematic structural diagram of a section of a display apparatus according to some embodiments of the disclosure, in which when the sound-emitting exciter 6 does not vibrate and the elastic support member 17 is placed statically, the elastic support member 17 is in an interference compression state due to pressing by the liquid crystal display panel 1 and the backlight module 2. FIG. 22 is another schematic structural diagram of a section of a display apparatus according to some embodiments of the disclosure, in which when the vibrator of the sound-emitting exciter 6 is pushed forwards, the elastic support member 17 is in a further over-pressed state. The size of the elastic support member 17 may be, for example, a distance between the liquid crystal display panel 1 and the backlight module 2 plus a half of a vibration amplitude of the vibrator, and the elastic support member 17 is guaranteed to be in contact with both the liquid crystal display panel 1 and the backlight module 2 in the state shown in FIG. 20. Thus, the transmission efficiency of the vibration from the backlight module 2 to the liquid crystal display panel 1 is improved.

Figure 23:
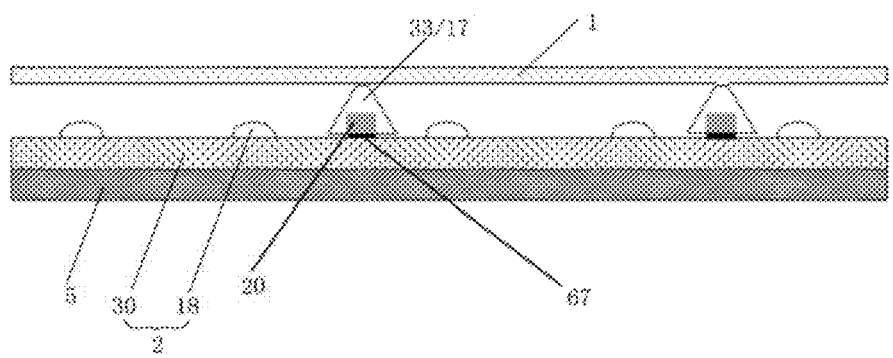
FIG. 23 is yet another schematic structural diagram of a section of a display apparatus according to some embodiments of the disclosure.

In some embodiments, with reference to FIGS. 20-22, the elastic support member 17 may be arranged to be fixed to the backlight module 2 through a first adhesive structure 19. For example, the first adhesive structure 19 is a double-sided tape. Alternatively, FIG. 23 is yet another schematic structural diagram of a section of a display apparatus according to some embodiments of the disclosure. As shown in FIG. 23, a side, adjacent to the backlight module 2, of the elastic support member 17 is provided with a welding structure 20; and the elastic support member 17 is welded and fixed to a position 67 of the backlight module 2 through the welding structure 20. Specifically, a structure made of a weldable metal material may be arranged in the elastic support member 17 in an injection-molded, mechanically matching or bonded manner. The welding structure 20 is fixedly connected to the backlight board 30 of the backlight module 2 through welding, so as to fix the elastic support member 17. In this way, the elastic support member 17 can be firmly mounted, and automatic assembly in batch is facilitated.

In addition, the material of the elastic support member 17 may be an elastic material such as silicone rubber. However, the hardness of the elastic material changes due to temperature influence. A change in an internal temperature during working of the display apparatus may lead to a change in the hardness of the elastic support member 17, thus affecting the support and vibration transmission optimization of the elastic support member 17. As shown in FIG. 23, the optimization may be implemented through two-material compounding. The elastic material part guarantees a vibration buffering effect, and the non-elastic material part, namely the welding structure 20, guarantees that the vibration transmission effect does not change as the temperature changes.

Figure 24:
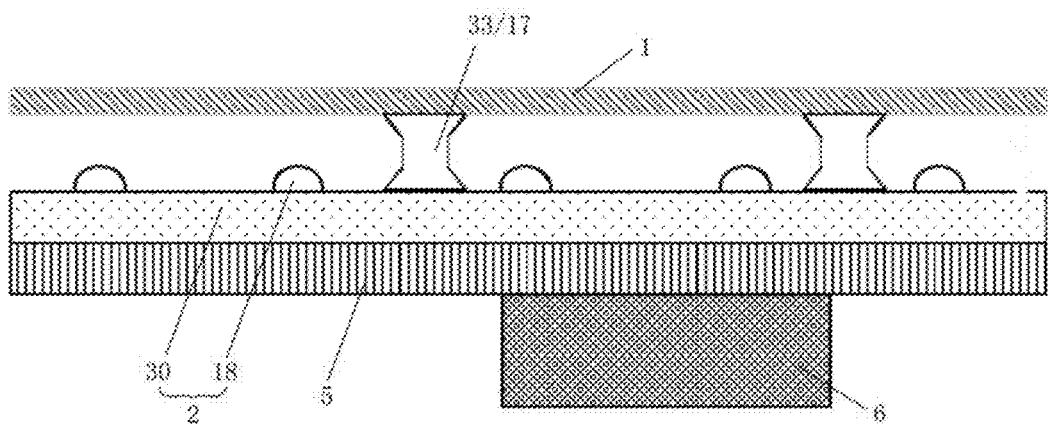
FIG. 24 is yet another schematic structural diagram of a section of a display apparatus according to some embodiments of the disclosure.
Figure 25:
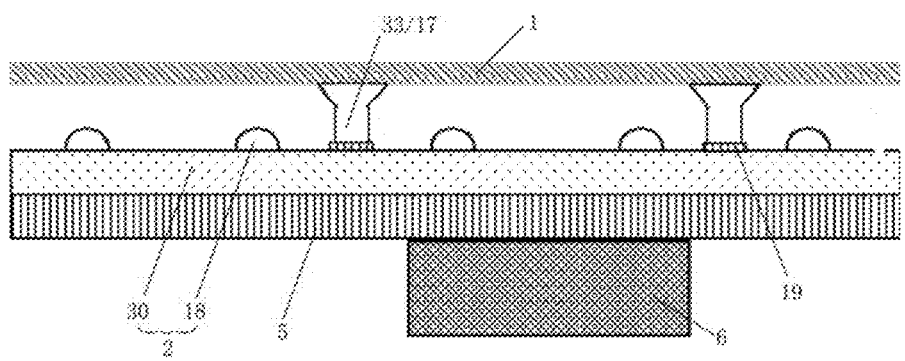
FIG. 25 is yet another schematic structural diagram of a section of a display apparatus according to some embodiments of the disclosure.

In some embodiments, FIG. 24 is yet another schematic structural diagram of a section of a display apparatus according to some embodiments of the disclosure. As shown in FIG. 24, two ends of the elastic support member 17 may be provided with sucker structures, and the elastic support member 17 is fixed to the backlight module 2 and the liquid crystal display panel 1 through the sucker structures at the two ends respectively. FIG. 25 is yet another schematic structural diagram of a section of a display apparatus according to some embodiments of the disclosure. As shown in FIG. 25, one end of the elastic support member 17 may be fixed to the backlight module 2 through a first adhesive structure 19, for example, a double-sided tape; and the other end of the elastic support member 17 is provided with a sucker structure, and the elastic support member 17 is fixed to the liquid crystal display panel 1 through the sucker structure. Thus, the elastic support member 17 may be fixed by double-sided bonding or mechanical structure fixation. In this way, vibration linkage between the backlight module 2 and the liquid crystal display panel 1 is implemented and the vibration transmission efficiency is improved. However, the double-sided bonding or mechanical structure fixation is complicated in the process implementation, and feasibility of the solution can be improved through adsorption of the sucker.

Figure 26:
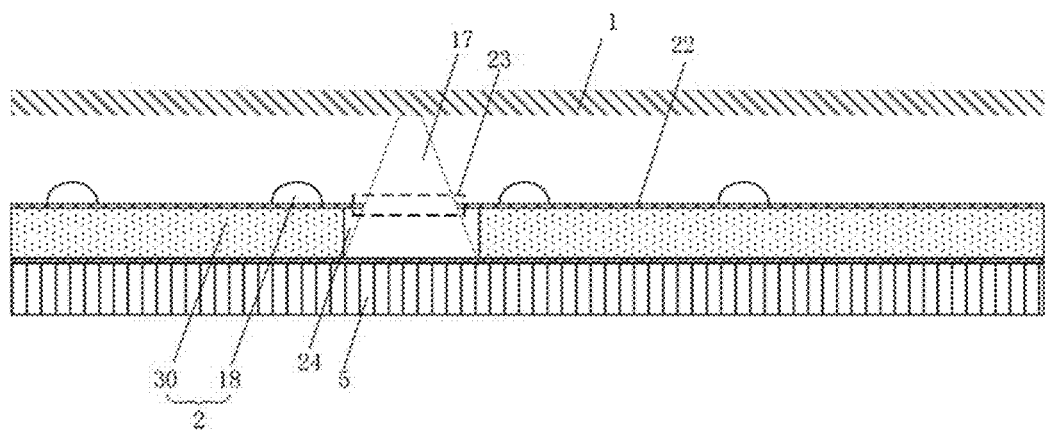
FIG. 26 is yet another schematic structural diagram of a section of a display apparatus according to some embodiments of the disclosure.
Figure 27:
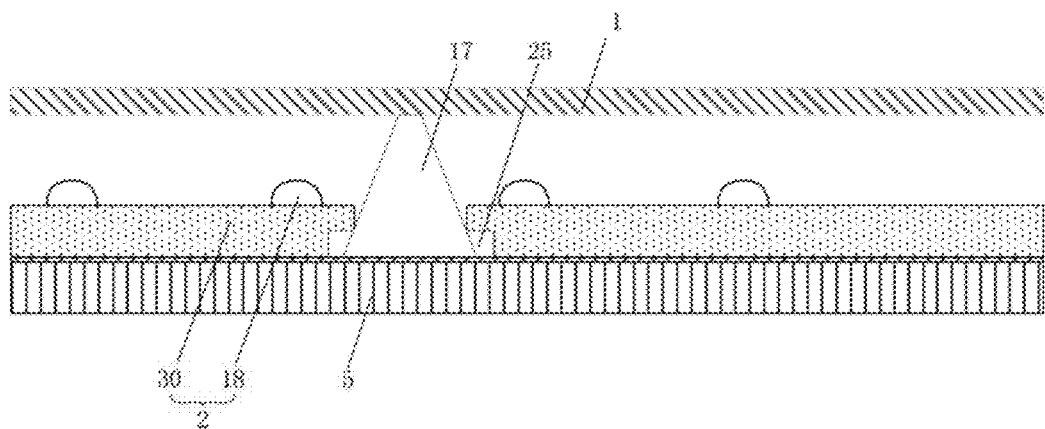
FIG. 27 is yet another schematic structural diagram of a section of a display apparatus according to some embodiments of the disclosure.

In some embodiments, FIG. 26 is yet another schematic structural diagram of a section of a display apparatus according to some embodiments of the disclosure. FIG. 27 is yet another schematic structural diagram of a section of a display apparatus according to some embodiments of the disclosure. With reference to FIGS. 26 and 27, the elastic support member 17 is arranged between the sound-emitting board 5 and the liquid crystal display panel 1 in an interference manner; a side, adjacent to the liquid crystal display panel 1, of the backlight module 2 includes a plurality of light-emitting structures 18; and the elastic support member 17 is located between the light-emitting structures 18.

In some embodiments, as shown in FIG. 26, the side, adjacent to the liquid crystal display panel 1, of the backlight module 2 may be provided with a fixation plate 22; and the fixation plate 22 is provided with a plurality of clamping holes 23. The backlight module 2 is provided with a plurality of through mounting holes 24, and the clamping hole 23 is configured to fix the elastic support member 17 in the through mounting hole 24 and on the sound-emitting board 5. Alternatively, as shown in FIG. 27, the backlight module 2 includes a plurality of countersink holes 25, and the countersink hole 25 is configured to fix the elastic support member 17 on the sound-emitting board 5.

In some embodiments, an adhesive layer between the elastic support member 17 and the backlight module 2 is prone to falling off after long-term vibration, and an assembly process is complicated. In some embodiments of the disclosure, as shown in FIG. 26, the backlight module 2 is provided with a mounting hole 24 at a mounting position of the elastic support member 17. At a bottom of the backlight module 2, a surface of the sound-emitting board 5 is provided with an adhesive layer. A bottom surface of the elastic support member 17 is bonded to the adhesive layer, and a layer of fixation plate 22 is added to a surface of the backlight module 2. The fixation plate 22 is provided with a hole, to make a top end of the elastic support member 17 protrude. An area of a section of a bottom side is greater than an area of a section of a top side of the elastic support member 17, and a corresponding hole size of the fixation plate 22 is smaller than an area of a bottom surface of the elastic support member 17. Thus, the elastic support member 17 is fixed at the position of the backlight module 2 through this structure, and the elastic support member 17 is prevented from falling off. Alternatively, as shown in FIG. 27, the backlight module 2 is additionally provided with the countersink hole 25 at a mounting position of the elastic support member 17, to fix the elastic support member 17 more conveniently. It should be noted that a similar structure may also be used for fixing the elastic support member 17 with reference to an idea of fixing the elastic support member 17 with the structure shown in FIGS. 26 and 27, which is not specifically limited in some embodiments of the disclosure.

Illustratively, with reference to FIGS. 18-27, the elastic support member 17 may be, for example, conical or cylindrical, or may be arranged in a shape similar to a shape shown in FIG. 19. For example, an area of a cross section of a portion, adjacent to the liquid crystal display panel 1, of the elastic support member 17 may be arranged smaller than an area of a cross section of a portion, adjacent to the backlight module 2, of the elastic support member 17.

In addition, the elastic support member 17 is arranged within an illumination range of the light-emitting structure 18 in the backlight module 2. The shape design of the elastic support member 17 needs to consider local bright spots or dark spots caused by light refraction when the light-emitting structure 18 emits light. In order to avoid the local display problem caused by the light refraction, the elastic support member 17 may be placed equidistant from the surrounding four light-emitting structures 18, for example, and adopt a conical or pyramidal tetrahedron design. When the elastic support member 17 is designed as the pyramidal tetrahedron, an off-axis angle of each surface of the elastic support member 17 with respect to a corresponding light-emitting structure 18 may be, for example, the same.

Figure 28:
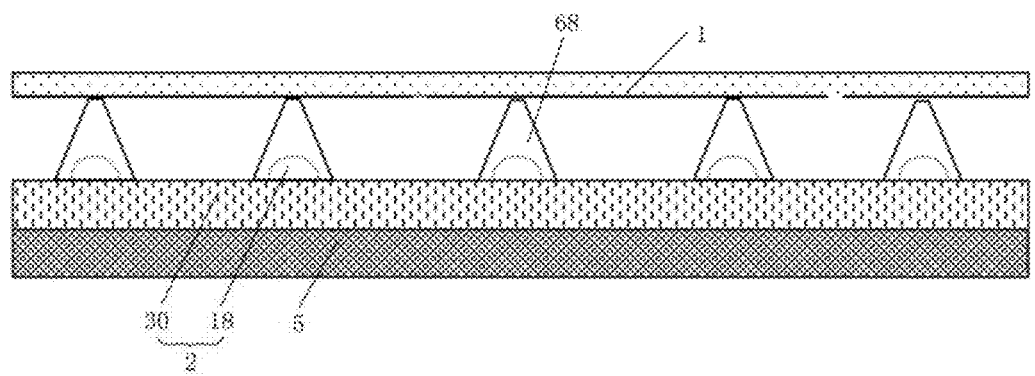
FIG. 28 is yet another schematic structural diagram of a section of a display apparatus according to some embodiments of the disclosure.

In some embodiments, FIG. 28 is yet another schematic structural diagram of a section of a display apparatus according to some embodiments of the disclosure. As shown in FIG. 28, the side, adjacent to the liquid crystal display panel 1, of the backlight module 2 includes the plurality of light-emitting structures 18, and the light-emitting structure 18 may also be covered with a light-guiding elastic support member 68. The light-guiding elastic support member 68 is arranged between the backlight module 2 and the liquid crystal display panel 1 in an interference manner. Specifically, the light-emitting structure 18 is, for example, a Mini-LED, and the light-guiding elastic support member 68 may be achieved by arranging a light-guiding member or a light-guiding glue point at the position of the light-emitting structure 18. In this way, the light-guiding elastic support member 68 may be mounted on the backlight module 2 through welding the light-emitting structure 18 to the backlight board 30 in the backlight module 2, and the assembly efficiency is improved conveniently. In addition, working principles of an interference arrangement, support and sound conduction of the light-guiding elastic support member 68 may be understood with reference to the previous embodiments, which will not described herein.

Figure 29:
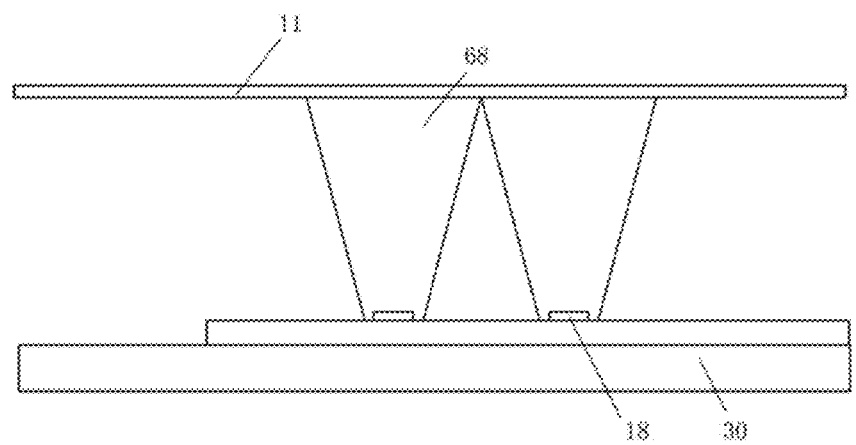
FIG. 29 is yet another schematic structural diagram of a section of a display apparatus according to some embodiments of the disclosure.

FIG. 29 is yet another schematic structural diagram of a section of a display apparatus according to some embodiments of the disclosure. As shown in FIG. 29, a multifunctional elastic diffusion plate support may be set as the light-guiding elastic support member 68, that is, a lens and a diffusion plate support in backlight may be replaced with the light-guiding elastic support member 68. The light-guiding elastic support member 68 can effectively support the liquid crystal display panel 1 by coming into contact with a diffusion plate in the optical diffusion film layer 11, and an area of a cross section of the light-guiding elastic support member 68 gradually increases in a direction far away from the backlight board 30. Thus, an effect of even light of light emitted by the light-emitting structures 18 is achieved, and an uneven light intensity of the light-emitting structures 18 can be evenly distributed. The light-guiding elastic support member 68 may be made of a silica gel material with set transparency. For example, the light-guiding elastic support member 68 may be internally provided with a plurality of bubbles or filled with, for example, silicon dioxide particles for achieving an even light function of the light-guiding elastic support member 68. A distribution density of the bubbles or silica particles may be set to gradually decrease in a direction away from a longitudinal central axis of the light-guiding elastic support member 68. In addition, the light guide elastic support member 68 has a light control effect. In a local dimming display mode, an arrangement of the light guide elastic support member 68 can reduce influence on other light control regions. For example, light interference between different local dimming display regions may be avoided by coating a surface of the light-guiding elastic support member 68 with a reflecting material. Illustratively, the backlight module in the structure shown in FIG. 29 may be a light board or a light bar.

Figure 30:
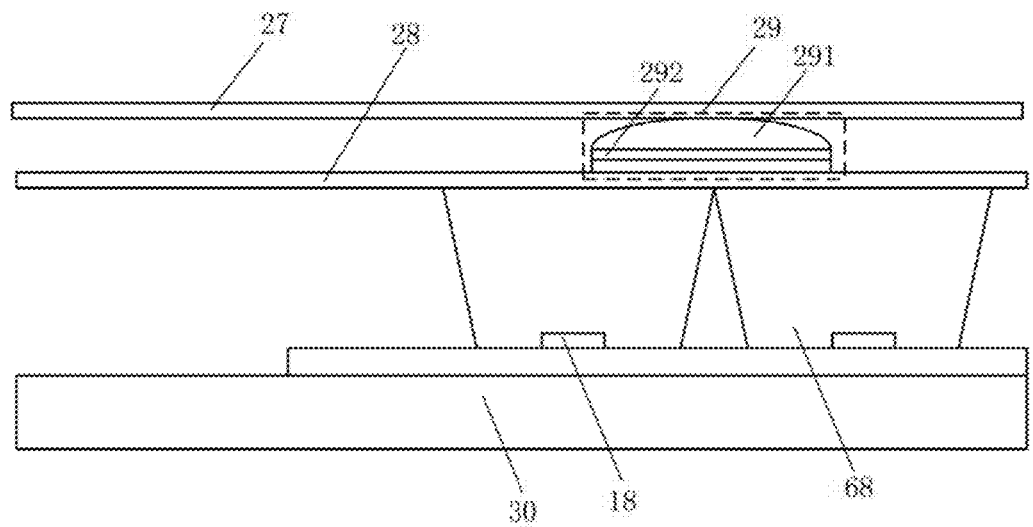
FIG. 30 is yet another schematic structural diagram of a section of a display apparatus according to some embodiments of the disclosure.

In some embodiments, FIG. 30 is yet another schematic structural diagram of a section of a display apparatus according to some embodiments of the disclosure. With reference to FIGS. 6 and 30, the optical diffusion film layer 11 includes the optical film 27 and the diffusion plate 28. The diffusion plate 28 is located at a side, far away from the liquid crystal film layer 10, of the optical film 27. A multifunctional optical adhesive layer 29 is arranged between the optical film 27 and the diffusion plate 28, and the multifunctional optical adhesive layer 29 is arranged corresponding to the light-emitting structure 18.

In some embodiments, the multifunctional optical adhesive layer 29 may include a convex structure 291 protruding in a direction facing away from the backlight board 30, such as a convex lens structure. The convex structure is configured to converge light emitted by the light-emitting structure, and has an effect of reduction of a view angle, thus solving the problem that the view angle is expanded and brightness is reduced after the optical film 27 is bonded to the diffusion plate 28. In addition, by arranging the multifunctional optical adhesive layers 29 in a plurality of local regions between the optical film 27 and the diffusion plate 28, the abrasion problem of the optical film 27 and the diffusion plate 28 can be effectively prevented. In addition, the multifunctional optical adhesive layer 29 may also include a large-angle reflective film 292, that is, a large-angle filtration film. Thus, light incident to the multifunctional optical adhesive layer 29 at a large angle is reflected, an optical barrier is formed between the optical film 27 and the diffusion plate 28, and influence between local dimming dynamic regions is reduced. Illustratively, one local dimming dynamic region may be correspondingly provided with one multifunctional optical adhesive layer 29. The one multifunctional optical adhesive layer 29 may be arranged corresponding to one light-emitting structure 18 or a plurality of light-emitting structures 18.

Figure 31:
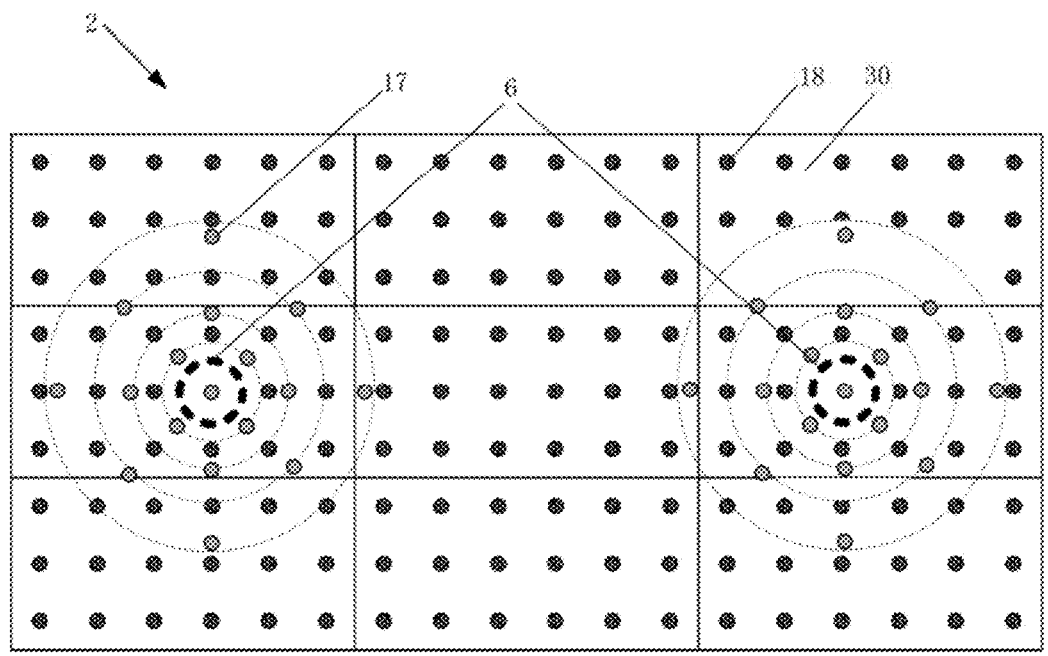
FIG. 31 is a schematic structural diagram of a top view of a display apparatus according to some embodiments of the disclosure.

In some embodiments, FIG. 31 is a schematic structural diagram of a top view of a display apparatus according to some embodiments of the disclosure. As shown in FIG. 31, the elastic support members 17 are distributed in multiple rings with the sound-emitting exciter 6 as a center of a circle. A distribution density of the elastic support members 17 decreases in a direction far away from the sound-emitting exciter 6.

Specifically, a large number of elastic support members 17 mounted increases the assembly difficulty of the process. In view of this, some embodiments of the disclosure put forward an optimization solution of the number of elastic support members 17 on the premise of ensuring vibration buffering and vibration transmission effects. The elastic support members 17 are arranged unevenly according to distances to a mounting position of the sound-emitting exciter 6. At a position where the sound-emitting exciter 6 is located, the vibration is the most violent, and a distribution density of the elastic support members 17 is the largest. At a position far away from the sound-emitting exciter 6, a vibration amplitude is small, and the distribution density of the elastic support members 17 is reduced. In this way, vibration buffering and vibration transmission effects of a region where the entire display apparatus is located are guaranteed even, and the number of the elastic support members 17 is optimized, thus reducing an implementation cost of the display apparatus and the assembly difficulty of the process.

Figure 32:
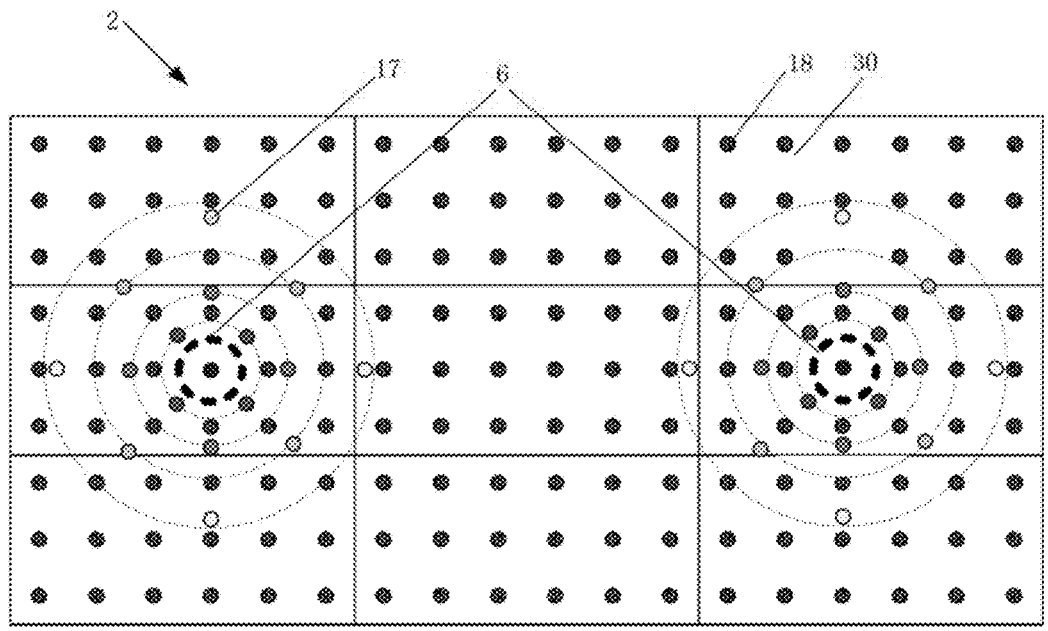
FIG. 32 is another schematic structural diagram of a top view of a display apparatus according to some embodiments of the disclosure.

In some embodiments, FIG. 32 is another schematic structural diagram of a top view of a display apparatus according to some embodiments of the disclosure. As shown in FIG. 32, a supporting strength of the elastic support member 17 decreases in a direction away from the sound-emitting exciter 6; and/or, a height of the elastic support member 17 decreases in a direction away from the sound-emitting exciter 6. In FIG. 32, a difference of the supporting strengths or the heights of the elastic support members 17 is indicated with different degrees of gray scales. The larger the gray scale is, the darker a corresponding filling color is, and the greater the supporting strength or the height of the elastic support member 17 is. The smaller the gray scale is, the lighter a corresponding filling color is, and the smaller the supporting strength or the height of the elastic support member 17 is. Illustratively, the supporting strength of the elastic support member 17 may be merely set as described above, or the height of the elastic support member 17 may be merely set as described above, or both the supporting strength and the height of the elastic support member 17 may be set as described above.

Specifically, elastic support members 17 with different hardnesses or sizes are arranged according to the distances between the elastic support members 17 and a mounting region of the sound-emitting exciter 6, so as to achieve an effect that the supporting strength of the elastic support member 17 is inversely proportional to the distance from the elastic support member 17 to the sound-emitting exciter 6. That is, the smaller the distance to the sound-emitting exciter 6 is, the greater the supporting strength of the elastic support member 17 is. The larger the distance to the sound-emitting exciter 6 is, the smaller the supporting strength of the elastic support members 17 is. Thus, the elastic support members 17 are arranged according to the vibration amplitudes, and evenness of the vibration buffering and vibration transmission effects of the region where the entire display apparatus is located is further optimized. On the other hand, an interference fit degree of the elastic support member 17 may also be adjusted according to a position relative to the sound-emitting exciter 6. That is, the height of the elastic support member 17 at a position close to the sound-emitting exciter 6 is set to be greater than the height of the elastic support member 17 away from the sound-emitting exciter 6. Thus, the vibration transmission efficiency of the position close to the sound-emitting exciter 6 is the highest, and an assembly tolerance of the elastic support member 17 at the position away from the sound-emitting exciter 6 is prevented from causing non-interference fit of the elastic support member 17 at the position close to the sound-emitting exciter 6. That is, upper surfaces and lower surfaces of the elastic support members 17 arranged at various positions corresponding to the region where the display apparatus is located are not separated from the liquid crystal display panel 1 or the backlight module 2 when vibrating, and the vibration transmission efficiency of the elastic support members 17 at various positions is optimized.

Figure 33:
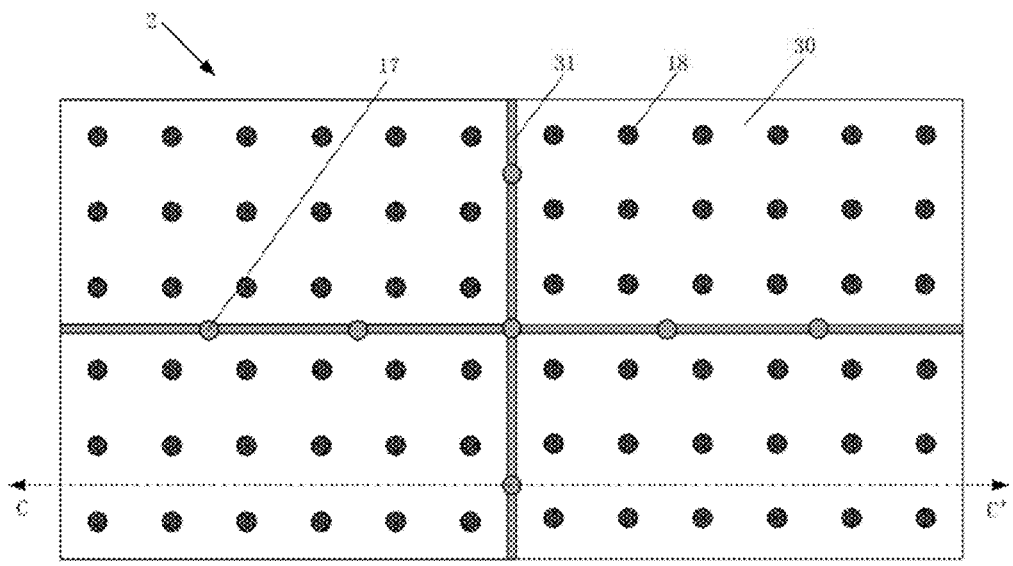
FIG. 33 is yet another schematic structural diagram of a top view of a display apparatus according to some embodiments of the disclosure.
Figure 34:
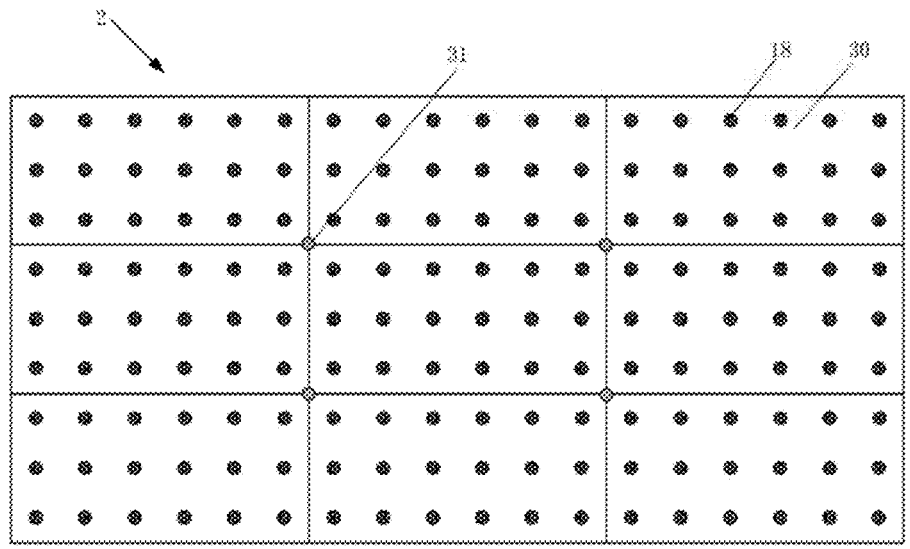
FIG. 34 is yet another schematic structural diagram of a top view of a display apparatus according to some embodiments of the disclosure.
Figure 35:
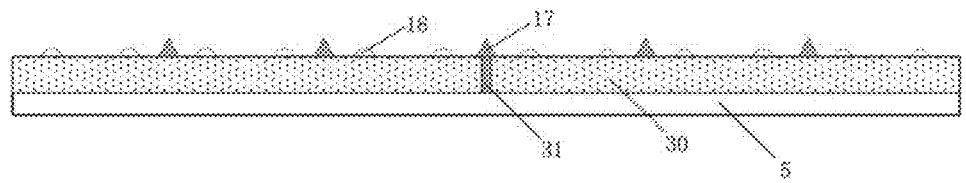
FIG. 35 is a schematic structural diagram of a section in a direction CC' in FIG. 33 according to some embodiments of the disclosure.

In some embodiments, FIG. 33 is yet another schematic structural diagram of a top view of a display apparatus according to some embodiments of the disclosure. FIG. 34 is yet another schematic structural diagram of a top view of a display apparatus according to some embodiments of the disclosure. FIG. 35 is a schematic structural diagram of a section in a direction CC' in FIG. 33 according to some embodiments of the disclosure. With reference to FIGS. 33-35, the backlight module 2 includes a plurality of backlight boards 30, and a first buffer structure 31 is arranged between adjacent backlight boards 30. The first buffer structure 31 is located on the sound-emitting board 5 and is configured to separate the adjacent backlight boards 30.

Specifically, when the plurality of backlight boards 30 are assembled, edges of adjacent backlight boards 30 may overlap, and abnormal vibration noise is likely to occur during vibration. As shown in FIG. 33, in some embodiments of the disclosure, the first buffer structure 31 is arranged between adjacent backlight boards 30, and the first buffer structure 31 is located on the sound-emitting board 5 and configured to separate adjacent backlight boards 30. The first buffer structure 31 is, for example, an elastic colloid structure. The first buffer structure 31 may be mounted, for example, in a gap between the backlight boards 30, thus increasing vibration buffering between the edges of the backlight boards 30, and avoiding abnormal vibration. In addition, as shown in FIG. 34, a joint position between four adjacent backlight boards 30 are also likely to cause vibration noise due to overlapping of the backlight boards 30. For example, the first buffer structure 31 may be arranged at the joint position between the four adjacent backlight boards 30, thus increasing vibration buffering at the joint position of the backlight boards 30 and avoiding abnormal vibration.

In some embodiments, with reference to FIG. 33 and FIG. 35, the first buffer structure 31 may be arranged in a strip shape, and the first buffer structure 31 is configured to connect the plurality of elastic support members 17 into a whole. Specifically, the large number of elastic support members 17 mounted results in the problem of a complicated process. In order to solve this problem, in some embodiments of the disclosure, the elastic support members 17 are connected into a whole through the first buffer structure 31. For example, the first buffer structure 31 may be arranged to be integrally formed with corresponding elastic support members 17, thus effectively reducing mounting difficulty of the elastic support members 17.

Figure 36:
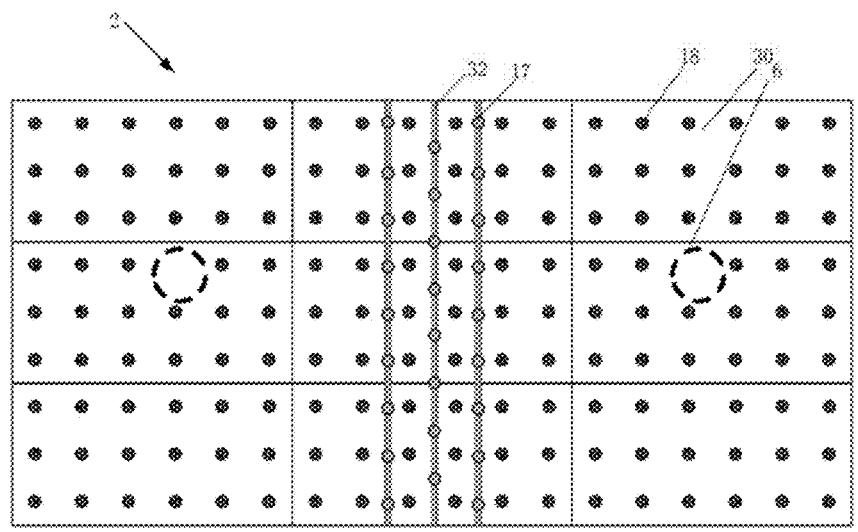
FIG. 36 is yet another schematic structural diagram of a top view of a display apparatus according to some embodiments of the disclosure.
Figure 37:
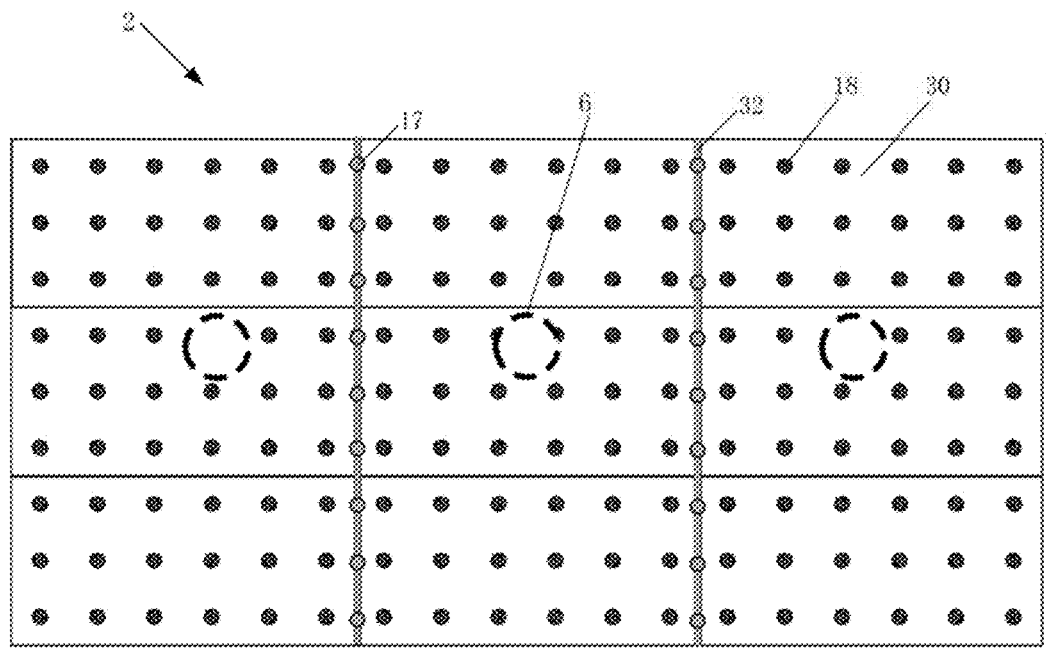
FIG. 37 is yet another schematic structural diagram of a top view of a display apparatus according to some embodiments of the disclosure.

In some embodiments, FIG. 36 is yet another schematic structural diagram of a top view of a display apparatus according to some embodiments of the disclosure. FIG. 37 is yet another schematic structural diagram of a top view of a display apparatus according to some embodiments of the disclosure. With reference to FIG. 36 and FIG. 37, the display apparatus further includes a sound channel isolation structure 32. The sound channel isolation structure 32 is arranged on the backlight module 2 and configured to separate adjacent sound-emitting exciters 6. Specifically, the sound channel isolation structure 32 is, for example, an elastic colloid structure. The sound channel isolation structure 32 is arranged between regions where different sound-emitting exciters 6 are located, that is, between sound channel vibration regions. Thus, voice isolation between sound channels is improved, vibration influence between the sound channel vibration regions is reduced, and a sound-emitting effect of the display apparatus is optimized. In FIG. 36, the sound channel isolation structure 32 is configured to separate left and right sound-emitting exciters 6. In FIG. 37, three sound channel isolation structures 32 are arranged to separate regions where the three sound-emitting exciters 6 are located. Some embodiments of the disclosure may be extended to enhance isolation of more sound channel vibration regions. Illustratively, the sound channel isolation structure 32 may also be implemented by using the first buffer structure 31 described in the embodiments.

In some embodiments, as shown in FIG. 36, a plurality of sound channel isolation structures 32 are arranged between adjacent sound-emitting exciters 6. The sound channel isolation structures 32 are configured to connect the plurality of elastic support members 17 into a whole, and the elastic support members 17 on different sound channel isolation structures 32 are staggered. Specifically, the large number of elastic support members 17 mounted results in the problem of a complicated process. In order to solve this problem, in some embodiments of the disclosure, the elastic support members 17 are connected into a whole through the sound channel isolation structure 32. For example, the sound channel isolation structure 32 may be arranged to be integrally formed with corresponding elastic support members 17, thus effectively reducing the mounting difficulty of the elastic support members 17. In addition, in FIG. 36, three sound channel isolation structures 32 are arranged between adjacent sound-emitting exciters 6, and the elastic support members 17 on the three channel isolation structures 32 are staggered. Thus, the vibration is effectively attenuated through the sound channel isolation structures 32, the sound isolation between channels is further optimized, the vibration influence between the sound channel vibration regions is reduced, and the sound-emitting effect of the display apparatus is optimized.

Figure 38:
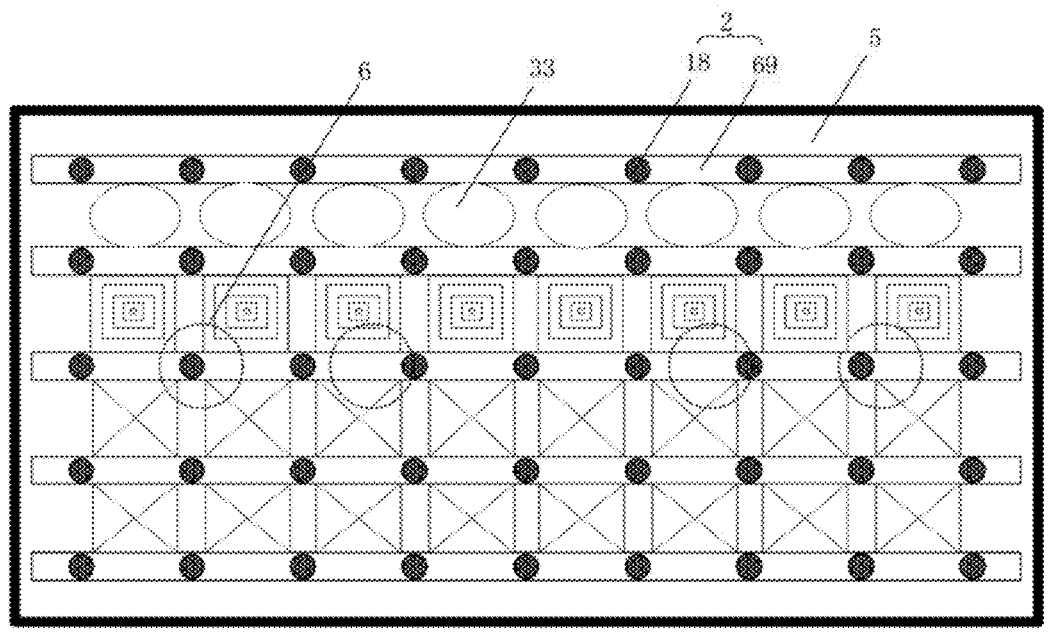
FIG. 38 is yet another schematic structural diagram of a top view of a display apparatus according to some embodiments of the disclosure.
Figure 39:
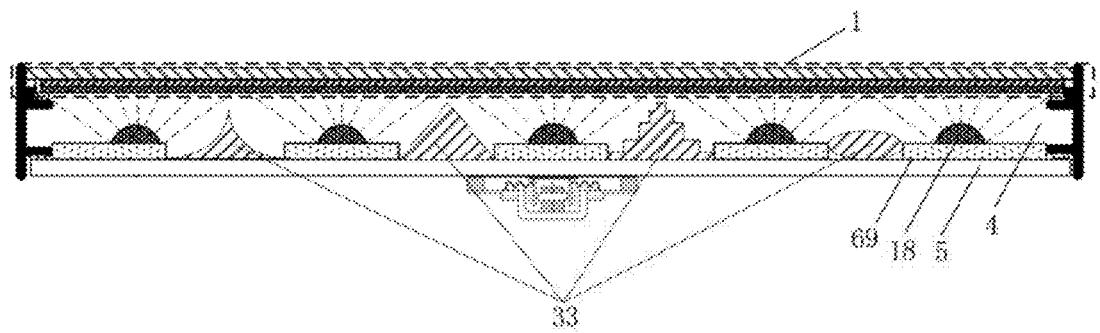
FIG. 39 is yet another schematic structural diagram of a section of a display apparatus according to some embodiments of the disclosure.

In some embodiments, FIG. 38 is yet another schematic structural diagram of a top view of a display apparatus according to some embodiments of the disclosure. FIG. 39 is yet another schematic structural diagram of a section of a display apparatus according to some embodiments of the disclosure. With reference to FIG. 38 and FIG. 39, the backlight module 2 is a direct-lit backlight module or an edge-lit backlight module. A plurality of filling structures 33 are arranged in the second sealed air cavity 4; a side, adjacent to the liquid crystal display panel 1, of the sound-emitting board 5 includes a plurality of light-emitting structures 18; and the filling structure 33 is arranged on the sound-emitting board 5 and between the light-emitting structures 18.

In some embodiments, the backlight module 2 may be the direct-lit backlight module 2 or the edge-lit backlight module 2. For example, the backlight module 2 may include a plurality of light bars 69, the light bars 69 are fixed to the sound-emitting board 5, and the sound-emitting board 5 and the liquid crystal display panel 1 form the second sealed air cavity 4. When the sound-emitting exciter 6 drives the sound-emitting board 5 to vibrate, the liquid crystal display panel 1 is driven to emit sound through an air gap of the second sealed air cavity. The larger the second sealed air cavity 4 is, the lower the sensitivity to a pressure change caused by vibration deformation of the backlight module 2 is. However, both the direct-lit backlight module 2 and the edge-lit backlight module 2 use about 100 light-emitting structures 18, such as lamp beads, and require a large light mixing distance, such as a distance of 10 mm. However, a backlight distance of the Mini-LED is merely about 3 mm.

For an application to a model with a large light mixing distance, in order to reduce an air volume of the second sealed air cavity 4, the filling structure 33 is used in some embodiments of the disclosure to reduce a size of the second sealed air cavity 4. FIG. 38 shows several filling schemes. In a space between the backlight module 2 and the liquid crystal display panel 1, the filling structure 33 with a certain shape is bonded in a region avoiding a direct light path of lamps. A surface of the filling structure 33 may be conical, trapezoidal, triangular, or circular; and the filling structures 33 may also have shapes of a cone and a pyramid or have a cone-like shape and a pyramid-like shape. In order to reduce a weight of the sound-emitting board 5, the filling structure 33 may be made of the light and high-density foam material, for example, melamine. In addition, in order to reduce influence from the filling structure 33 on a light circuit, a diffuse reflection film layer may be attached to the surface of the filling structure 33. For example, a diffuse reflecting material is attached to the surface of the filling structure 33 by processes such as spraying and pasting. Thus, light absorption of the filling structures 33 is reduced.

Thus, according to some embodiments of the disclosure, the sound-emitting board 5 and the two sealed air cavities with internally viscous air are utilized, such that the sound-emitting exciter 6 can transmit vibration to the front panel of the liquid crystal display panel 1 through the sound-emitting board 5, the backlight module 2, the second sealed air cavity 4 and the first sealed air cavity 3 successively, and the liquid crystal display panel 1 vibrates and emits sound accordingly. Since the vibration output terminal 7 of the sound-emitting exciter 6 is fixed to the surface, far away from the backlight module 2, of the sound-emitting board 5, an arrangement of the sound-emitting exciter 6 has no influence on display on the display apparatus, so that sound emitting of a traditional liquid crystal screen is made probable, the user is provided with audio-visual experience of sound-image synchronization that sound is emitted from an image, and an industrial bottleneck problem that sound emitting of the liquid crystal display screen is difficult to implement is overcome. In addition, the filling structure 33 is used to reduce the volume of a sound transmission cavity, thus improving air viscosity of the sound transmission cavity and optimizing a sound transmission effect.

In some embodiments, with reference to FIGS. 38 and 39, the backlight module 2 includes a plurality of light bars 69. The light-emitting structure 18 is arranged on a surface, far away from the sound-emitting board 5, of the light bar 69; and the filling structure 33 is arranged on the sound-emitting board 5 and between adjacent light bars 69.

In some embodiments, the backlight module 2 may, for example, include the plurality of light bars 69. The light bar 69 may be fixed on the sound-emitting board 5 by an adhesive structure, for example. The light bars 69 included in the backlight module 2 may extend laterally and be bonded to the sound-emitting board 5 in FIG. 38, or extend longitudinally and be bonded to the sound-emitting board 5 in FIG. 38. The filling structure 33 is arranged on the sound-emitting board 5 and between adjacent light bars 69. Thus, an arrangement of the filling structures 33 does not affect an arrangement of the light bars 69 on the sound-emitting board 5. In addition, the filling structures 33 occupy a space of the second sealed air cavity 4, thus reducing a volume of air in the second sealed air cavity 4, improving the air viscosity of the second sealed air cavity 4, and further optimizing the sound transmission effect of the display apparatus.

Figure 40:
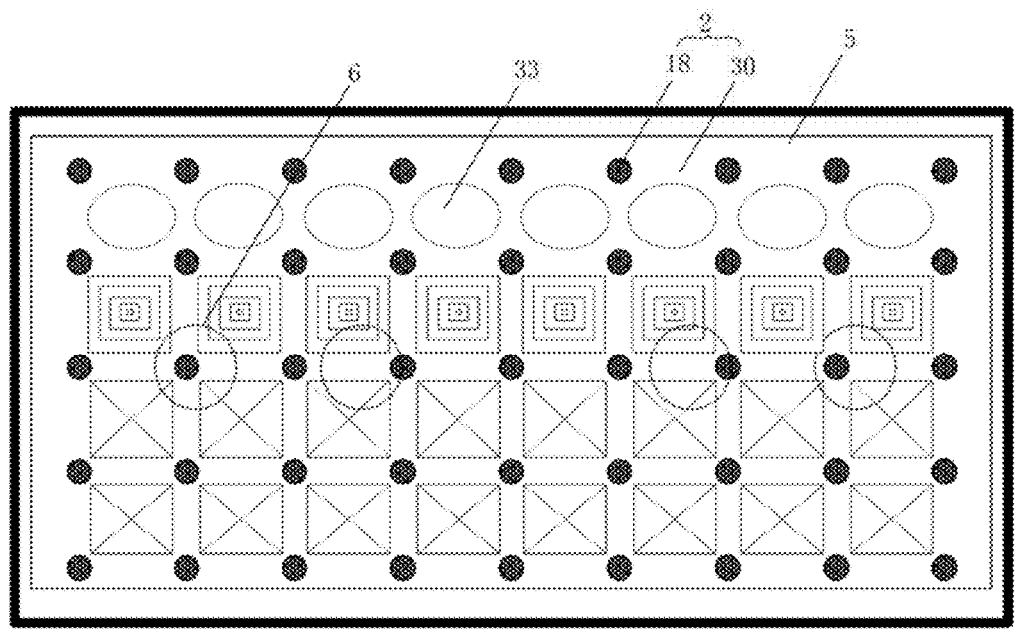
FIG. 40 is yet another schematic structural diagram of a top view of a display apparatus according to some embodiments of the disclosure.
Figure 41:
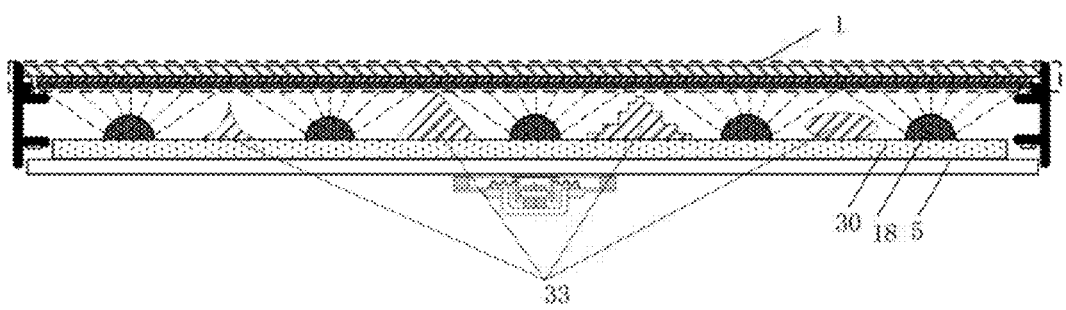
FIG. 41 is yet another schematic structural diagram of a section of a display apparatus according to some embodiments of the disclosure.

FIG. 40 is yet another schematic structural diagram of a top view of a display apparatus according to some embodiments of the disclosure. FIG. 41 is yet another schematic structural diagram of a section of a display apparatus according to some embodiments of the disclosure. In some embodiments, with reference to FIGS. 40 and 41, the backlight module includes a backlight board 30; the light-emitting structure 18 is arranged on a surface, far away from the sound-emitting board 5, of the backlight board 30; and the filling structure 33 is arranged on the backlight board 30.

In some embodiments, the backlight module 2 includes the backlight board 30. The backlight board 30 has a board-like structure with approximately the same area as the display apparatus, and the filling structure 33 is arranged on the backlight board 30 and between adjacent light-emitting structures 18. Thus, an arrangement of the filling structures 33 does not affect an arrangement of the light-emitting structures 18 on the backlight board 30. In addition, the filling structures 33 occupy a space of the second sealed air cavity 4, thus reducing a volume of air in the second sealed air cavity 4, improving the air viscosity of the second sealed air cavity 4, and further optimizing the sound transmission effect of the display apparatus.

Figure 42:
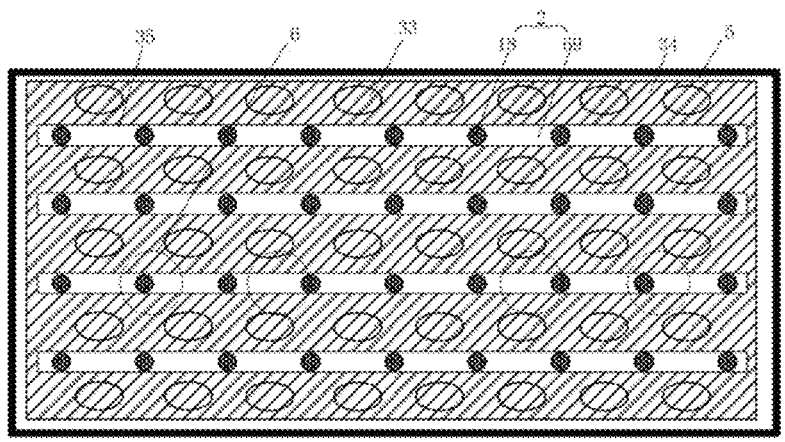
FIG. 42 is yet another schematic structural diagram of a top view of a display apparatus according to some embodiments of the disclosure.
Figure 43:
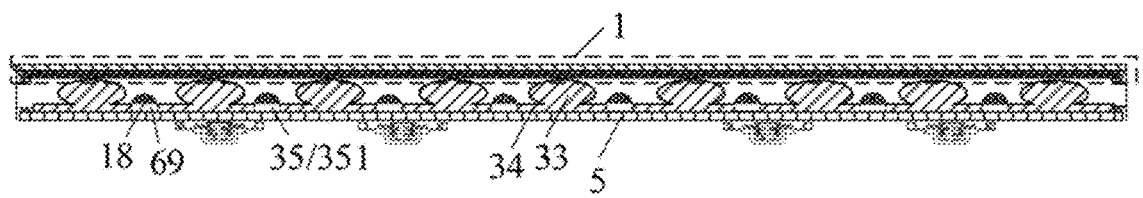
FIG. 43 is yet another schematic structural diagram of a section of a display apparatus according to some embodiments of the disclosure.

FIG. 42 is yet another schematic structural diagram of a top view of a display apparatus according to some embodiments of the disclosure. FIG. 43 is yet another schematic structural diagram of a section of a display apparatus according to some embodiments of the disclosure. In some embodiments, with reference to FIGS. 42 and 43, the display apparatus further includes: a connection portion 34. The connection portion 34 is located on the sound-emitting board 5, the connection portion 34 and the plurality of filling structures 33 are integrally formed, and the connection portion 34 is provided with a plurality of accommodation cavities 35. The backlight module 2 includes a plurality of light bars 69; and the light-emitting structure 18 is arranged on a surface, far away from the sound-emitting board 5, of the light bar 69. The light bar 69 is located in the accommodation cavity 35.

In some embodiments, a large number of filling structures 33 mounted results in the problem of a difficult and complicated mounting process. In order to solve this problem, in some embodiments of the disclosure, the connection portion 34 may be arranged. The connection portion 34 may be arranged to have an integral elastic board-like structure with approximately the same area as the display apparatus and be located on the sound-emitting board 5. For example, the connection portion 34 may be arranged on the sound-emitting board 5 through an adhesive structure, and the connection portion 34 connects the filling structures 33 into a whole. For example, the plurality of filling structures 33 and the connection portion 34 may be integrally formed, and the plurality of filling structures 33 may be mounted to the sound-emitting board 5 together with the connection portion 34. Mounting times do not increase as the number of filling structures 33 increases, thus effectively reducing the mounting difficulty of the filling structures 33. The connection portion 34 is further provided with the plurality of accommodation cavities 35, and the plurality of light bars 69 included in the backlight module 2 may be placed in the accommodation cavities 35. The light-emitting structure 18 may be mounted on the surface, far away from the sound-emitting board 5, of the light bar 69. Thus, existence of the connection portion 34 does not affect mounting of the light bars 69 and the light-emitting structures 18.

Figure 44:
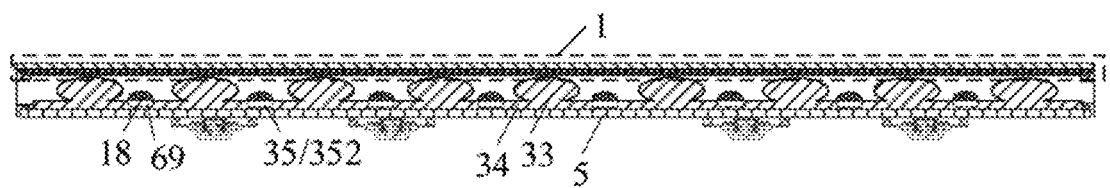
FIG. 44 is yet another schematic structural diagram of a section of a display apparatus according to some embodiments of the disclosure.

In some embodiments, with reference to FIGS. 42 and 43, the accommodation cavity 35 may be arranged as a via hole 351 penetrating the connection portion, and the light bar 69 is arranged in contact with the sound-emitting board 5. FIG. 44 is yet another schematic structural diagram of a section of a display apparatus according to some embodiments of the disclosure. In some embodiments, with reference to FIGS. 42 and 44, the accommodation cavity 35 may also be arranged as a recess 352 provided on a surface of a side, adjacent to the liquid crystal display panel 1, of the connection portion 34; and the light bar 69 is arranged in contact with the connection portion 34.

In some embodiments, when the accommodation cavity 35 is the via hole 351 penetrating the connection portion as shown in FIG. 43, the light bar 69 is arranged in contact with the sound-emitting board 5. In this case, the connection portion 34 connects the filling structures 33 into a whole, the filling structures 33 do not affect arrangements of the light bars 69 and the light-emitting structures 18, and the mounting difficulty of the filling structures 33 is reduced by using the connection portion 34. When the accommodation cavity 35 is the recess 352 that is provided on the surface of the side, adjacent to the liquid crystal display panel 1, of the connection portion 34 as shown in FIG. 44, the light bar 69 is arranged in contact with the connection portion 34, that is, a position, corresponding to the light bar 69, of the connection portion 34 is not penetrated. Thus, integrated forming of the connection portion 34 and the filling structures 33 can reduce the mounting difficulty of the filling structures 33 without affecting the mounting of the light bars 69 and the light-emitting structures 18.

Figure 45:
FIG. 45 is yet another schematic structural diagram of a section of a display apparatus according to some embodiments of the disclosure.

In some embodiments, FIG. 45 is yet another schematic structural diagram of a section of a display apparatus according to some embodiments of the disclosure. With reference to FIGS. 38-45, the light bars 69 included in the backlight module 2 may be laterally bonded light bars when laterally arranged or longitudinally bonded light bars when longitudinally arranged. In this case, the filling structures 33 may be made as large as the sound-emitting board 5, that is, all the filling structures 33 are integrally formed, thus simplifying a manufacturing process. Merely via holes for placing the light bars 69 are formed in the integrally formed filling structures 33, and the filling structure 33 still has a convex portion as shown in FIG. 38, thus reducing a volume of the second sealed air cavity 4 and optimizing the sound transmission effect of the display apparatus.

In some embodiments, with reference to FIG. 38 and FIG. 39, an area of a cross section, parallel to the liquid crystal display panel 1, of the filling structure 33 decreases in a direction away from the sound-emitting board 5, that is, in a direction from bottom to top in FIG. 39.

In some embodiments, an area of a cross section of a side, close to the sound-emitting board 5, of the filling structure 33 may be arranged to be greater than an area of a cross section of a side, close to the liquid crystal display panel 1, of the filling structure. The light-emitting structure 18 needs to emit light towards a side of the liquid crystal display panel 1, to perform a display function of the display apparatus. The filling structure 33 is located between the light-emitting structures 18. In order to avoid light emitted by the light-emitting structures 18 and further avoid influence on the light-emitting effect of the light-emitting structures 18, the area of the cross section, parallel to the liquid crystal display panel 1, of the filling structure 33 decreases in the direction away from the sound-emitting board 5, that is, in the direction from bottom to top in FIG. 39. In addition, in order to reduce a weight of the sound-emitting board 5, the filling structure 33 may be made of the light and high-density foam material, for example, melamine. Illustratively, the filling structures 33 may also have shapes of a cone and a pyramid or have a cone-like shape and a pyramid-like shape. Some embodiments of the disclosure do not limit a specific shape of the filling structure 33. In addition, shapes of the filling structures 33 in the same display apparatus may be the same or not, which is not specifically limited in some embodiments of the disclosure.

In some embodiments, a surface of the filling structure 33 is clad in a diffuse reflection film layer or coated with a diffuse reflecting material. In some embodiments, in order to reduce influence from the filling structure 33 on a light circuit, that is, in order to reduce influence from the filling structure 33 on light emitted by the light-emitting structure 18, a diffuse reflection film layer may be attached to the surface of the filling structure 33. For example, a white diffuse reflecting material is attached to the surface of the filling structure 33 by processes such as spraying and pasting. Thus, absorption, by the filling structure 33, of light emitted by the light-emitting structure 18 is reduced by using the diffuse reflecting material. Similarly, by arranging the surface of the filling structure 33 to be clad in the diffuse reflection film layer, absorption, by the filling structure 33, of light emitted by the light-emitting structure 18 can be reduced by using the diffuse reflection film layer.

In some embodiments, with reference to FIGS. 39-44, the filling structure 33 may be arranged as the elastic support member 17 and arranged between a first structure and the liquid crystal display panel 1 in an interference manner. The first structure is the backlight module 2 or the sound-emitting board 5.

In some embodiments, there are problems in a vibration transmission process of the sound-emitting exciter 6. The thickness of the air gap between the liquid crystal display panel 1 and the backlight module 2 varies greatly due to influence from a material tolerance, an assembly process tolerance, a self-gravity, etc. Thus, consistency of the vibration transmission efficiency cannot be guaranteed, and bonding between the liquid crystal display panel 1 and the backlight module 2 leads to vibration noise and abrasion. In order to avoid the risk, in some embodiments of the disclosure, the filling structure 33 is arranged as the elastic support member 17 and is arranged between the first structure and the liquid crystal display panel 1 in an interference manner. The filling structure 33 reduces a volume of air in the sealed air cavity 4, improves the air viscosity of the sealed air cavity 4, and further optimizes the sound transmission effect of the display apparatus. In addition, the filling structure can ensure a stable size of the air gap between the liquid crystal display panel 1 and the backlight module 2, and avoid noise due to abnormal collision between the liquid crystal display panel 1 and the backlight module 2. In addition, the solid filling structure 33 improves transmission efficiency of vibration from the backlight module 2 to the liquid crystal display panel 1.

In some embodiments, corresponding to FIGS. 38, 39, 42, 43 and 44, the first structure is the sound-emitting board 5, that is, the filling structure 33 is used as the elastic support member 17 and is arranged between the sound-emitting board 5 and the liquid crystal display panel 1 in an interference manner. Corresponding to FIGS. 40 and 41, the first structure is the backlight module 2, that is, the filling structure 33 is used as the elastic support member 17 and is arranged between the backlight module 2 such as the backlight board 30 and the liquid crystal display panel 1 in an interference manner. With reference to FIGS. 38-44, the combination of two sides of the filling structure 33 with the liquid crystal display panel 1 and the first structure may be designed in size interference fit. That is, a size of the filling structure 33 is greater than a design size of a height between the liquid crystal display panel 1 and the first structure.

The first structure being the backlight module 2, that is FIGS. 40 and 41 are taken as examples. FIG. 20 is yet another schematic structural diagram of a section of a display apparatus according to some embodiments of the disclosure, in which when a vibrator of the sound-emitting exciter 6 vibrates backwards, the filling structure 33 is in a free contact state. FIG. 21 is another schematic structural diagram of a section of a display apparatus according to some embodiments of the disclosure, in which when the sound-emitting exciter 6 does not vibrate and the filling structure 33 is placed statically, the filling structure 33 is in an interference compression state due to pressing by the liquid crystal display panel 1 and the backlight module 2. FIG. 22 is another schematic structural diagram of a section of a display apparatus according to some embodiments of the disclosure, in which when the vibrator of the sound-emitting exciter 6 is pushed forwards, the filling structure 33 is in a further over-pressed state. The size of the filling structure 33 may be, for example, a distance between the liquid crystal display panel 1 and the backlight module 2 plus a half of a vibration amplitude of the vibrator, and the filling structure 33 is guaranteed to be in contact with both the liquid crystal display panel 1 and the backlight module 2 in the state shown in FIG. 20. Thus, the transmission efficiency of the vibration from the first structure, for example, the backlight module 2 to the liquid crystal display panel 1 is improved. It should be noted that when the first structure is the sound-emitting board 5, a working principle of an interference arrangement of the filling structure 33 may be understood with reference to the embodiments described above, and is not repeated herein.

In some embodiments, with reference to FIGS. 20-22 and FIGS. 38-44, the filling structure being the backlight module 2 is taken as an example, and the filling structure 33 may be arranged to be fixed to the first structure through a first adhesive structure 19. For example, the first adhesive structure 19 is a double-sided tape. Alternatively, FIG. 23 is yet another schematic structural diagram of a section of a display apparatus according to some embodiments of the disclosure. With reference to FIGS. 38-43 and FIG. 23, a side, adjacent to the first structure, of the filling structure 33 is provided with a welding structure 20; and the filling structure 33 is welded and fixed to a position 67 of the first structure through the welding structure 20. In some embodiments, a structure made of a weldable metal material may be arranged in the filling structure 33 in an injection-molded, mechanically matching or bonded manner. The welding structure 20 is fixedly connected to the first structure through welding, so as to fix the filling structure 33. In this way, the filling structures 33 can be firmly mounted, and automatic assembly in batch is facilitated. In addition, the material of the filling structure 33 may be an elastic material such as silicone rubber. However, the hardness of the elastic material changes due to temperature influence. A change in an internal temperature during working of the display apparatus may lead to a change in the hardness of the filling structure 33, thus affecting the support and vibration transmission optimization of the filling structure 33. As shown in FIG. 23, the optimization may be implemented through two-material compounding. The elastic material part guarantees a vibration buffering effect, and the non-elastic material part, namely the welding structure 20, guarantees that the vibration transmission effect does not change as the temperature changes.

In some embodiments, FIG. 24 is yet another schematic structural diagram of a section of a display apparatus according to some embodiments of the disclosure. With reference to FIGS. 38-43 and FIG. 24, two ends of the filling structure 33 may be provided with sucker structures, and the filling structure 33 is fixed to the first structure and the liquid crystal display panel 1 through the sucker structures at the two ends respectively. FIG. 25 is yet another schematic structural diagram of a section of a display apparatus according to some embodiments of the disclosure. With reference to FIGS. 38-43 and FIG. 25, one end of the filling structure 33 may be fixed to the first structure through a first adhesive structure 19, for example, a double-sided tape; and the other end of the filling structure 33 is provided with a sucker structure, and the filling structure 33 is fixed to the liquid crystal display panel 1 through the sucker structure. Thus, the filling structure 33 may be fixed by double-sided bonding or mechanical structure fixation. In this way, vibration linkage between the backlight module 2 and the liquid crystal display panel 1 is implemented and the vibration transmission efficiency is improved. However, the double-sided bonding or mechanical structure fixation is complicated in process implementation, and feasibility of the solution can be improved through adsorption of the suckers. It should be noted that when the first structure is the sound-emitting board 5, a fixation manner of the filling structure 33 to the first structure may be understood with reference to the embodiments described above, and is not repeated herein.

On the basis of the embodiments described above, the filling structure 33 is configured to reduce the air volume in the second sealed air cavity 4, and further serves as the elastic support member 17 described in the embodiments described above. The filling structure 33 may also be fixed to the sound-emitting board 5 through taping or welding. A supporting effect and a vibration efficiency enhancement effect of the filling structures 33 may be understood with reference to the embodiments described above, which will not be repeated herein.

Figure 46:
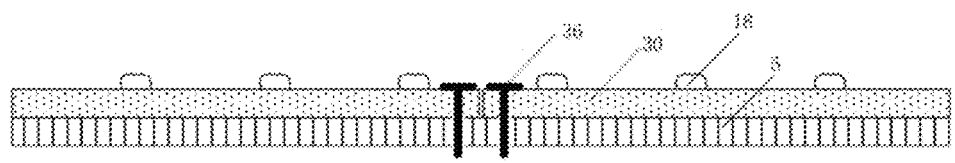
FIG. 46 is yet another schematic structural diagram of a section of a display apparatus according to some embodiments of the disclosure.
Figure 47:
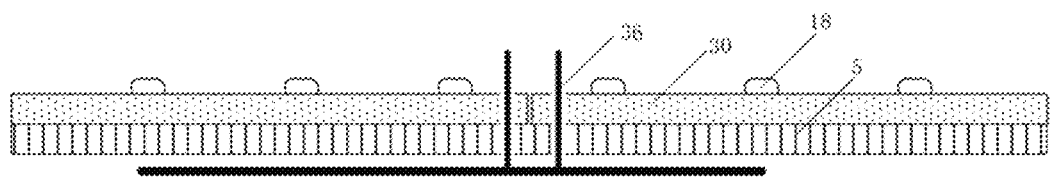
FIG. 47 is yet another schematic structural diagram of a section of a display apparatus according to some embodiments of the disclosure.
Figure 48:
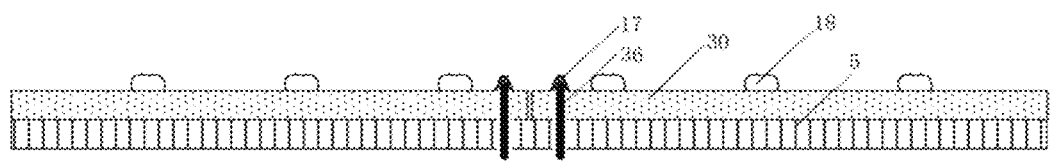
FIG. 48 is yet another schematic structural diagram of a section of a display apparatus according to some embodiments of the disclosure.

In some embodiments, FIG. 46 is yet another schematic structural diagram of a section of a display apparatus according to some embodiments of the disclosure. FIG. 47 is yet another schematic structural diagram of a section of a display apparatus according to some embodiments of the disclosure. FIG. 48 is yet another schematic structural diagram of a section of a display apparatus according to some embodiments of the disclosure. With reference to FIGS. 46-48, the backlight module includes a plurality of backlight boards 30. The backlight board 30 is fixed to the sound-emitting board 5 through a first adhesive buffer structure (not shown in FIGS. 46-48). Mounting positioning holes are provided in both the backlight boards 30 and the sound-emitting board 5, and a pre-positioning columnar structure 36 is inserted into the mounting positioning holes of the backlight board 30 and the sound-emitting board 5, so as to position the backlight board 30 and the sound-emitting board 5.

Specifically, with consideration of a processing yield and cost requirements, for a display apparatus of Mini-LED backlight modules, the backlight modules are all formed by splicing the plurality of backlight boards 30. As shown in FIGS. 11 and 12, the backlight boards 30 are uniformly distributed and bonded to the sound-emitting board 5. It is worth noting that viscous accuracy of the backlight boards 30 is strictly limited. If the backlight boards 30 are bonded too tightly, there may be a hard contact between two backlight boards 30, and noise can be generated during vibration. Although the problem can be solved by reducing a size of an edge of the backlight board 30 to expand an interval between the backlight boards 30, since the backlight boards 30, a gap and the sound-emitting board 5 constitute a vibration system, the gap of the backlight boards 30 can cause divided vibration of a vibration surface. Such divided vibration can lead to sound-emitting resonance at a frequency with a wavelength similar to a length and a width of the backlight board 30, and further lead to a peak value or a valley value in a frequency response. For example, the backlight board 30 with the length of 0.3 meters can resonate with sound emitting at a frequency of 1133 Hz. Such resonance can lead to an abnormal peak value at such frequency. A frequency of 566 Hz can simultaneously produce a peak value and a valley value at this length, thus leading to cancellation of sound waves and producing the valley value.

In order to avoid the problem described above, it is necessary to strictly control fixation accuracy of the backlight board 30 to the sound-emitting board 5. In a Mini-LED display apparatus without sound emitting on the screen, a backlight board 30 is locked to a metal plate with screws, positioning accuracy is high, and there is no tape bonding between the backlight board 30 and the metal backplane, such that requirements for mounting and positioning operations are not high. However, this method cannot be applied to on-screen sound emitting since the sound-emitting board 5 is made of a material such as an aluminum honeycomb board, is soft in texture and hollowed and cannot form a screw opening. The backlight board 30 is completely bonded to the sound-emitting board 5, and needs a successful operation at one time after being accurately positioned. In addition, the backlight board 30 and the sound-emitting board 5 are always in a vibration state, and if a screw structure is used, it is easy to cause screws to fall off after long-term use, resulting in noise and other problems.

In addition, mounting accuracy of the backlight board 30 may be strictly controlled by using an automated high-precision manipulator, to bond the backlight board 30 to the sound-emitting board 5. However, technical transformation requirements of a production line are high, and manual bonding cannot be implemented. With reference to FIGS. 46-48, in some embodiments of the disclosure, several methods are provided for high-precision positioning of the backlight board 30, for example, the double-sided tape is used as the first adhesive buffer structure. As shown in FIG. 46, the pre-positioning columnar structure 36 may be a T-shaped positioning nail according to surface mounted technology (SMT). It is clear that adhesive bonding or manual welding may also be used for fixation. The positioning nail penetrates the mounting positioning hole in the backlight board 30, and the sound-emitting board 5 is provided with a mounting positioning hole at a corresponding position. When the backlight board 30 is assembled, a nail point first penetrates the mounting positioning hole of the sound-emitting board 5 to play a pre-positioning role, and then the backlight board 30 and the sound-emitting board 5 are pressed together, thus improving the operation efficiency and precision. Alternatively, as shown in FIG. 47, the pre-positioning columnar structure 36 may adopt a pre-positioning fixture with an ejector pin. The sound-emitting board 5 is first placed on the pre-positioning fixture, and the ejector pin of the pre-positioning fixture penetrates the mounting positioning hole of the sound-emitting board 5. Then, the pre-positioning ejector pin penetrates the backlight board 30, and afterwards, the backlight board 30 and the sound-emitting board 5 are pressed together.

In some embodiments, as shown in FIG. 48, the pre-positioning columnar structure 36 and the elastic support member 17 are fixedly arranged. The elastic support member 17 is fixed to the backlight board 30 through the pre-positioning columnar structure 36, and the elastic support member 17 is arranged between the backlight board 30 and the liquid crystal display panel 1 in an interference manner. Specifically, the pre-positioning columnar structure 36 is combined with the elastic support member 17, for example, through a double-shot molding process, etc. During assembling, the pre-positioning columnar structure 36 first penetrates the mounting positioning hole of the backlight board 30, the pre-positioning columnar structure 36 penetrates the mounting positioning hole of the sound-emitting board 5 after a bottom surface of the elastic support member 17 is firmly bonded to a surface of the backlight board 30, and then the backlight board 30 and the sound-emitting board 5 are pressed together. This method has obvious advantages. Firstly, a customized device does not need the SMT, and processing difficulty is reduced. Secondarily, after assembly is completed, the backlight board 30 and the sound-emitting board 5 play a role in fixation of the elastic support member 17. Thus, the problem that the elastic support member 17 falls off when merely relying on adhesion in the case of long-term aging of the elastic support member 17 or high heat is avoided.

Figure 49:
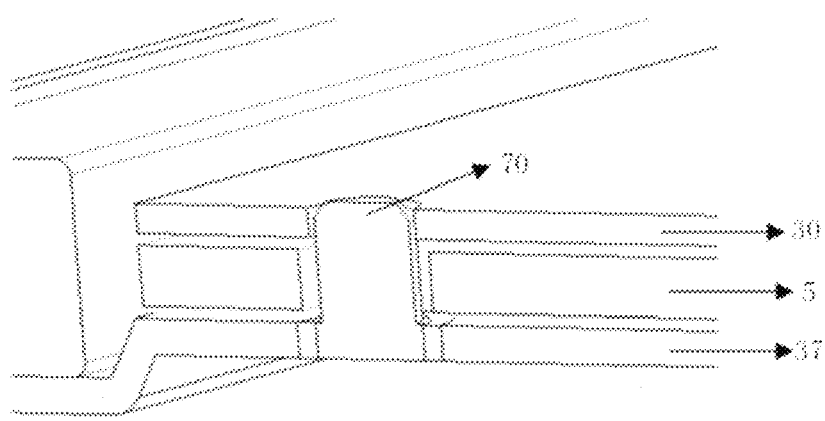
FIG. 49 is yet another schematic structural diagram of a section of a display apparatus according to some embodiments of the disclosure.

FIG. 49 is yet another schematic structural diagram of a section of a display apparatus according to some embodiments of the disclosure. As shown in FIG. 49, the backlight board 30 and the sound-emitting board 5 may be fixed by using a positioning rivet 70 on the middle bezel backplane 37.

Figure 50:
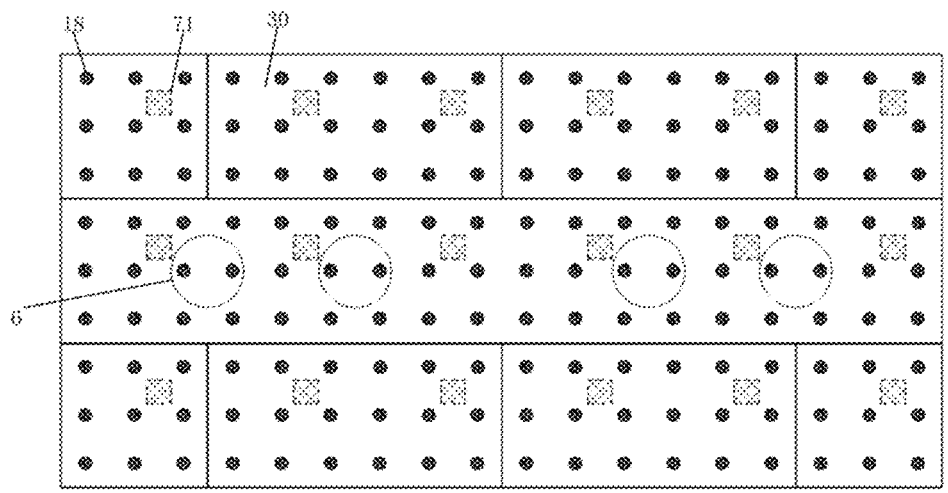
FIG. 50 is yet another schematic structural diagram of a top view of a display apparatus according to some embodiments of the disclosure.

In some embodiments, FIG. 50 is yet another schematic structural diagram of a top view of a display apparatus according to some embodiments of the disclosure. As shown in FIG. 50, the backlight module includes a plurality of backlight boards 30, and the plurality of backlight boards 30 are distributed in unequal areas.

Specifically, the sound-emitting exciter 6 excites mode resonance of a sound-emitting body to achieve sound emitting. The richer the modes are, the more frequency points for resonance are, the richer sound produced is, and the better sound quality is. Division of the sound-emitting board 5 into a plurality of regions through the backlight boards 30 leads to concentration of modes. For example, the backlight board 30 with a length of 0.3 meters will resonate at 1133 Hz. In order to eliminate such resonance as much as possible and ensure richness of the modes, in some embodiments of the disclosure, the plurality of backlight boards 30 are distributed with unequal areas. As shown in FIG. 50, a backlight board 30 with the same length as the sound-emitting board 5 is used in a region where the sound-emitting exciter 6 is located, and thus a continuous and complete vibration surface is provided in a transverse axis direction, thus facilitating excitation of low-frequency modes. Backlight boards 30 that are gradually divided with small areas are used in other regions, so as to guarantee that modes at other frequencies can be excited. The distribution of the backlit plates 30 with unequal areas guarantees that not only one mode of the backlit plate 30 can be excited.

In some embodiments, as shown in FIG. 50, the side, adjacent to the liquid crystal display panel 1, of the backlight board 30 includes a plurality of light-emitting structures 18. The number of the light-emitting structures 18 on the backlight board 30 is an integer multiple of N, where N is an integer greater than 1.

Specifically, the backlight module is a Mini-LED backlight module, and brightness of the Mini-LED backlight module changes as brightness of an image displayed in a liquid crystal region corresponding to the Mini-LED backlight module. Thus, it is necessary to link a backlight drive algorithm with a currently displayed image, and drive the light-emitting structure 18 through a backlight module drive chip 71. The backlight module drive chip 71 realizes multi-channel output, that is, one backlight module drive chip 71 drives the plurality of light-emitting structures 18. As shown in FIG. 50, the number of backlight module drive chips 71 on each backlight board 30 is not consistent. Since the areas of the backlight boards 30 are different, the numbers of light-emitting structures 18 are also different. Thus, a greatest common divisor of the area of the backlight board 30 may be determined. With nine light-emitting structures 18 at an upper left corner and the backlight module drive chips 71 that may drive the nine light-emitting structures 18 as an example, N is equal to 9, and the numbers of the light-emitting structures 18 of all other backlight boards 30 are integer multiples of the number of the light-emitting structures 18 on this backlight board 30. For example, an integer multiple corresponding to a second backlight board 30 at the upper left corner is two, an integer multiple corresponding to the backlight board 30 in a middle row is six, and the number of corresponding backlight module drive chips 71 of each backlight board 30 becomes two or six. In this way, when the backlight boards 30 are connected to each other through a flexible printed circuit (FPC) on back surfaces of the backlight boards 30, the areas and the positions of the backlight boards 30 do not need to be considered. The backlight drive algorithm of the light-emitting structure 18 may also be designed according to nine lamps per chip. Thus, the requirement for generalization of the drive algorithm and the backlight module drive chip 71 in the case of different areas of the backlight boards 30 is greatly reduced.

Figure 51:
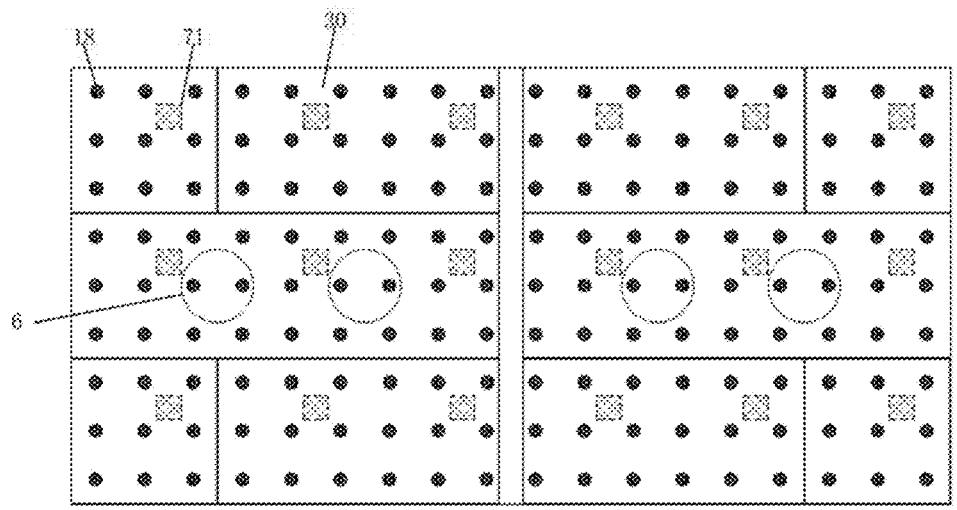
FIG. 51 is yet another schematic structural diagram of a top view of a display apparatus according to some embodiments of the disclosure.
Figure 52:
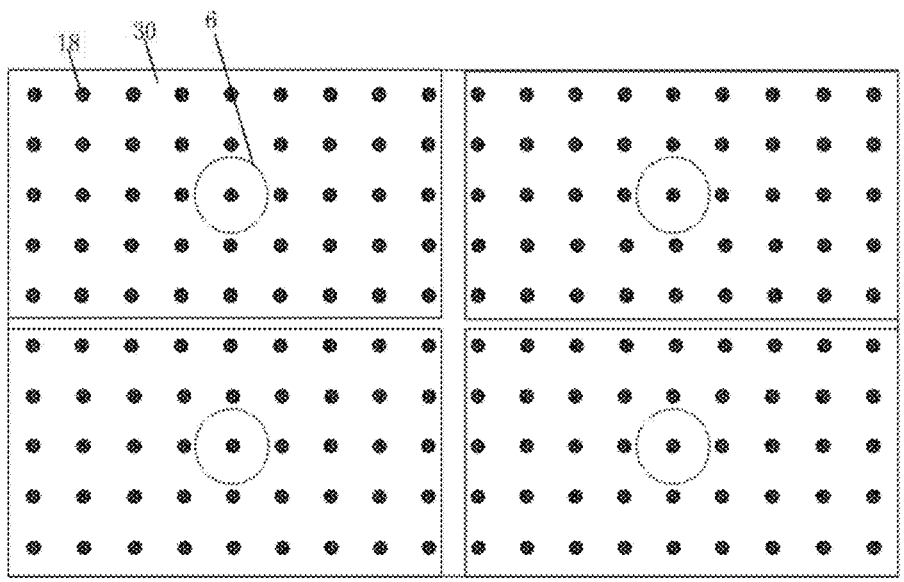
FIG. 52 is still another schematic structural diagram of a top view of a display apparatus according to some embodiments of the disclosure.

In some embodiments, FIG. 51 is yet another schematic structural diagram of a top view of a display apparatus according to some embodiments of the disclosure. FIG. 52 is still another schematic structural diagram of a top view of a display apparatus according to some embodiments of the disclosure. With reference to FIGS. 51 and 52, the backlight module includes a plurality of backlight boards 30, and adjacent first backlight boards are spaced by a set distance. The first backlight board is a backlight board 30 corresponding to a region where the sound-emitting exciter 6 is located.

Specifically, as shown in FIG. 51, an interval between backlight boards 30 in a middle region is expanded. A hardness of a region where the backlight boards 30 are bonded is high, and a hardness of the region where the backlight board 30 is not provided is low. Vibration energy may be greatly attenuated in the region with a low hardness during lateral transmission. A density of a substance through which vibration is transmitted is relatively uniform at a bonded portion between the backlight board 30 and the sound-emitting board 5. A density of a transmission medium changes greatly at a gap of the backlight boards 30, vibration transmission is destroyed, and a vibration mode creates a boundary condition. Thus, vibration of left and right half regions can be effectively prevented from being transmitted to each other, and crosstalk of vibration in the left and right regions can be effectively controlled. Thus, vibration of a left sound-emitting exciter 6 mainly causes vibration of the left region, and the same is true for the right side. As shown in FIG. 52, an interval between the backlight boards 30 in adjacent regions of four regions is relatively large, such that vibration transmitted from an region where each sound-emitting exciter 6 is located to an adjacent region is reduced. The four sound-emitting exciters 6 correspond to sounds of different sound channels respectively, thus enhancing a sense of sound localization. For example, when a person who is speaking in a picture is at an upper left corner, merely the upper left corner region vibrates and emits sound, thus enhancing a picture sense of the sound, for example, it is applied to the video teleconference. Illustratively, a buffer structure such as an adhesive tape may also be arranged between adjacent first backlight boards to reduce noise.

Figure 53:
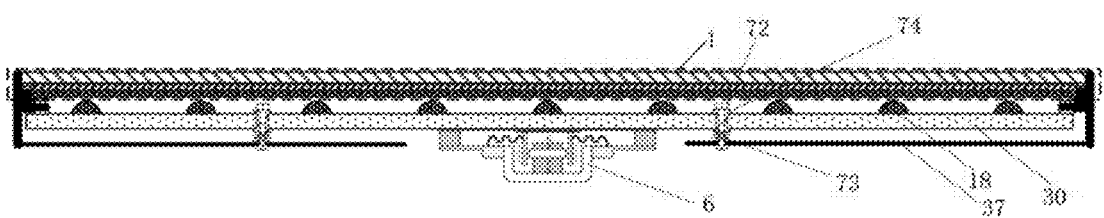
FIG. 53 is yet another schematic structural diagram of a section of a display apparatus according to some embodiments of the disclosure.

In some embodiments, FIG. 53 is yet another schematic structural diagram of a section of a display apparatus according to some embodiments of the disclosure. Specifically, when the backlight module is a complete printed circuit board (PCB), such as a Mini-LED display apparatus with a small size, the backlight module may be bonded to the sound-emitting board, and a sound-emitting exciter may be arranged on a back surface of the sound-emitting board, or the sound-emitting exciter may be directly bonded to a back surface of the backlight module. The screen is driven to vibrate and emit sound by driving the backlight module and a sealed air layer between the backlight module and the liquid crystal display panel. As shown in FIG. 53, since the PCB material is uniform and has a single vibration mode, and the material is soft with poor flatness and support, fixation needs to be assisted through other fixation structures. In FIG. 53, a core fixation structure is a lock screw 72. A nut is fixed to the backlight board 30 or nut threads are directly machined on the backlight board 30. The lock screw penetrates the backlight board 30 from a side of the light-emitting structure 18, and then is fixed to the middle bezel backplane 37. The lock screw 72 is fixed to the backlight board 30 through a flexible rubber pad, and a spring structure 73 is arranged between the flexible rubber pad 74 and the middle bezel backplane 37. In actual use, the spring structure 73 is compressed by the screw to be in a compressed state, applies a pressure to the side of the liquid crystal display panel 1, and simultaneously presses the flexible rubber pad 74 and the backlight board 30. Thus, the backlight board 30 is fixed to a top end of the screw 72 under stress. When the sound-emitting exciter 6 drives the backlight board 30 to vibrate, the flexible rubber pad 74 is slightly deformed to adapt to the vibration of the backlight board 30, and the screw 72 plays a positioning role. Thus, the flexible rubber pad 74 may buffer and offset tiny vibration caused by medium and high frequencies. In addition, in order to ensure flatness of the backlight board 30, a plurality of core fixation structures shown in FIG. 53 are required, and the core fixation structures may be arranged in a rectangular or circular manner, for example.

Figure 54:
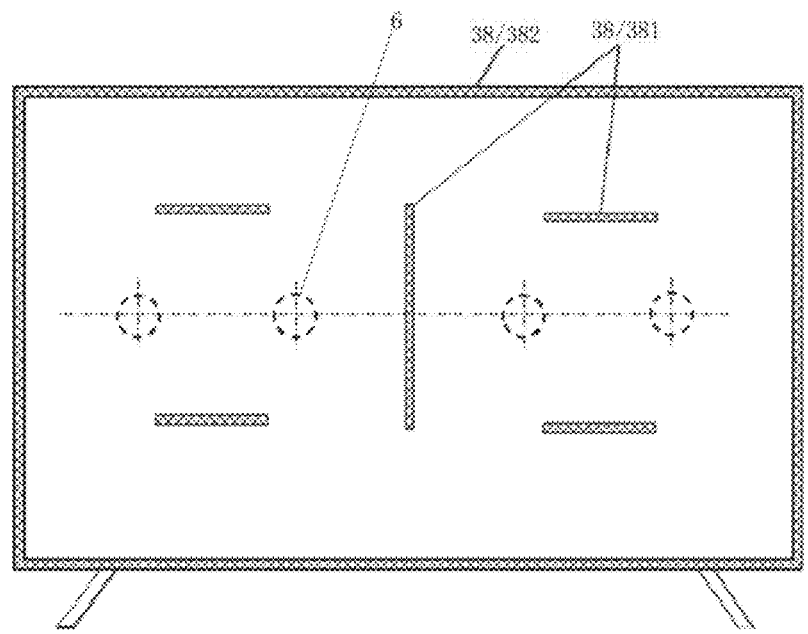
FIG. 54 is a schematic structural diagram of a front view of a display apparatus according to some embodiments of the disclosure.

In some embodiments, FIG. 54 is a schematic structural diagram of a front view of a display apparatus according to some embodiments of the disclosure. With reference to FIGS. 6, 19 and 54, the display apparatus further includes a middle bezel backplane 37. The middle bezel backplane 37 is located at a side, far away from the backlight module 2, of the sound-emitting board 5; and a buffer structure 38 is arranged between the middle bezel backplane 37 and the sound-emitting board 5.

In some embodiments, related circuit boards, supports, shells and the like are all mounted on the middle bezel backplane 37. The buffer structure 38, such as a double-sided tape, can implement buffering between the sound-emitting plate 5 and the middle bezel backplane 37. The buffer structure 38 is bonded between the middle bezel backplane 37 and the sound-emitting plate 5, thus avoiding the case that vibration is transmitted to the middle bezel backplane 37 through the sound-emitting plate 5 and a structure on the middle bezel backplane 37 is affected. Illustratively, after the circuit board mounted on the middle bezel backplane 37 is subjected to vibration, electrical devices on the circuit board are prone to have problems such as poor electrical contact, thus affecting display stability of the display apparatus. In addition, mechanical structures such as the supports mounted on the middle bezel backplane 37 are prone to have problems such as displacement and falling off after vibration, thus affecting mechanical stability of the display apparatus. Thus, the overall electrical stability and mechanical stability of the middle bezel backplane 37 can be improved by using the buffer structure 38. In addition, with reference to FIGS. 13 and 19, a hole may be provided in a middle of the sound-emitting board 5 for wire outlet of the backlight module 2.

In some embodiments, with reference to FIGS. 6 and 54, a position of a bezel of the liquid crystal display panel 1 is provided with the buffer structure 38, and/or a position adjacent to the sound-emitting exciter 6 is provided with the buffer structure 38.

In some embodiments, a position between the middle bezel backplane 37 and the sound-emitting plate 5 and at a peripheral bezel of the liquid crystal display panel 1 is provided with a second buffer structure 382, for example, by bonding with a double-sided tape, hard structures of the middle bezel backplane 37 and the sound-emitting plate 5 are prevented from generating noise when colliding with each other. In addition, the position adjacent to the sound-emitting exciter 6 may be also provided with the first buffer structure 381, such as a double-sided tape. The first buffer structure 381 may be arranged to be more flexible than the second buffer structure 382, to adapt to a large amplitude in the region where the sound-emitting exciter 6 is located. As shown in FIG. 54, the second buffer structure 382 may be located at a position of a center of the liquid crystal display panel 1 and close to the peripheral bezel of the liquid crystal display panel 1, or the second buffer structure 382 may be located at other positions, which is not specifically limited in some embodiments of the disclosure.

It should be noted that the buffer structures 38 may be arranged at both the position of the bezel of the liquid crystal display panel 1 and the position adjacent to the sound-emitting exciter 6, or the buffer structure 38 may be merely arranged at the position of the bezel of the liquid crystal display panel 1, or the buffer structure 38 may be merely arranged at the position adjacent to the sound-emitting exciter 6, which is not specifically limited in some embodiments of the disclosure.

Figure 55:
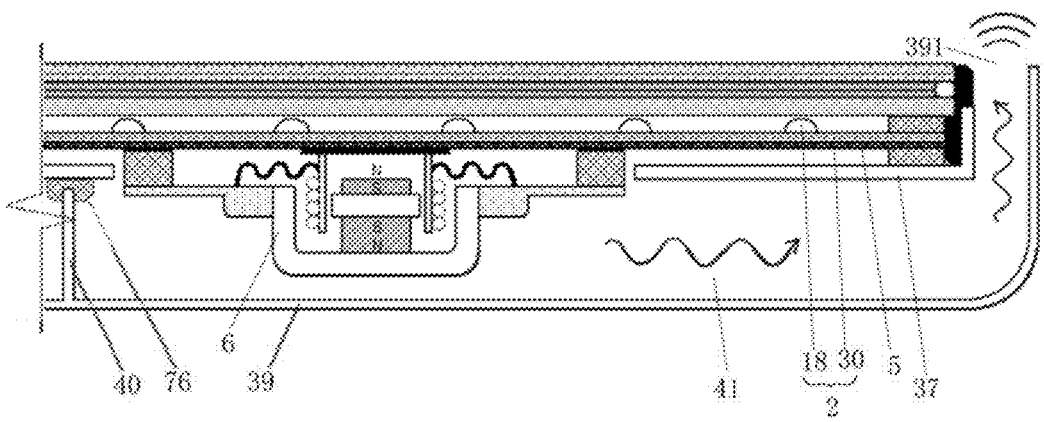
FIG. 55 is yet another schematic structural diagram of a section of a display apparatus according to some embodiments of the disclosure.

FIG. 55 is yet another schematic structural diagram of a section of a display apparatus according to some embodiments of the disclosure. As shown in FIG. 55, on the basis of the embodiments described above, the display apparatus further includes a rear shell 39. The display apparatus includes a middle bezel backplane 37 located at a side, far away from the backlight module 2, of the sound-emitting board 5; and at least a portion of the rear shell 39 is located at sides, far away from the sound-emitting board 5, of the middle bezel backplane 37 and the sound-emitting exciter 6. Specifically, the rear shell 39 is an appearance housing of the display apparatus. The display apparatus may be, for example, but not limited to, a television.

Figure 56:
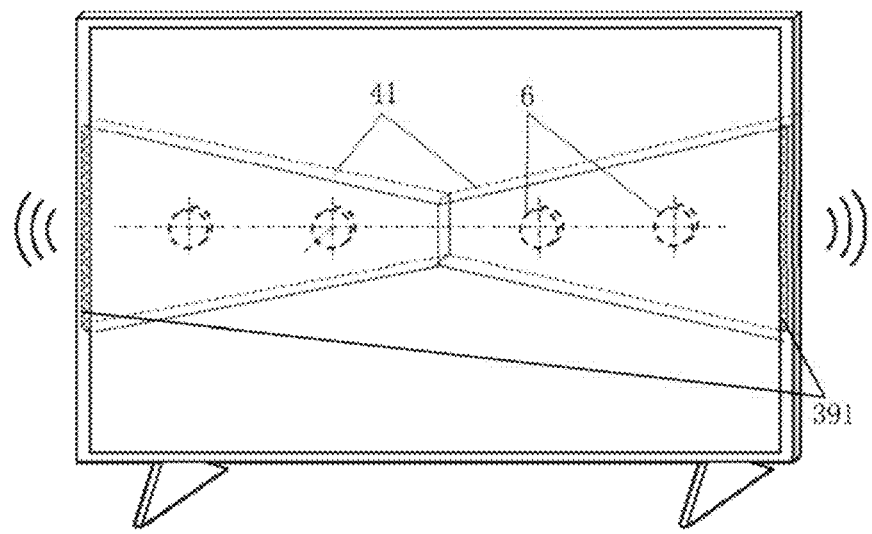
FIG. 56 is another schematic structural diagram of a front view of a display apparatus according to some embodiments of the disclosure.

In some embodiments, FIG. 56 is another schematic structural diagram of a front view of a display apparatus according to some embodiments of the disclosure. With reference to FIGS. 55 and 56, a separation wall 40 is arranged between the middle bezel backplane 37 and the rear shell 39. A backward radiation superposition cavity 41 is formed among the separation wall 40, the rear shell 39 and the middle bezel backplane 37; and the backward radiation superposition cavity 41 is provided with a sound output opening facing a front or a lateral side of the display apparatus.

In some embodiments, different from a traditional piston speaker, the display apparatus of the disclosure emits sound in the form of distribution mode loudspeaker (DML) multi-mode resonant flexural waves, and the sound waves have superposition enhancement. The display apparatus according to some embodiments of the disclosure has backward high-frequency enhancement design. The separation wall 40 is arranged between the rear shell 39 and the middle bezel backplane 37 of the display apparatus. A contact surface between the separation wall 40 and the middle bezel backplane 37 is provided with soundproof sponge 76; and the backward radiation superposition cavity 41 with a required shaped is formed among the separation wall 40, the rear shell 39 and the middle bezel backplane 37. The backward radiation superposition cavity 41 is provided with a sound output opening. The sound output opening faces a front of the screen of the display apparatus as shown in FIGS. 55 and 56. In this way, a sound resonance cavity formed by using the backward radiation superposition cavity 41 guides backward vibration multi-mode high-frequency vibration flexural waves to a front or a lateral side of the screen to emit sound. Thus, the response at a resonance frequency can be improved to make up for a high-frequency loss of sound emitting of the display apparatus.

Figure 57:
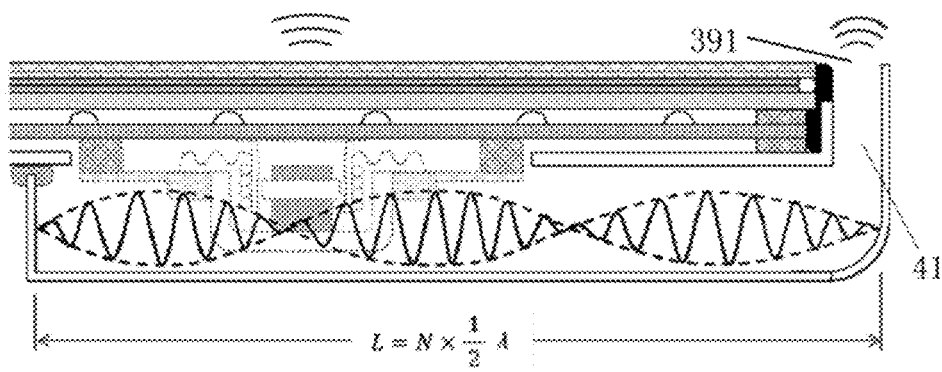
FIG. 57 is yet another schematic structural diagram of a section of a display apparatus according to some embodiments of the disclosure.
Figure 58:
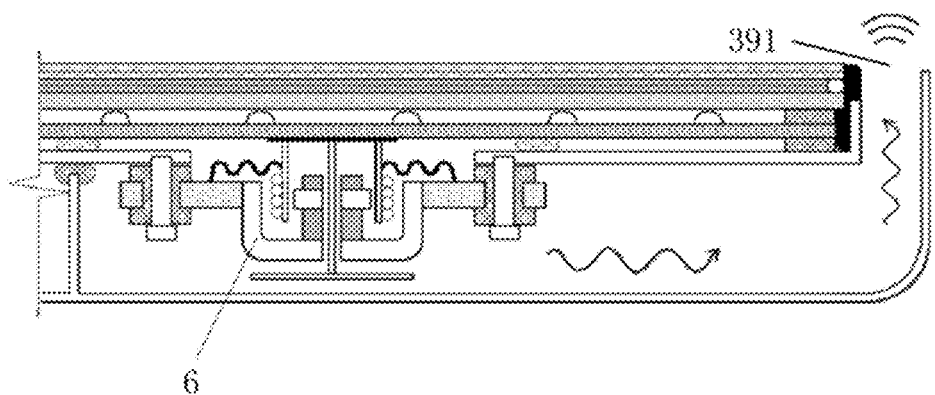
FIG. 58 is yet another schematic structural diagram of a section of a display apparatus according to some embodiments of the disclosure.

FIG. 57 is yet another schematic structural diagram of a section of a display apparatus according to some embodiments of the disclosure. With reference to FIGS. 55-57, a length L on a sound output path of the backward radiation superposition cavity 41 may be set as a length of N half sound wavelengths. A sound frequency of this wavelength is a lowest resonance frequency of a compensation frequency band, and a position of the sound output opening may be near antinode of any half sound wavelength. In addition, FIG. 58 is yet another schematic structural diagram of a section of a display apparatus according to some embodiments of the disclosure. As shown in FIG. 58, the sound-emitting exciter 6 may be the sound-emitting exciter 6 having the structure shown in FIG. 10. A back diaphragm of the sound-emitting exciter 6 may radiate additional high-frequency sound waves, thus further improving the high-frequency response of the display apparatus.

Figure 59:
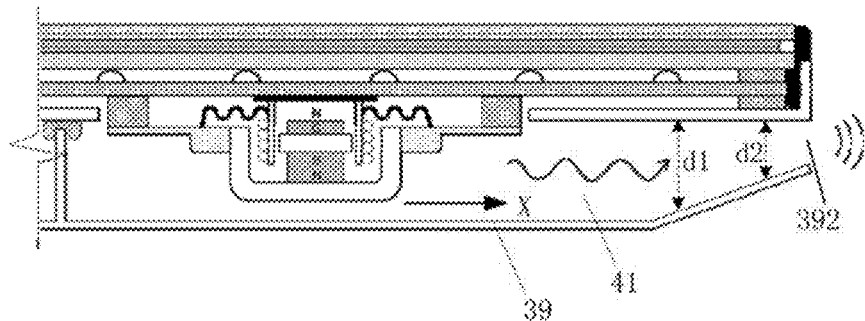
FIG. 59 is yet another schematic structural diagram of a section of a display apparatus according to some embodiments of the disclosure.
Figure 60:
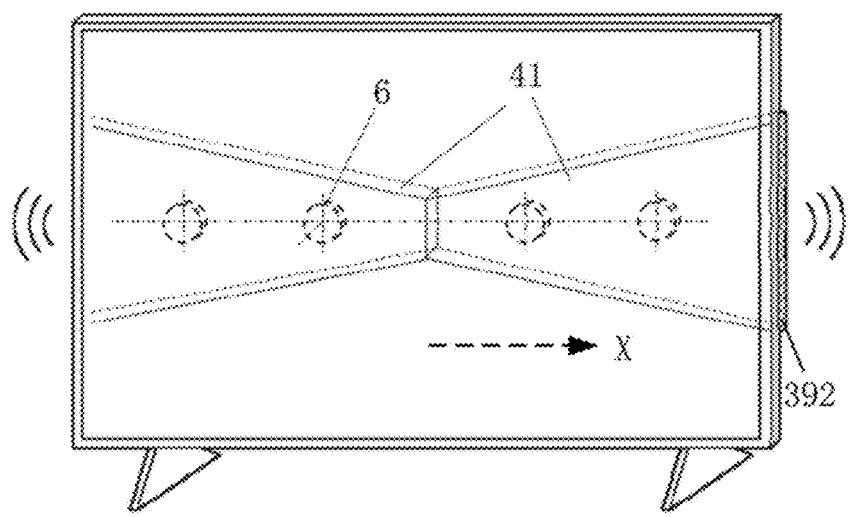
FIG. 60 is yet another schematic structural diagram of a front view of a display apparatus according to some embodiments of the disclosure.

In some embodiments, FIG. 59 is yet another schematic structural diagram of a section of a display apparatus according to some embodiments of the disclosure. FIG. 60 is yet another schematic structural diagram of a front view of a display apparatus according to some embodiments of the disclosure. With reference to FIGS. 59 and 60, by arranging a shape of the rear shell 39, the backward radiation superposition cavity 41 may be arranged to be provided with a sound output opening facing the lateral side of the display apparatus. Similarly, the sound resonance cavity formed by using the backward radiation superposition cavity 41 may be used to guide backward vibration multi-mode high-frequency vibration flexural waves to the lateral side of the screen to emit sound. Thus, the response at a resonance frequency is improved to make up for a high-frequency loss of sound emitting of the display apparatus. In addition, wavy arrows in FIGS. 55, 58 and 59 indicate a propagation direction of sound.

Thus, according to some embodiments of the disclosure, the sound-emitting board 5 and the two sealed air cavities with internally viscous air are utilized, such that the sound-emitting exciter 6 can transmit vibration to the front panel of the liquid crystal display panel 1 through the sound-emitting board 5, the backlight module 2, the second sealed air cavity 4 and the first sealed air cavity 3 successively, and the liquid crystal display panel 1 vibrates and emits sound accordingly. Since the vibration output terminal 7 of the sound-emitting exciter 6 is fixed to the surface, far away from the backlight module 2, of the sound-emitting board 5, an arrangement of the sound-emitting exciter 6 has no influence on display on the display apparatus, so that sound emitting of a traditional liquid crystal display panel is made probable, the user is provided with audio-visual experience of sound-image synchronization that sound is emitted from an image, and an industrial bottleneck problem that sound emitting of the liquid crystal display screen is difficult to implement is overcome. In addition, the backward radiation superposition cavity 41 is formed among the separation wall 40, the rear shell 39 and the middle bezel backplane 37. The sound resonance cavity formed by using the backward radiation superposition cavity 41 guides backward vibration multi-mode high-frequency vibration flexural waves to the front or the lateral side of the screen to emit sound. Thus, the response at a resonance frequency can be improved to make up for a high-frequency loss of sound emitting of the display apparatus.

In some embodiments, with reference to FIGS. 55-60, at least one sound-emitting exciter 6 may be arranged in the backward radiation superposition cavity 41.

In some embodiments, one sound-emitting exciter 6 may be arranged in one backward radiation superposition cavity 41 as shown in FIG. 55, or a plurality of sound-emitting exciters 6 may be arranged in one backward radiation superposition cavity 41 as shown in FIG. 56. When the sound-emitting exciter(s) 6 is arranged in the backward radiation superposition cavity 41, forward sound or lateral sound may be generated by the sound-emitting exciters 6 in the backward radiation superposition cavity 41, and sound propagated from the resonance cavity formed by other backward radiation superposition cavities 41 may also be superimposed. Sound produced in different cavities may be propagated outwards through the same sound output opening. The number of sound-emitting exciters 6 in the backward radiation superposition cavity 41 may be adjusted according to the forward or lateral sound-emitting demand of the display apparatus, which is not specifically limited in some embodiments of the disclosure.

In addition, the sound-emitting exciter 6 may not arranged in some backward radiation superposition cavities 41, and these backward radiation superposition cavities 41 may be provided with the forward sound output opening or the lateral sound output opening as described in the foregoing embodiments. In this case, sound propagated from a resonance cavity formed by other backward radiation superposition cavities 41 that are provided with the sound-emitting exciters 6 may be used to achieve guiding the backward vibration multi-mode high-frequency vibration flexural waves to the front or the lateral side of the screen to emit sound. Thus, the response at a resonance frequency is improved to make up for a high-frequency loss of sound emitting of the display apparatus.

In some embodiments, with reference to FIGS. 55-58, the backward radiation superposition cavity 41 is provided with a forward sound output opening facing the front of the display apparatus, the rear shell 39 is arranged to cover a bezel of the liquid crystal display panel 1, and a gap between the rear shell 39 and the bezel of the liquid crystal display panel 1 forms the forward sound output opening 391.

In some embodiments, with reference to FIGS. 55-58, the backward radiation superposition cavity 41 is provided with the forward sound output opening 391 facing the front of the display apparatus, the rear shell 39 is arranged to cover the bezel of the liquid crystal display panel 1. The rear shell 39 may be arranged to cover an upper bezel, a lower bezel, a left bezel and a right bezel of the display apparatus in a direction parallel to a plane of the liquid crystal display sound-emitting device, or the rear shell 39 may be arranged to cover a bezel of the display apparatus at any optional position, which is not limited in some embodiments of the disclosure. The gap formed between the rear shell 39 and the bezel of the liquid crystal display panel 1 forms the forward sound output opening 391. In this way, a sound resonance cavity is formed by the backward radiation superposition cavity 41, and backward vibration multi-mode high-frequency vibration flexural waves are guided to a front of the screen to emit sound. Thus, the response at a resonance frequency can be improved to make up for a high-frequency loss of sound emitting of the display apparatus. It should be noted that the forward sound output opening 391 is not limited to the structure shown in FIGS. 28 to 31, and may also be implemented by other structures, which is not specifically limited in some embodiments of the disclosure.

In some embodiments, with reference to FIGS. 59 and 60, the backward radiation superposition cavity 41 is provided with a lateral sound output opening 392 facing the lateral side of the display apparatus; and the rear shell 39 is located at the side, far away from the sound-emitting board 5, of the middle bezel backplane 37. A distance from a portion, adjacent to a bezel of the display apparatus, of the rear shell 39 to the middle bezel backplane 37 gradually decreases in a direction X from a geometric center of the display apparatus to the bezel of the display apparatus; and a gap between the rear shell 39 and the middle bezel backplane 37 forms the lateral sound output opening 392 at a position of the bezel of the display apparatus.

In some embodiments, with reference to FIGS. 59 and 60, by arranging a shape of the rear shell 39, the backward radiation superposition cavity 41 is provided with a lateral sound output opening 392 facing the lateral side of the display apparatus, and the rear shell 39 is located at the side, far away from the sound-emitting board 5, of the middle bezel backplane 37. As shown in FIG. 59, the distance from a portion, adjacent to the bezel of the display apparatus, of the rear shell 39 to the middle bezel backplane 37 gradually decreases in the direction X from the geometric center of the display apparatus to the bezel of the display apparatus. In the direction X from the geometric center of the display apparatus to the bezel of the display apparatus, the rear shell 39 gradually converges to the position close to the middle bezel backplane 37, and has a sound convergence effect, that is, a distance d1 is greater than a distance d2 in FIG. 59. The gap formed between the rear shell 39 and the middle bezel backplane 37 forms the lateral sound output opening 392 at the position of the bezel of the display apparatus. In this way, a sound resonance cavity formed by the backward radiation superposition cavity 41 guides backward vibration multi-mode high-frequency vibration flexural waves to a lateral side of the screen to emit sound. Thus, the response at a resonance frequency can be improved to make up for a high-frequency loss of sound emitting of the display apparatus. It should be noted that the lateral sound output opening 392 is not limited to the structure shown in FIGS. 59 to 60, and may also be implemented by other structures, which is not specifically limited in some embodiments of the disclosure.

Figure 61:
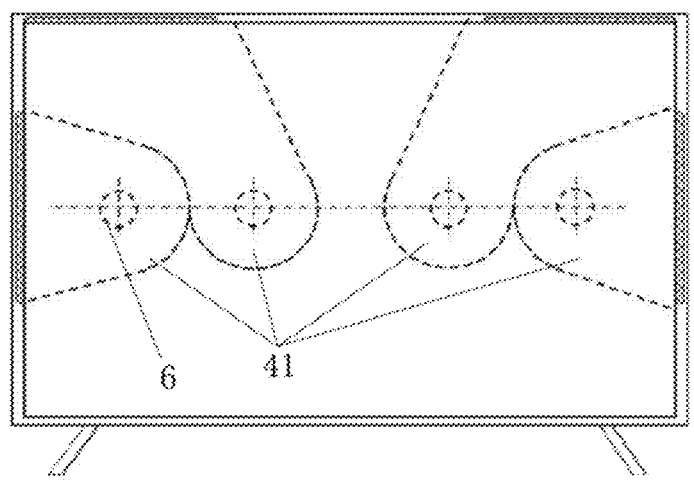
FIG. 61 is yet another schematic structural diagram of a front view of a display apparatus according to some embodiments of the disclosure.
Figure 62:
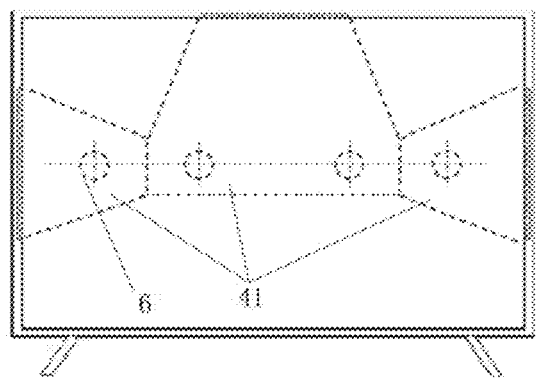
FIG. 62 is yet another schematic structural diagram of a front view of a display apparatus according to some embodiments of the disclosure.

FIG. 61 is yet another schematic structural diagram of a front view of a display apparatus according to some embodiments of the disclosure. FIG. 62 is yet another schematic structural diagram of a front view of a display apparatus according to some embodiments of the disclosure. With reference to FIGS. 60-62, the backward radiation superposition cavity 41 may be arranged in a trumpet-like shape to improve the sound propagation efficiency in the backward radiation superposition cavity 41.

In some embodiments, with reference to FIGS. 55-62, the separation wall 40 is arranged in a direction perpendicular to the display apparatus; and a surface, perpendicular to the display apparatus, of the separation wall 40 is a flat surface or a cambered surface.

In some embodiments, with reference to FIGS. 55-62, the surface, perpendicular to the display apparatus, of the separation wall 40 is the flat surface or the cambered surface, and the separation wall 40 may form the backward radiation superposition cavity 41 together with the rear shell 39 and the middle bezel backplane 37. In this way, a resonance cavity is formed by using the backward radiation superposition cavity 41, and backward vibration multi-mode high-frequency vibration flexural waves are guided to a front or a lateral side of the screen to emit sound. Thus, the response at a resonance frequency can be improved to make up for a high-frequency loss of sound emitting of the display apparatus. Illustratively, the surface, perpendicular to the display apparatus, of the separation wall 40 may be a flat surface as shown in FIGS. 55-60 and FIG. 62. The surface, perpendicular to the display apparatus, of the separation wall 40 may also be a cambered surface with curvature as shown in FIG. 61. In addition, the surface, perpendicular to the display apparatus, of the separation wall 40 as shown in FIG. 56 may include a flat surface portion and a cambered surface portion, which is not limited in some embodiments of the disclosure.

In some embodiments, as shown in FIG. 55, a sound insulation buffer structure 76 is arranged between the separation wall 40 and the middle bezel backplane 37.

In some embodiments, during sound emitting of the display apparatus, the backward radiation superposition cavity 41 formed by the middle bezel backplane 37, the separation wall 40 and the rear shell 39 constitutes a sound resonance cavity, such that vibration the screen of the display apparatus may cause vibration of the rear shell 39, and the middle bezel backplane 37 and the separation wall 40 in the backward radiation superposition cavity 41 may also vibrate. Since the separation wall 40 and the middle bezel backplane 37 are both hard structures, the separation wall and the middle bezel backplane may collide and generate noise in a process of vibration. In order to eliminate noise, the sound insulation buffer structure 76 is arranged between the separation wall 40 and the middle bezel backplane 37, thus effectively preventing a rigid contact between the separation wall 40 and the middle bezel backplane 37 and avoiding influence of the noise on the sound quality of the display apparatus. The sound insulation buffer structure 76 may be, for example, soundproof sponge or foam, which is not specifically limited in some embodiments of the disclosure.

Figure 63:
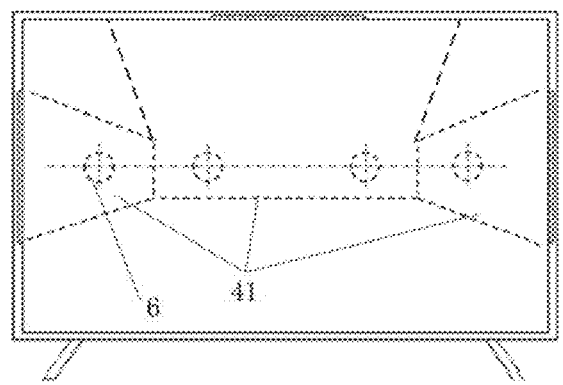
FIG. 63 is yet another schematic structural diagram of a front view of a display apparatus according to some embodiments of the disclosure.

FIG. 63 is yet another schematic structural diagram of a front view of a display apparatus according to some embodiments of the disclosure. In some embodiments, with reference to FIG. 56, and FIGS. 60-63, an area of a section, in a direction perpendicular to the display apparatus, of the backward radiation superposition cavity 41 gradually increases in a direction from a geometric center of the display apparatus to the sound output opening.

In some embodiments, the display apparatus is generally rectangular, and the geometric center of the display apparatus corresponds to a geometric center of the rectangle. The area of the section, in the direction perpendicular to the display apparatus, of the backward radiation superposition cavity 41 gradually increases in the direction from the geometric center of the display apparatus to the sound output opening, that is, an area of the section, at a position close to the sound output opening, of the backward radiation superposition cavity 41 is greater than an area of the section, at a position close to the geometric center of the display apparatus, of the backward radiation superposition cavity 41. That is, the backward radiation superposition cavity 41 is trumpet-shaped. On the basis of making up for the high-frequency loss of the sound emitting of the display apparatus, a forward or lateral sound-emitting volume of the display apparatus can be further optimized.

Illustratively, two backward radiation superposition cavities 41 shown in FIGS. 56 and 60 and backward radiation superposition cavities 41 at left and right positions shown in FIGS. 61 to 63 all may be arranged to satisfy as follows: an area of a section, in a direction perpendicular to the display apparatus, of the backward radiation superposition cavity 41 gradually increases in the direction from the geometric center of the display apparatus to the sound output opening. In addition, a part of the backward radiation superposition cavity 41 may be arranged to satisfy as follows: the area of the section, in the direction perpendicular to the display apparatus, of the backward radiation superposition cavity 41 gradually increases in the direction from the geometric center of the display apparatus to the sound output opening. For example, for two middle backward radiation superposition cavities 41 shown in FIG. 61, merely an upper region of the backward radiation superposition cavity 41 satisfies the foregoing sectional area change rule. For example, for a middle backward radiation superposition cavity 41 shown in FIG. 63, merely an upper region of the backward radiation superposition cavity 41 satisfies the foregoing sectional area change rule. That is, in some embodiments of the disclosure, not all regions of the backward radiation superposition cavity 41 are required to satisfy foregoing sectional area change rule. In addition, when the display apparatus includes a plurality of backward radiation superposition cavities 41, merely a part of the backward radiation superposition cavities 41 may be set to satisfy the foregoing sectional area change rule. For example, for an upper region of a middle backward radiation superposition cavity 41 shown in FIG. 62, the area of the section, in the direction perpendicular to the display apparatus, of the upper region gradually decreases in the direction from the geometric center of the display apparatus to the sound output opening.

With reference to FIGS. 60-63, in some embodiments, the display apparatus includes a plurality of backward radiation superposition cavities 41, and at least a part of the backward radiation superposition cavities 41 are symmetrically distributed in the display apparatus.

In some embodiments, with reference to FIGS. 60-63, the display apparatus may be arranged to include the plurality of backward radiation superposition cavities 41. For example, FIG. 60 shows two backward radiation superposition cavities 41, and the two backward radiation superposition cavities 41 are symmetrically arranged with respect to a vertical center line of the display apparatus. FIG. 61 shows four backward radiation superposition cavities 41, and two backward radiation superposition cavities 41 on the left and two backward radiation superposition cavities 41 on the right are symmetrically arranged with respect to the vertical center line of the display apparatus. FIGS. 62 and 63 show three backward radiation superposition cavities 41, and a left backward radiation superposition cavity 41 and a right backward radiation superposition cavity 41 are symmetrically arranged with respect to the vertical center line of the display apparatus. Thus, at least a part of the backward radiation superposition cavities 41 are symmetrically distributed in the display apparatus. An increase in the number and symmetrical arrangement of the backward radiation superposition cavities 41 may make sound propagating in multiple directions pass through the resonance cavity. The resonance cavity guides the backward vibration multi-mode high-frequency vibration flexural waves to the front or the lateral side of the screen to emit sound, thus further making up for the high-frequency loss of the sound emitting of the display apparatus, and improving the sound quality of the display apparatus. In addition, sound uniformity of the display apparatus is enhanced by using the symmetrically distributed backward radiation superposition cavities 41, and overall sound-emitting uniformity of the display apparatus is desirable.

Figure 64:
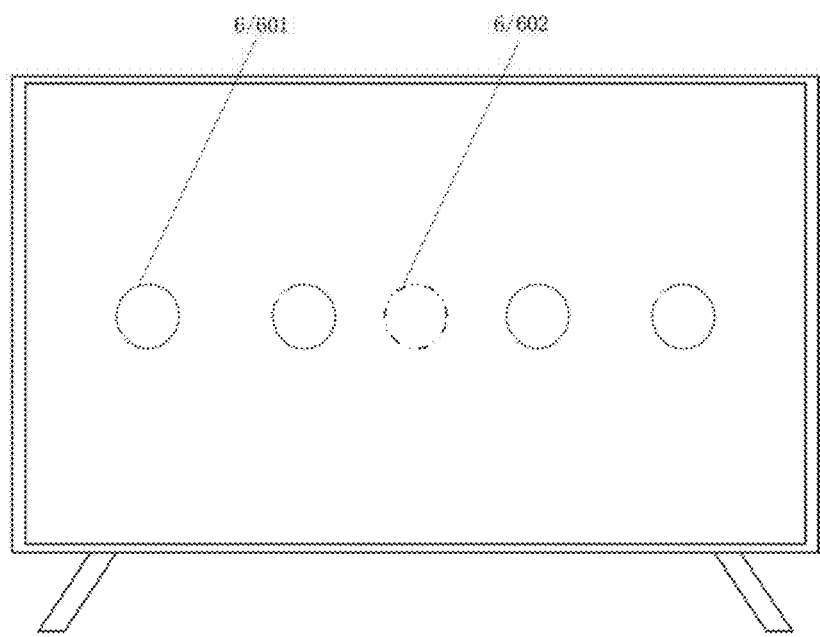
FIG. 64 is yet another schematic structural diagram of a front view of a display apparatus according to some embodiments of the disclosure.
Figure 65:
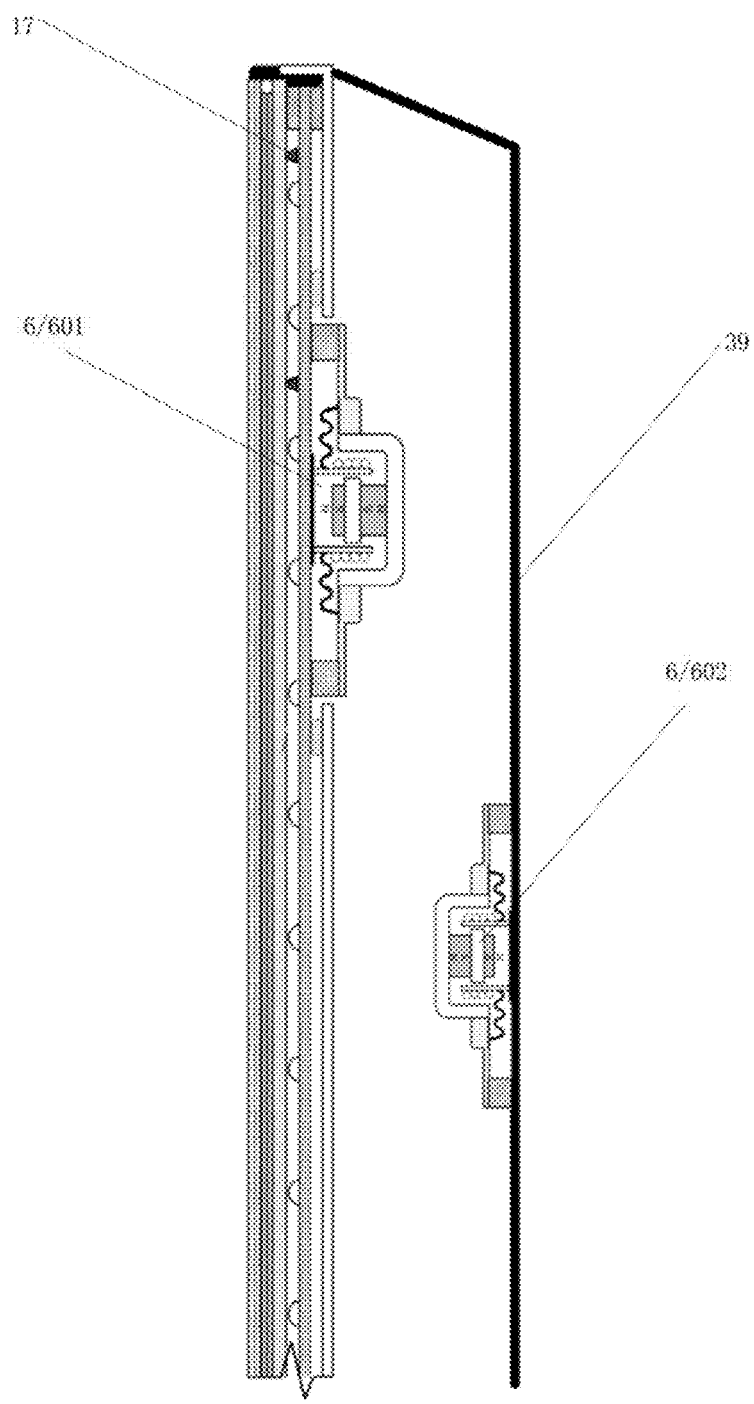
FIG. 65 is still another schematic diagram of a three-dimensional structure of a display apparatus according to some embodiments of the disclosure.

FIG. 64 is yet another schematic structural diagram of a front view of a display apparatus according to some embodiments of the disclosure. FIG. 65 is a schematic diagram of a three-dimensional structure of a display apparatus according to some embodiments of the disclosure. With reference to FIGS. 64 and 65, the rear shell 39 is provided with the sound-emitting exciter 6, and the sound-emitting exciter 6 is configured to excite the rear shell 39 to vibrate.

Specifically, the display apparatus is in a vibration state when emitting sound. When a housing of the display apparatus is an integral rear shell 39, certain resonance inevitably occurs since an area of the rear shell 39 is equivalent to an area of the screen. This resonance frequency is the same as a frequency of the screen and is also in an audible band, and sound emitted by the rear shell 39 may also be heard, resulting in similar noise. In order to eliminate this noise, in some embodiments of the disclosure, the rear shell 39 is provided with the sound-emitting exciter 6. The sound-emitting exciter 6 is configured to excite the rear shell 39 to vibrate. The sound-emitting exciter 601 that drives the screen to emit sound is distinguished from the sound-emitting exciter 602 that drives the rear shell 39 to emit sound, and the sound-emitting exciter 601 and the sound-emitting exciter 602 may be arranged in opposite directions, that is, the sound-emitting exciter 601 for vibrating the screen is bonded to the sound-emitting board 5, and the sound-emitting exciter 602 for vibrating the rear shell 39 is bonded to the rear shell 39.

When the vibration of the screen causes the vibration of the rear shell 39, the vibration of the rear shell 39 may be reduced by finding a maximum vibration point and applying drive force of reverse vibration on the vibration point. A vibration mode of panel vibration transmitted to the rear shell 39 is not linear and is reflected in two aspects. One is an amplitude, for example, a vibration amplitude of the panel at 100 Hz is 0.2 mm, a vibration amplitude at 1000 Hz is 0.05 mm, and the vibration amplitude at 100 Hz may be amplified to 0.4 mm through resonance after being transmitted to the rear shell 39. The resonance of the rear shell 39 is mainly concentrated at a low frequency end, and the vibration at 1000 Hz may be attenuated to 0.02 mm accordingly. In addition, since the transmission from the screen to the rear shell 39 goes through a complicated relation such as the middle bezel backplane and the screw, there are also phase changes besides the above amplitude difference. For example, a phase difference at 100 Hz is 180°, that is, the rear shell 39 is opposite to the screen, and the phase difference at 1000 Hz is merely 120°.

The vibration amplitude and phase relation are not fixed, and both change with a complete machine structure and materials of the display apparatus. A maximum amplitude region is obtained through testing, a correlation of the amplitude and the phase of the maximum vibration region with screen vibration is determined, and then, a correlation function F(x) between the sound-emitting exciter 601 for the rear shell 39 and the sound-emitting exciter 602 for the screen is obtained. The F(x) is processed and applied to a signal processing link where the sound-emitting exciter 601 for vibrating the rear shell 39 is located. For implementation of F(x), frequency points of the vibration of the rear shell 39 are obtained through testing. It is assumed that n frequency points with the largest vibration amount are taken, and filters f0, f1, f2, . . . , fn are arranged with the vibration frequency as the center. A difference between a vibration spectrum feature of the rear shell 39 in each frequency band and a signal feature at the same frequency of the sound-emitting exciter 6 is tested, and a vibration frequency domain transfer function from the sound-emitting exciter 6 to the rear shell 39 in this frequency band is obtained. A delay of vibration from the sound-emitting exciter 6 to the rear shell 39 at a center frequency of this frequency band is tested and Δt is obtained. In this way, a plurality of frequency bands are accumulated, and the vibration transfer function from the sound-emitting exciter 6 to the rear shell 39 in the entire frequency response range is obtained.

Figure 66:
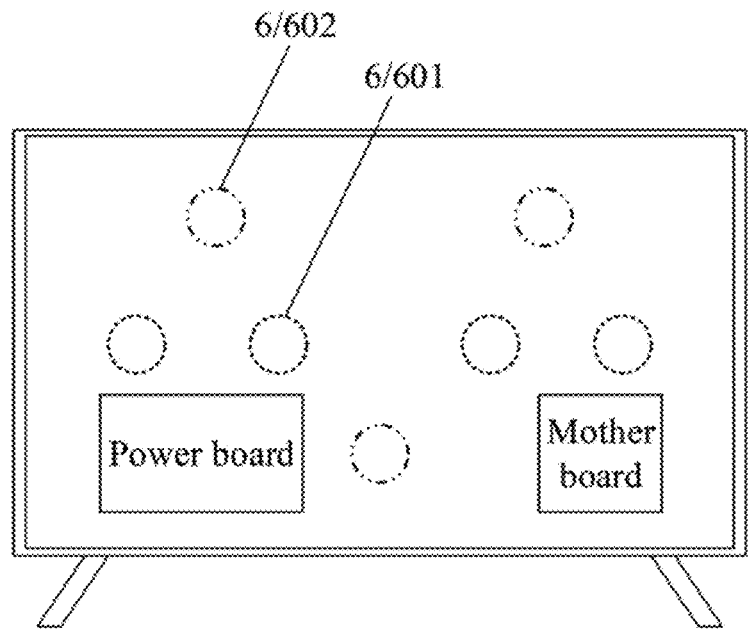
FIG. 66 is yet another schematic structural diagram of a front view of a display apparatus according to some embodiments of the disclosure.
Figure 67:
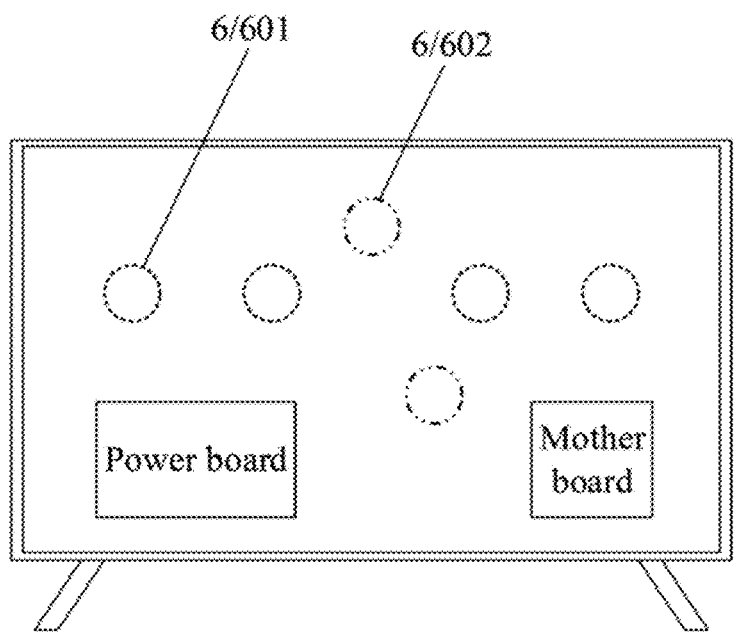
FIG. 67 is yet another schematic structural diagram of a front view of a display apparatus according to some embodiments of the disclosure.

FIG. 66 is yet another schematic structural diagram of a front view of a display apparatus according to some embodiments of the disclosure. FIG. 67 is yet another schematic structural diagram of a front view of a display apparatus according to some embodiments of the disclosure. Specifically, according to measurement of an actual maximum vibration region, the sound-emitting exciter 601 is arranged near the maximum vibration region. An arrangement region may be single-point as shown in FIG. 58, and multi-point as shown in FIGS. 66 and 67; and the arrangement region may be symmetrical or asymmetrical, which is not specifically limited in the embodiments of the disclosure.

Figure 68:
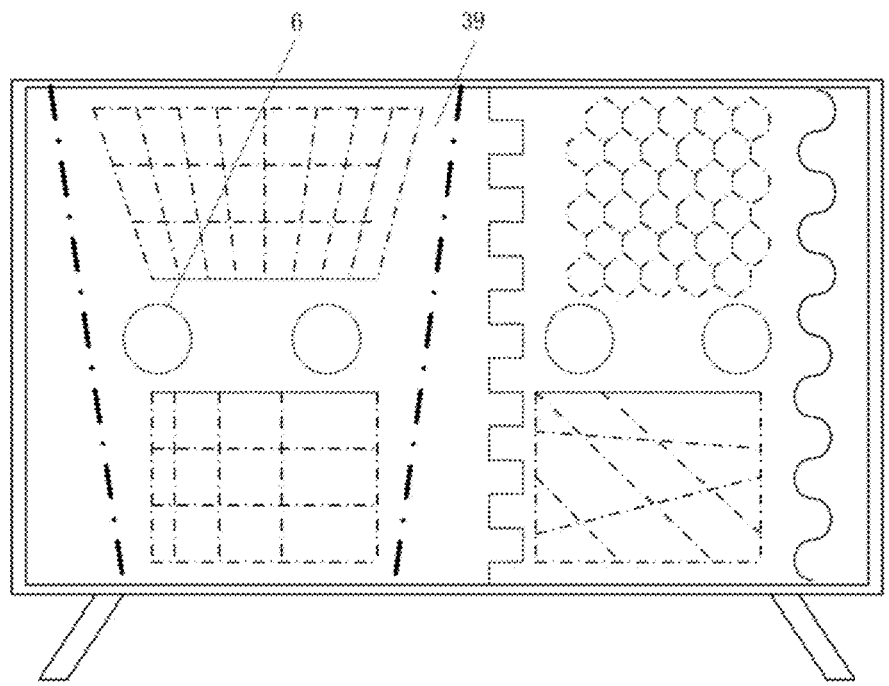
FIG. 68 is yet another schematic structural diagram of a front view of a display apparatus according to some embodiments of the disclosure.
Figure 69:
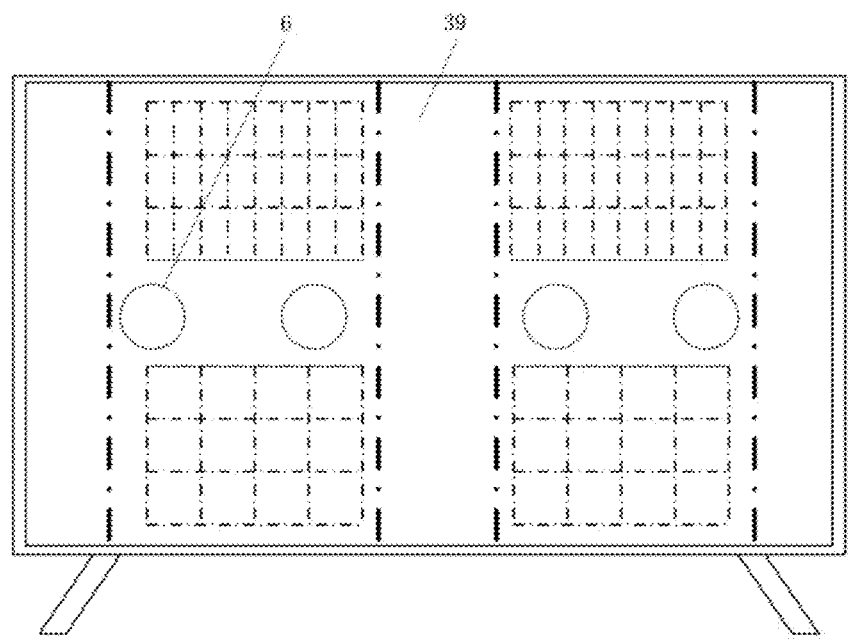
FIG. 69 is yet another schematic structural diagram of a front view of a display apparatus according to some embodiments of the disclosure.

In some embodiments, FIG. 68 is yet another schematic structural diagram of a front view of a display apparatus according to some embodiments of the disclosure. As shown in FIG. 68, a surface, adjacent to the middle bezel backplane, of the rear shell 39 is provided with a plurality of reinforcement ribs, and the reinforcement ribs are unevenly distributed. Specifically, in order to ensure smaller vibration of the rear shell 39, some treatments need to be done on the rear shell 39 to limit the rear shell 39 from generating large resonance. FIG. 69 is yet another schematic structural diagram of a front view of a display apparatus according to some embodiments of the disclosure. In order to satisfy the requirements of flatness and rigidity of a traditional rear shell 39, mesh-like reinforcement ribs are added in a large area with the same thickness inside the rear shell 39, as shown in FIG. 69. A thick dash-dot line indicates a high reinforcement rib, and a thin dash-dot line indicates a low reinforcement rib. The traditional reinforcement ribs adopt a continuous grid-like structure of a regular square or rectangular shape, design of the reinforcement ribs is simple, and thickness uniformity of the rear shell 39 can be ensured. However, the rear shell 39 is likely to generate a fixed loudness resonance frequency due to adoption of fixed equidistant division.

In order to reduce this resonance, some embodiments of the disclosure provide non-equally spaced reinforcement rib structure with a fixed shape. As shown in FIG. 68, the reinforcement ribs may have a trapezoidal structure, honeycomb structure, a non-equally spaced rectangle or an irregular polygon. In addition, the high reinforcement ribs may also be obliquely designed. With reference to the embodiments, a point with a maximum vibration amplitude may be tested through simulation or an actual prototype. By changing a shape of a rear reinforcement rib and a height or a width of the reinforcement rib at the maximum vibration position, or even making the reinforcement rib into a convex-concave gear shape, the vibration mode of the rear shell 39 is destroyed to the maximum extent, the resonance amplitude of the rear shell 39 is reduced, and vibration noise is further reduced. The reinforcement ribs with a fixed interval or width have a certain resonance frequency. However, when the resonance frequency is within the audible range of an audio and the screen is excited to vibrate, resonance noise is likely to occur. Through the design of the reinforcement ribs shown in FIG. 68, a natural resonance frequency may be destroyed or reduced, and the resonance frequency is dispersed and cannot produce a maximum at a certain frequency point, thus reducing resonance noise and reducing the requirements of the sound-emitting exciter 6 of the rear shell 39 and the software algorithm F(x) for an audio processing unit of the chip of the display apparatus. It should be noted that the reinforcement ribs may be in a rectangular wave shape, wavy shape, inclined rectilinear shape, etc., and the shape of the reinforcement ribs is not specifically limited in the embodiments of the disclosure.

Figure 70:
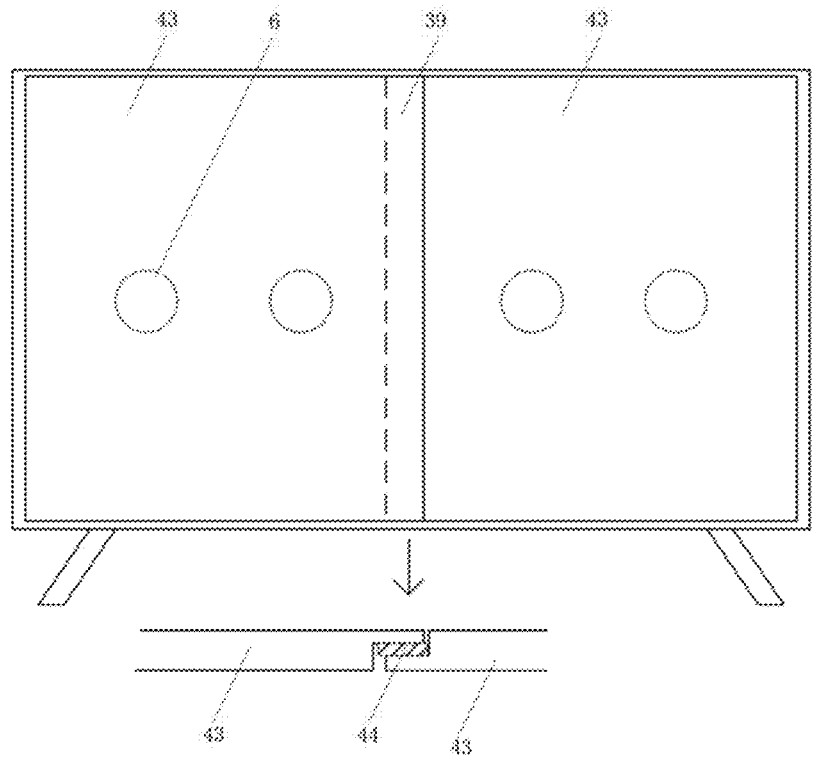
FIG. 70 is yet another schematic structural diagram of a front view of a display apparatus according to some embodiments of the disclosure.
Figure 71:
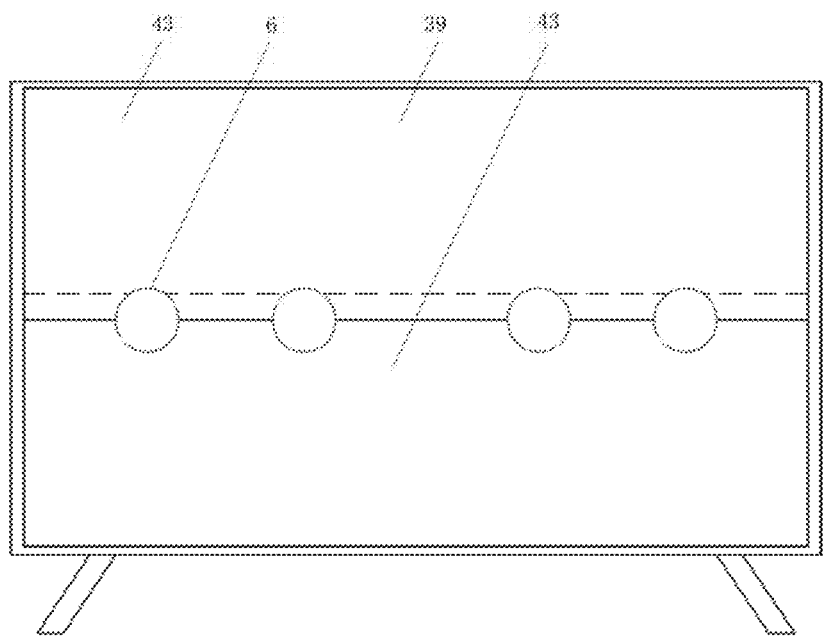
FIG. 71 is yet another schematic structural diagram of a front view of a display apparatus according to some embodiments of the disclosure.

In some embodiments, FIG. 70 is yet another schematic structural diagram of a front view of a display apparatus according to some embodiments of the disclosure. FIG. 71 is yet another schematic structural diagram of a front view of a display apparatus according to some embodiments of the disclosure. With reference to FIGS. 70 and 71, the rear shell 39 is unevenly divided into a plurality of housings 43, and adjacent housings 43 are fixed through a third adhesive buffer structure 44.

Specifically, the vibration of the rear shell 39 mostly occurs at a low frequency band, and the rear shell 39 of a general display apparatus is designed as a whole, and has an area equivalent to an area of the panel. Thus, low-frequency resonance is likely to occur. In some embodiments of the disclosure, the rear shell 39 is designed in sections. As shown in FIG. 70, the rear shell 39 is divided into two sections. The two sections of the rear shell 39 are connected in a staggered way and fixed through the third adhesive buffer structure 44, such as a double-sided foam tape. Thus, the rear shell 39 is divided into two regions with the area reduced by half compared with the original area, the entire rear shell 39 cannot achieve unified resonance, and resonance cannot be formed in a central region where the vibration of the rear shell 39 is weakest. In this way, the rear shell 39 may also be divided into two parts in a lateral direction as shown in FIG. 71, and the rear shell 39 may also be divided into a plurality of sections, such as three or four sections.

Figure 72:
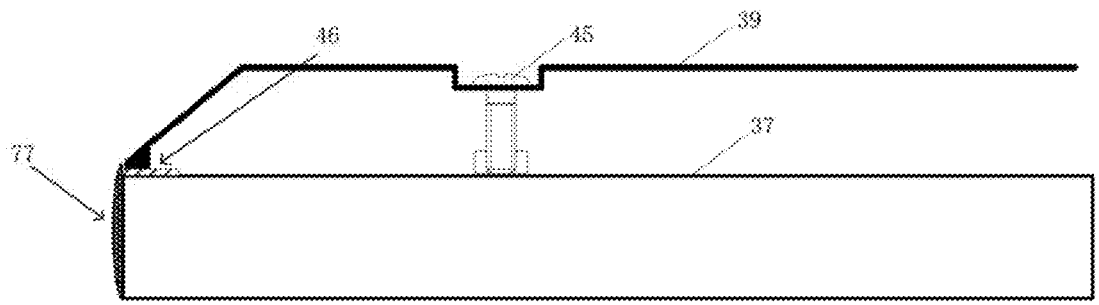
FIG. 72 is yet another schematic structural diagram of a section of a display apparatus according to some embodiments of the disclosure.

In some embodiments, FIG. 72 is yet another schematic structural diagram of a section of a display apparatus according to some embodiments of the disclosure. As shown in FIG. 72, the rear shell 39 is suspended relative to the middle bezel backplane 37 through a hard fixation structure 45. The hard fixation structure 45 is configured to fix the rear shell 39, and a third buffer structure 46 is provided between the rear shell 39 and the middle bezel backplane 37 and corresponding to the position of the bezel of the rear shell 39. Specifically, partial noise in the display apparatus is caused by friction at a contact position between the rear shell 39 and the middle bezel backplane 37. In some embodiments of the disclosure, the rear shell 39 is suspended relative to the middle bezel backplane 37 through the hard fixation structure 45. The hard fixation structure 45 is, for example, a screw. The third buffer structure 46 is arranged between the rear shell 39 and the middle bezel backplane 37 and corresponding to the position of the bezel of the rear shell 39. The third buffer structure 46 is, for example, foam. Rigid contact between the rear shell 39 and the middle bezel backplane 37 is effectively prevented.

Figure 73:
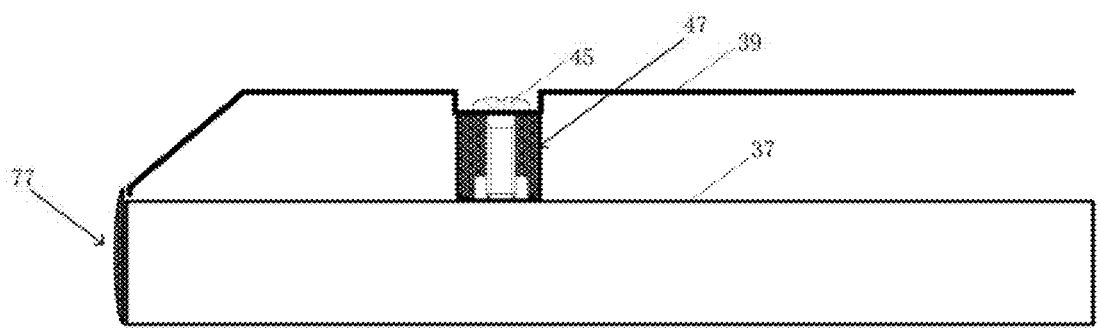
FIG. 73 is yet another schematic structural diagram of a section of a display apparatus according to some embodiments of the disclosure.
Figure 74:
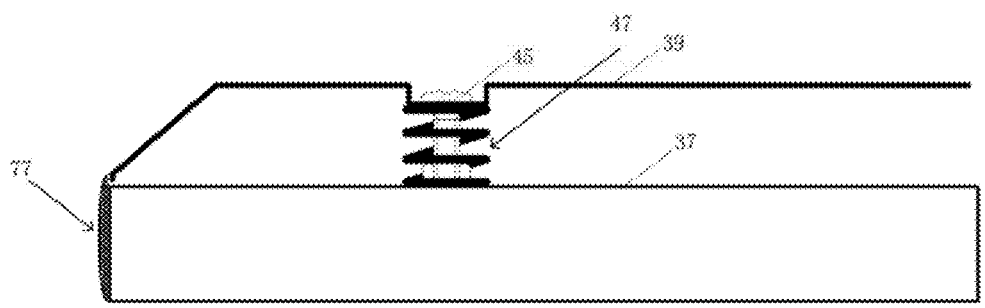
FIG. 74 is yet another schematic structural diagram of a section of a display apparatus according to some embodiments of the disclosure.
Figure 75:
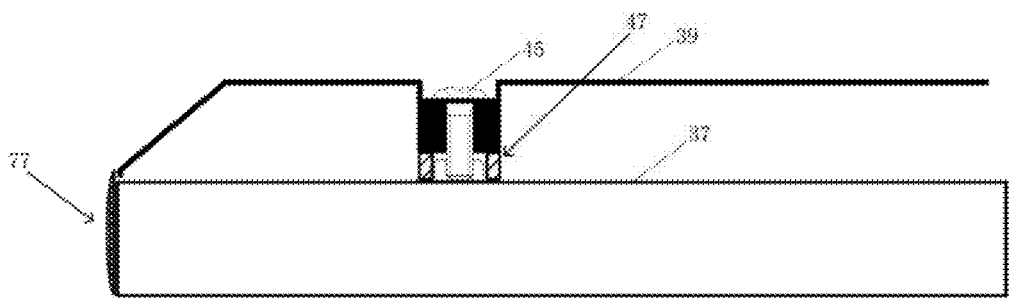
FIG. 75 is yet another schematic structural diagram of a section of a display apparatus according to some embodiments of the disclosure.

In some embodiments, FIG. 73 is yet another schematic structural diagram of a section of a display apparatus according to some embodiments of the disclosure. FIG. 74 is yet another schematic structural diagram of a section of a display apparatus according to some embodiments of the disclosure. FIG. 75 is yet another schematic structural diagram of a section of a display apparatus according to some embodiments of the disclosure. With reference to FIGS. 73-75, the rear shell 39 is suspended relative to the middle bezel backplane 37 through the hard fixation structure 45 and an elastic structure 47. The hard fixation structure 45 is configured to fix the rear shell 39; and the elastic structure 47 is designed in an interference manner corresponding to the position where the hard fixation structure 45 is located, and is configured to apply a pressure facing away from the middle bezel backplane 37 to the rear shell 39.

Specifically, the hard fixation structure is, for example, a screw, and the elastic structure 47 may be a damping sleeve as shown in FIG. 73. The rear shell 39 is fixed to the middle bezel backplane 37 by adding the damping sleeve on the screw, and the damping sleeve is made of silica gel. When the screw is locked, the damping sleeve is in an interference state to support the rear shell 39 to be suspended relative to the middle bezel backplane 37, thus effectively preventing the rigid contact between the rear shell 39 and the middle bezel backplane 37. Alternatively, the spring shown in FIG. 68, the foam shown in FIG. 75 and the like may be used to perform the function similar to the damping sleeve, and reduce the transmission of vibration between the rear shell 39 and the backplane. In addition, with reference to FIGS. 73-75, the suspension solution may lead to a certain gap between the backplane and the rear shell 39, which conflicts with the safety requirements of the display apparatus. For example, a coin may be inserted into the gap, resulting in a short circuit of an internal circuit. In view of this, in some embodiments of the disclosure, a layer of decoration member 77 is arranged on the bezel of the display apparatus. The decoration member 77 and the bezel may be integrally formed or the decoration member may be bonded to the bezel by an adhesive. The decoration member 77 is higher than the plane of the middle bezel backplane 37 in an opposite direction of the screen, and also higher than the gap between the rear shell 39 and the backplane, thus ensuring compliance with safety requirements and the aesthetic appearance of the complete machine.

Figure 76:
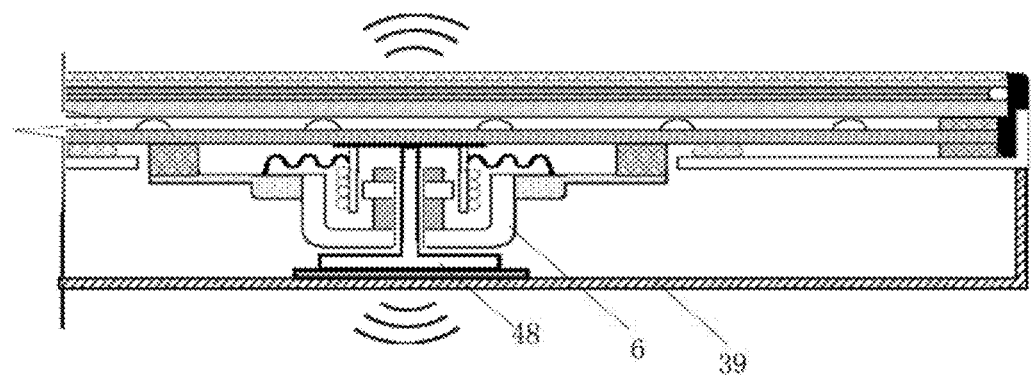
FIG. 76 is yet another schematic structural diagram of a section of a display apparatus according to some embodiments of the disclosure.

In some embodiments, FIG. 76 is yet another schematic structural diagram of a section of a display apparatus according to some embodiments of the disclosure. As shown in FIG. 76, the sound-emitting exciter 6 includes a vibration transmission structure 48. The vibration transmission structure 48 is configured to excite the rear shell 39 to vibrate. Specifically, the sound-emitting exciter 6 vibrates forwards and backwards when working. The vibration transmission structure 48 is fixed to the rear shell 39 and configured to excite the rear shell 39 to vibrate, vibration energy of the sound-emitting exciter 6 is transmitted to the rear shell 39, and the rear shell 39 vibrates to generate sound waves. Since low-frequency sound emitting has no directivity, low-frequency sound and the forward sound of the display apparatus may be superimposed and enhanced, thus improving an intensity of the low-frequency sound.

Figure 77:
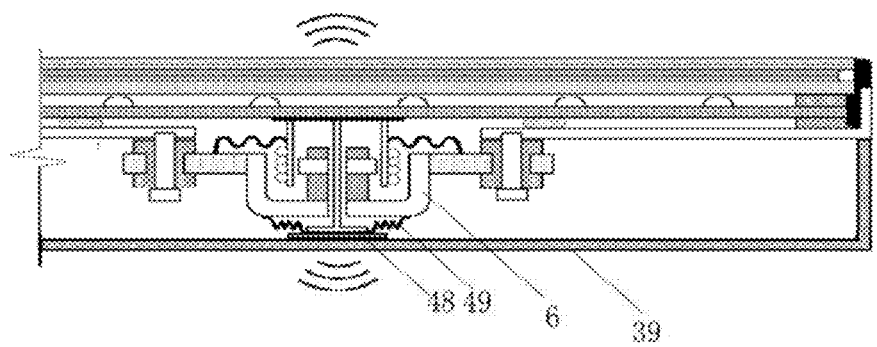
FIG. 77 is yet another schematic structural diagram of a section of a display apparatus according to some embodiments of the disclosure.

In some embodiments, FIG. 77 is yet another schematic structural diagram of a section of a display apparatus according to some embodiments of the disclosure. As shown in FIG. 77, the vibration transmission structure 48 is correspondingly provided with a vibration stabilization structure 49. The vibration stabilization structure 49 is configured to balance reaction force applied to the vibration transmission structure 48 by the rear shell 39, to make the vibration transmission structure 48 vibrate along the central axis of the sound-emitting exciter 6.

Figure 78:
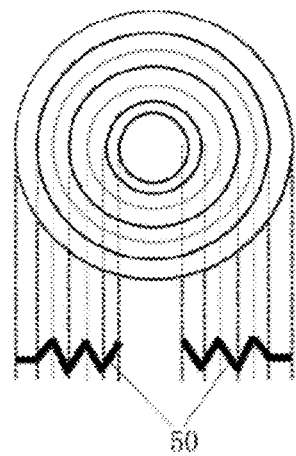
FIG. 78 is a schematic structural diagram of a top view of a vibration stabilization structure according to some embodiments of the disclosure.

In some embodiments, FIG. 78 is a schematic structural diagram of a top view of a vibration stabilization structure according to some embodiments of the disclosure. With reference to FIGS. 77 and 78, the vibration stabilization structure 49 includes a plurality of first spring structures 50. The plurality of first spring structures 50 form a corrugated concentric structure. One end of the first spring structure 50 is fixed to the vibration transmission structure 48, and the other end of the first spring structure 50 is fixed to the sound-emitting exciter 6.

Specifically, when the vibration transmission structure 48 vibrates up and down, the reaction force of the rear shell 39 exerted to the sound-emitting exciter 6 is uneven, resulting in that the vibration transmission structure 48 cannot vibrate up and down vertically, and produce vibration noise due to an assembly deviation of the rear shell 39, an assembly deviation of the sound-emitting exciter 6, and the uneven stress after cooperation of the rear shell 39 with the sound-emitting exciter 6. In some embodiments of the disclosure, the vibration stabilization structure 49 is arranged between the vibration transmission structure 48 and a magnetic circuit of the sound-emitting exciter 6. For example, the vibration stabilization structure 49 may have a corrugated concentric structure as shown in FIG. 78, such as a spider, including a plurality of spring structures arranged in rings. The vibration stabilization structure 49 may be made from rubber, plastic and fiber materials that can be hot-pressed or injection molded. A center of the vibration stabilization structure 49 overlaps a center of the vibration transmission structure 48; and an extension of the vibration stabilization structure 49 is mounted to the magnetic circuit of the sound-emitting exciter 6, or is mounted to other positions of the sound-emitting exciter 6 other than the magnetic circuit. It is guaranteed ultimately that the vibration transmission structure 48 is located at the central axis of the sound-emitting exciter 6 through the vibration stabilization structure 49, thus preventing the vibration transmission structure from colliding with the sound-emitting exciter 6 when vibrating up and down. The vibration stabilization structure 49 adopts the corrugated concentric structure, that is, including the plurality of spring structures arranged in rings.

Figure 79:
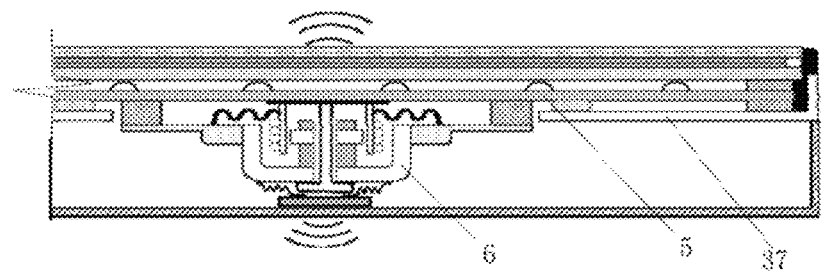
FIG. 79 is yet another schematic structural diagram of a section of a display apparatus according to some embodiments of the disclosure.

The vibration stabilization structure 49 may be arranged in an asymmetric structure. Since the sound-emitting exciter 6 is not mounted in a center of the display apparatus, reaction force exerted to two sides or upper and lower sides of the sound-emitting exciter 6 by the rear shell 39 varies, and the vibration transmission structure 48 is prone to oblique vibration due to asymmetric force accordingly. Thus, the vibration stabilization structure 49 is designed asymmetrically to compensate for the reaction force of the rear shell 39, to counteract the reaction force of the rear shell 39 to the vibration transmission structure 48 and ensure the vertical downward vibration of the vibration transmission structure 48. The asymmetric design of the vibration stabilization structure 49 may be implemented from a ripple width difference, a material thickness difference, a material hardness difference, etc. In addition, as shown in FIG. 79, the sound-emitting exciter 6 may also be directly bonded to the sound-emitting board 5 without being directly bonded on the middle bezel backplane 37. Thus, the case that the vibration of the sound-emitting exciter 6 is transmitted to the middle bezel backplane 37, resulting in abnormal vibration of the middle bezel backplane 37 and sound-emitting resonance of the circuit board mounted on the middle bezel backplane 37 is avoided.

Figure 80:
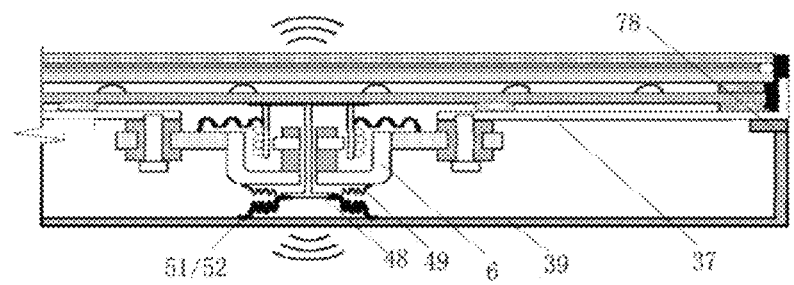
FIG. 80 is yet another schematic structural diagram of a section of a display apparatus according to some embodiments of the disclosure.

In some embodiments, FIG. 80 is yet another schematic structural diagram of a section of a display apparatus according to some embodiments of the disclosure. As shown in FIG. 80, the vibration transmission structure 48 is correspondingly provided with a high-frequency filtration structure 51. The high-frequency filtration structure 51 is configured to filter high-frequency vibration transmitted from the vibration transmission structure 48 to the rear shell 39.

Specifically, the vibration transmission structure 48 of the sound-emitting exciter 6 transmits vibration in the full frequency band to the rear shell 39, the rear shell 39 is caused easily to generate abnormal vibration and noise in the middle and high frequency bands. The high-frequency sound waves have strong directivity, and are likely to have a phase difference with sound waves emitted forwards, resulting in disorder of a sound field. In view of this, in some embodiments of the disclosure, the high-frequency filtration structure 51 is added between the sound-emitting exciter 6 and the rear shell 39, such that the high-frequency vibration of the sound-emitting exciter 6 cannot be transmitted to the rear shell 39. In addition, a buffer member 78 is arranged between the rear shell 39 and the middle bezel backplane 37. Thus, the high-frequency vibration of the middle bezel backplane 37 is prevented from being transmitted to the rear shell 39, the influence of the low-frequency vibration of the rear shell 39 on the middle bezel backplane 37 is avoided, and the case that the resonance of the middle bezel backplane 37 is generated and causes abnormal vibration of devices such as a circuit board arranged on the middle bezel backplane 37 is avoided.

Figure 81:
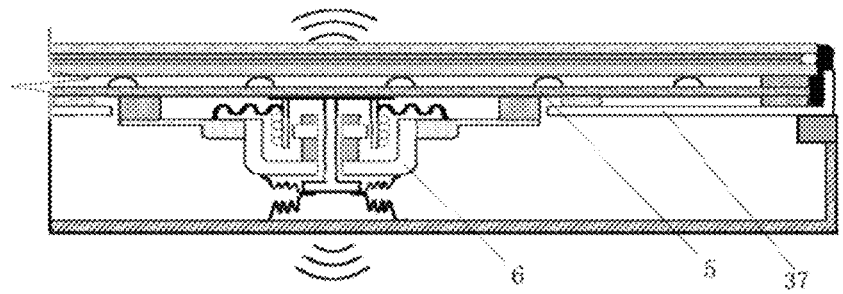
FIG. 81 is yet another schematic structural diagram of a section of a display apparatus according to some embodiments of the disclosure.

Illustratively, as shown in FIG. 80, the high-frequency filtration structure 51 includes a plurality of second spring structures 52. One end of the second spring structure 52 is fixed to the vibration transmission structure 48, and the other end of the second spring structure 52 is fixed to the rear shell 39. Specifically, the high-frequency filtration structure 51 may adopt, for example, a single or a plurality of corrugated designs and have certain elasticity, such as the second spring structure 52. When high-frequency and small-amplitude vibration passes through the high-frequency filtration structure 51, the small-amplitude vibration energy is absorbed by the high-frequency filtration structure 51 and is not transmitted to the rear shell 39. When low-frequency and large-amplitude vibration occurs, the vibration amplitude is greater than a vibration absorption degree of the low-frequency filtration structure, such that low-frequency vibration may be transmitted to the rear shell 39 to generate a low-frequency response. In addition, as shown in FIG. 81, the sound-emitting exciter 6 may also be directly bonded to the sound-emitting board 5 without being directly mounted on the middle bezel backplane 37. Thus, the case that the vibration of the sound-emitting exciter 6 is transmitted to the middle bezel backplane 37, resulting in abnormal vibration of the middle bezel backplane 37 and sound-emitting resonance of the circuit board mounted on the middle bezel backplane 37 is avoided. Alternatively, as shown in FIG. 81, the sound-emitting exciter 6 may be fixed to the middle bezel backplane 37, such that the sound can be transmitted to the base of the display apparatus, and then to a furniture on which the display apparatus is placed, enhancing the sound.

Figure 82:
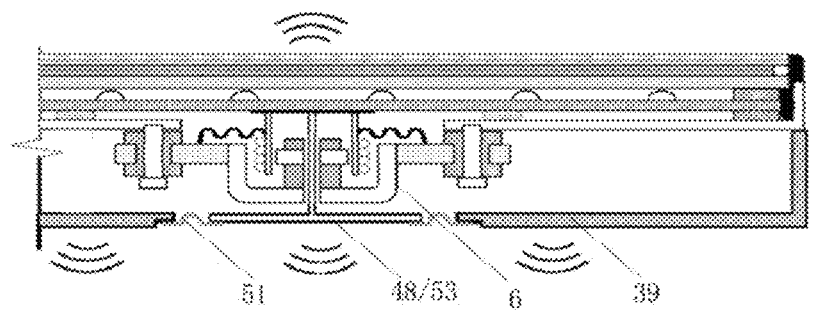
FIG. 82 is yet another schematic structural diagram of a section of a display apparatus according to some embodiments of the disclosure.

In some embodiments, FIG. 82 is yet another schematic structural diagram of a section of a display apparatus according to some embodiments of the disclosure. As shown in FIG. 82, the rear shell 39 is provided with a first via hole 53 corresponding to a position of the sound-emitting exciter 6, and a part of the vibration transmission structure 48 is located in the first via hole 53. The high-frequency filtration structure 51 is a mechanical compliance structure, and the vibration transmission structure 48 is fixed to the rear shell 39 at an edge of the first via hole 53 through the mechanical compliance structure. Specifically, the high-frequency filtration structure 51 may be made from flexible rubber or other materials that can provide mechanical compliance. Similarly, when the high-frequency and small-amplitude vibration passes through the high-frequency filtration structure 51, the small-amplitude vibration energy is absorbed by the high-frequency filtration structure 51 and is not transmitted to the rear shell 39. When the low-frequency and large-amplitude vibration occurs, the vibration amplitude is greater than the vibration absorption degree of the low-frequency filtration structure, such that the low-frequency vibration may be transmitted to the rear shell 39 to generate the low-frequency response. In addition, a part of the vibration transmission structure 48 is located in the first via hole 53, thus reducing influence of the high-frequency filtration structure 51 on a thickness of the complete machine. In addition, the high-frequency filtration structure 51 and the vibration transmission structure 48 form a diaphragm-like structure and are exposed at the position of the rear shell 39, which may be used as an audio visualization feature.

Figure 83:
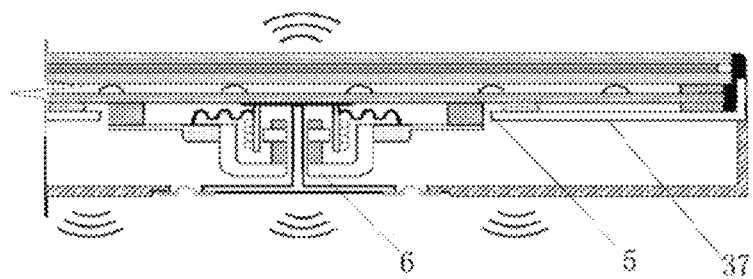
FIG. 83 is yet another schematic structural diagram of a section of a display apparatus according to some embodiments of the disclosure.

Illustratively, the high-frequency filtration structure 51 may also be arranged as a structure as shown in FIG. 78. In this case, the high-frequency filtration structure 51 also has a function similar to a function of the vibration stabilization structure 49. That is, based on asymmetric reaction force exerted to the sound-emitting exciter 6 by the rear shell 39, the high-frequency filtration structure 51 may be designed as an asymmetric support and offset the asymmetric reaction force of the rear shell 39, to ensure the vertical downward movement of the vibration transmission structure 48. The asymmetry may be achieved by setting different R-ring sizes, different materials and different hardnesses. In addition, as shown in FIG. 83, the sound-emitting exciter 6 may also be directly bonded to the sound-emitting board 5 without being directly mounted on the middle bezel backplane 37. Thus, the case that the vibration of the sound-emitting exciter 6 is transmitted to the middle bezel backplane 37, resulting in abnormal vibration of the middle bezel backplane 37 and sound-emitting resonance of the circuit board mounted on the middle bezel backplane 37 is avoided.

Figure 84:
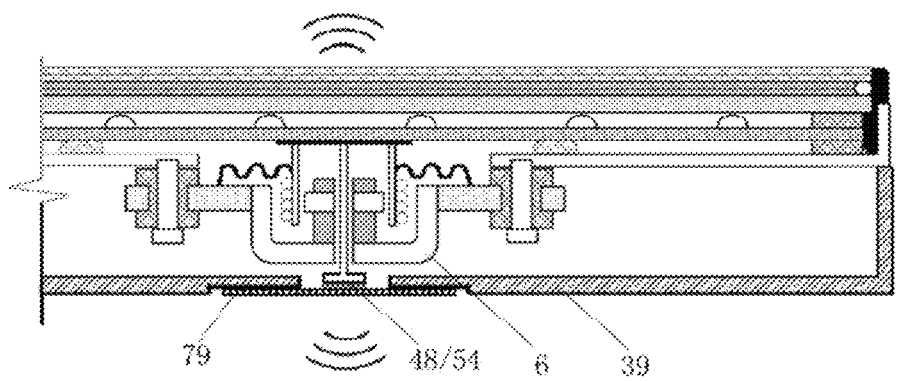
FIG. 84 is yet another schematic structural diagram of a section of a display apparatus according to some embodiments of the disclosure.

In some embodiments, FIG. 84 is yet another schematic structural diagram of a section of a display apparatus according to some embodiments of the disclosure. As shown in FIG. 84, the rear shell 39 is provided with a second via hole 54 corresponding to a position of the sound-emitting exciter 6. The vibration transmission structure 48 sinks into the second via hole 54, and the vibration transmission structure 48 is fixed to the rear shell 39 at the edge of the second via hole 54 through an auxiliary fixation plate 79.

Figure 85:
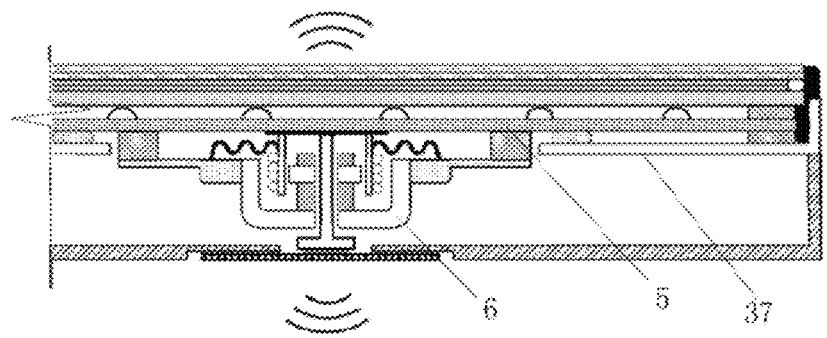
FIG. 85 is still another schematic structural diagram of a section of a display apparatus according to some embodiments of the disclosure.

Specifically, adding the vibration transmission structure 48 of the sound-emitting exciter 6 may occupy a thickness of a complete machine of the display apparatus, resulting in an increase in the thickness of the complete machine. In some embodiments of the disclosure, the rear shell 39 is provided with a hole, the vibration transmission structure 48 sinks into a hole region of the rear shell 39, and the vibration transmission structure 48 and the rear shell 39 are fixed into a whole through the auxiliary fixation plate 79. In addition, as shown in FIG. 85, the sound-emitting exciter 6 may also be directly bonded to the sound-emitting board 5 without being directly mounted on the middle bezel backplane 37. Thus, the case that the vibration of the sound-emitting exciter 6 is transmitted to the middle bezel backplane 37, resulting in abnormal vibration of the middle bezel backplane 37 and sound-emitting resonance of the circuit board mounted on the middle bezel backplane 37 is avoided.

Figure 86:
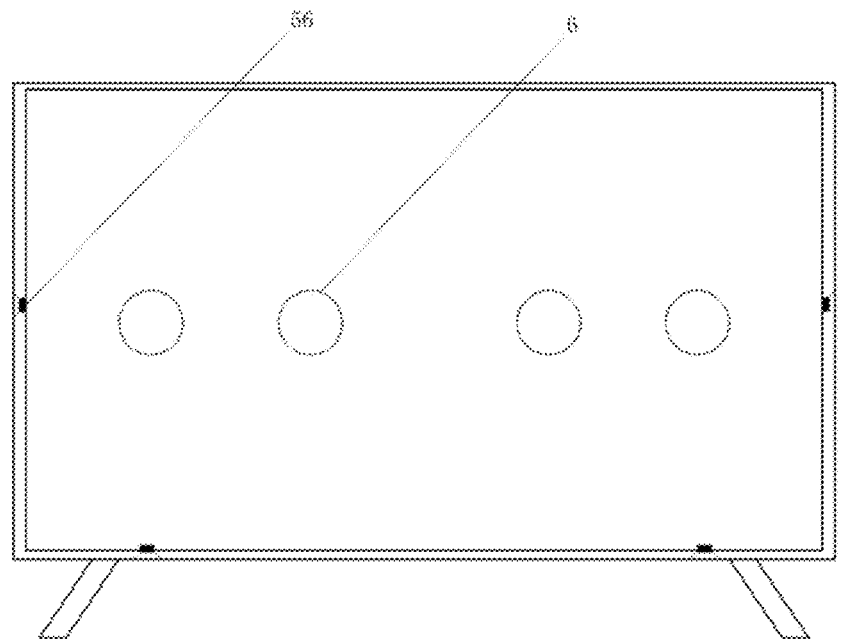
FIG. 86 is still another schematic structural diagram of a front view of a display apparatus according to some embodiments of the disclosure.
Figure 87:
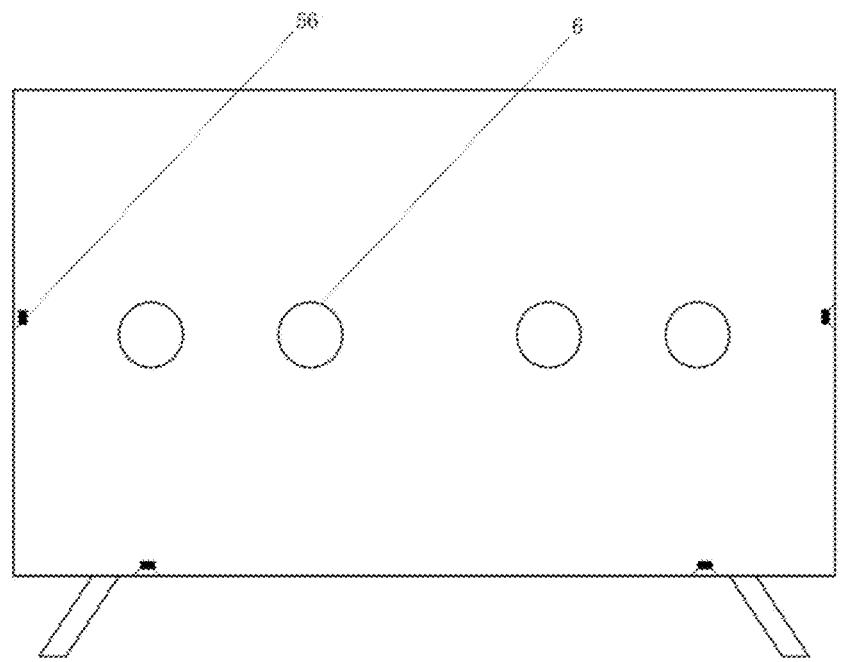
FIG. 87 is a schematic structural diagram of a back view of a display apparatus according to some embodiments of the disclosure.

In some embodiments, FIG. 86 is still another schematic structural diagram of a front view of a display apparatus according to some embodiments of the disclosure. FIG. 87 is a schematic structural diagram of a back view of a display apparatus according to some embodiments of the disclosure. With reference to FIGS. 86 and 87, a plurality of high-frequency speakers 56 are arranged on the bezel of the display apparatus, and the high-frequency speakers 56 are symmetrically distributed relative to the central axis of the display apparatus.

Specifically, due to different spaces between the backlight module and the screen caused by light mixing distances of different models, some differences in the sound-emitting effects on the screens are caused. The larger the space is, the worse the high-frequency effect is. For example, an upper limit of the vibration frequency of the screen is 1.5 kHz for the model with the light mixing distance of 6 mm. In order to achieve the sound effect of the full frequency band, other technical solutions or sound-emitting devices need to be adopted to make up for the lack of the high frequency. In some embodiments of the disclosure, a high-pitched effect of the display apparatus is effectively improved by adding a high-frequency speaker 56 (that is, a tweeter unit) emitting sound upwards at a top, or adding a high-frequency speaker 56 emitting sound downwards at a bottom, or arranging several high-frequency speakers 56 emitting sound leftwards or rightwards on a left side and a right side respectively. The high-frequency speakers 56 are arranged symmetrically along the central vertical axis of the display apparatus, thus further optimizing the sound-emitting effect of the display apparatus.

Figure 88:
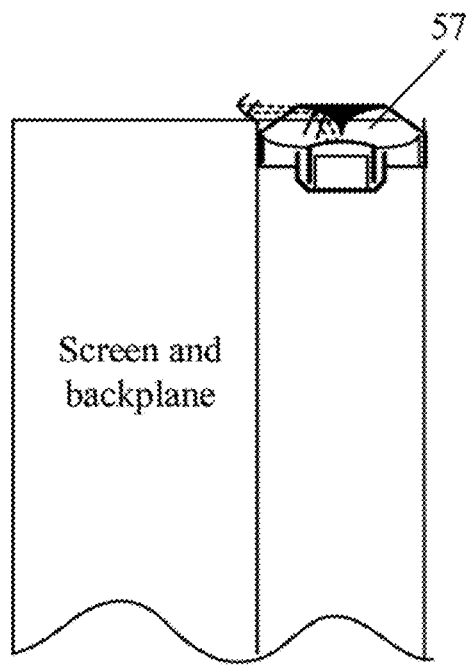
FIG. 88 is a schematic structural diagram of a phase plug according to some embodiments of the disclosure.

In some embodiments, a sound output surface of the high-frequency speaker 56 is provided with a phase plug. FIG. 88 is a schematic structural diagram of a phase plug according to some embodiments of the disclosure. As shown in FIG. 88, the phase plug 57 is configured to make the high-frequency speaker 56 emit sound in a direction, facing away from the rear shell 39, of the display apparatus, that is, emitting sound towards the left side in FIG. 88.

Figure 89:
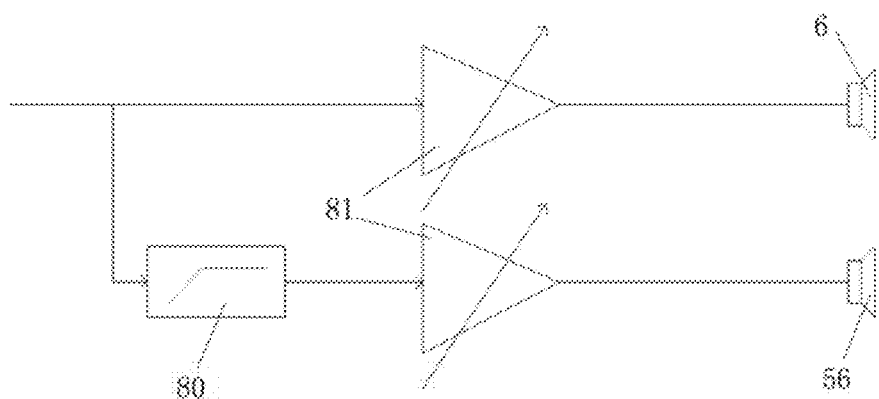
FIG. 89 is a schematic structural diagram of a drive circuit in a display apparatus according to some embodiments of the disclosure.

FIG. 89 is a schematic structural diagram of a drive circuit in a display apparatus according to some embodiments of the disclosure. As shown in FIG. 89, a full-band signal is configured to drive the screen sound-emitting exciter 6, and a signal passing through a high-pass filter is sent to the high-frequency speaker 56. Although the high frequency can be made up in this way, there is still a problem. Since a sound-emitting frequency of the screen is 2 kHz or below, a sound signal less than 5 kHz may obviously affect positioning sense, and a directivity axis of an upward speaker in FIGS. 86 and 87 is in a vertical direction, resulting in that a sound image is virtual and cannot concentrate. A downward speaker, a leftward speaker and a rightward speaker all have a similar problem.

In order to solve this problem, in some embodiments of the disclosure, the sound output surface of the high-frequency speaker 56 is provided with the phase plug 57. The phase plug 57 is configured to make the high-frequency speaker 56 emit sound in the direction, facing away from the rear shell 39, of the display apparatus, that is, emitting sound towards the front of the display apparatus. Specifically, the phase plug 57 is a tweeter unit with extended directivity. This tweeter unit is different from an ordinary tweeter unit in that the phase plug 57 is added on the sound output surface of the speaker. As shown in FIG. 88, when sound waves hit the phase plug 57, the sound waves are reflected in another direction due to a cambered surface of the phase plug 57. By reasonably designing an angle and a shape of the phase plug 57 and a radian relation with the diaphragm, the sound waves that originally emit sound upwards may be turned to emit sound forwards. In order to radiate sound from the forward sound-emitting speaker on the complete machine, the phase plug 57 needs to protrude outside the top of the display apparatus. In FIG. 89, 80 denotes a high-pass filter and 81 denotes an amplifier.

Figure 90:
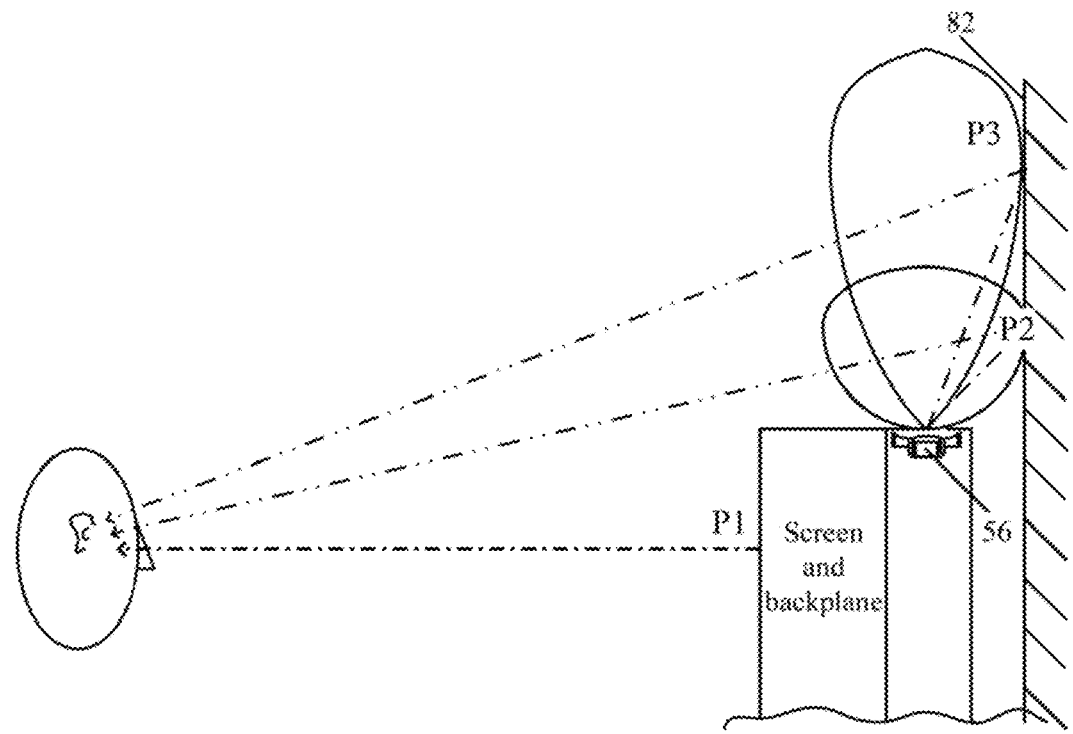
FIG. 90 is a schematic diagram of an application scenario of a display apparatus according to some embodiments of the disclosure.

FIG. 90 is a schematic diagram of an application scenario of a display apparatus according to some embodiments of the disclosure. As shown in FIG. 90, with the high-frequency speaker 56 that emits sound upwards as an example, there are certain differences in the directivity of sound with different frequencies. It is assumed that a position for sound emitting on the screen is indicated by P1, and the high-frequency speaker 56 is responsible for the sound above 2 kHz. It is assumed that the sound directivity of 4 kHz is as indicated by a dotted line in FIG. 90, an emission position on a wall surface is indicated by P2; and the directivity of 6 kHz is more pointed, and an emission position on a wall surface 82 is indicated by P3. The sound that was supposed to be emitted from a high-frequency speaker 56 is emitted from the front of the screen and from a high-pitched side, and there are multi-point sound reflection regions with different frequencies and different positions. A distance from each position, that is, the sound source points P1, P2 and P3, to human ears is different. P1 is direct, that is, from the surface of the screen directly to the human ears; a distance for 4 kHz is from the top high-frequency speaker 56 to a P2 point and then to the human ears; and a distance for 6 kHz is from the high-frequency speaker 56 to a P3 point and then to the human ears. There are different time delays for sound with different frequencies, such that a sound image heard seems to be at the P3 point when high-frequency sound is played, a sound image heard seems to be at the P2 point when medium-frequency sound is played, and a sound image heard seems to be at the P1 point when low-frequency sound is played. However, when a signal with high, medium and low frequencies emits sound, there are a plurality of sound sources, and a feeling that all sound is emitted from the screen cannot be provided, which is quite different from sound emitting of an OLED and a laser television.

Figure 91:
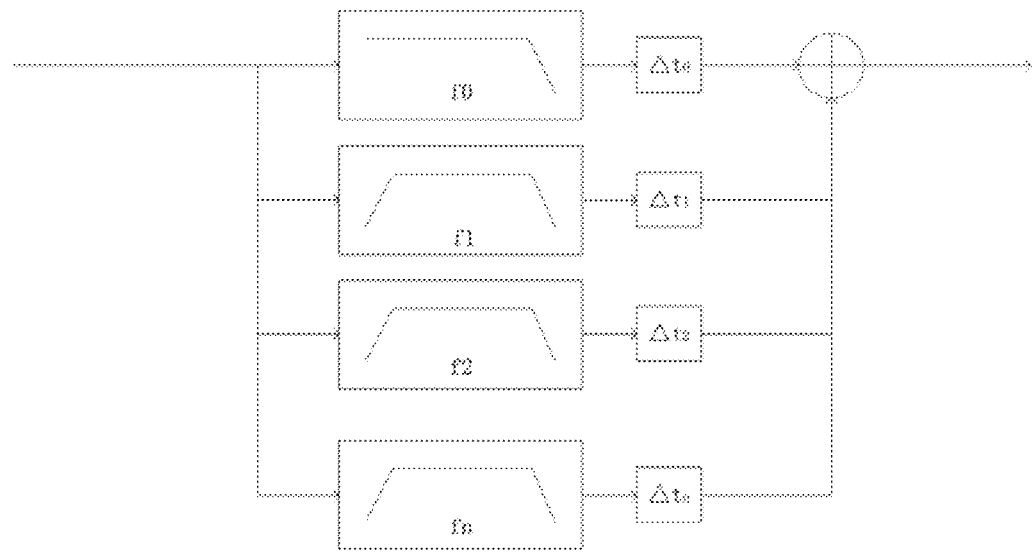
FIG. 91 is a schematic diagram of a processing procedure of a frequency division delay algorithm according to some embodiments of the disclosure.

In some embodiments of the disclosure, a new algorithm is provided. FIG. 91 is a schematic diagram of a processing procedure of a frequency division delay algorithm according to some embodiments of the disclosure. As shown in FIG. 91, the full sound band is divided into N bands, and each band is given a different delay, such that time for the sound at each frequency band to reach the human ears may be adjusted. A point on the screen, such as a quarter of a horizontal center line, may be set as a virtual sound image point. Then paths for the sound at different frequencies to reach the human ears may be computed with such a point as a start point, and then the delay of each frequency band may be computed. In this way, the sound heard by the human ears seems to be emitted from the virtual sound image point, which is applied to cases of upward and downward sound emitting as well as leftward and rightward sound emitting. And f0 corresponds to the low frequency band, and corresponds to a frequency band of sound emitting on the screen; f1, f2, . . . , fn indicate high frequency bands; and all added up to correspond to a working frequency band of the tweeter speaker. Taking a farthest P1 point as a reference, the sound delays of the frequency bands corresponding to the P2 point and the P3 point reaching human ears are tested; and sound delays are denoted as t0, t1 and t2 respectively. If the frequency bands are n+1 bands, it is necessary to compute a delay tn corresponding to a frequency band fn. Since the higher the frequency is, the farther a distance between a sound reflection position and the display apparatus is, and the prolonger the delay is. After the delay of each frequency band is finally tested, a maximum delay is denoted as tmax, and it is concluded that $\Delta tn=tmax-tn$.

Figure 92:
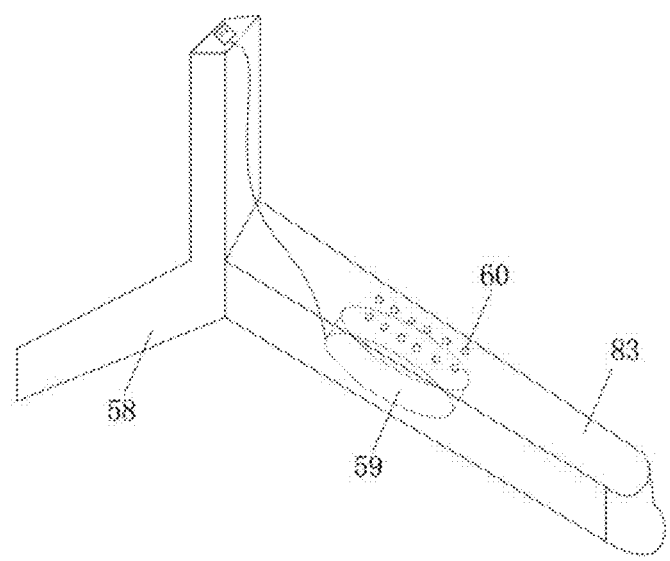
FIG. 92 is a schematic diagram of a three-dimensional structure of a base according to some embodiments of the disclosure.

In some embodiments, the display apparatus further includes a base. FIG. 92 is a schematic diagram of a three-dimensional structure of a base according to some embodiments of the disclosure. As shown in FIG. 92, the base 58 includes an inclined portion 83 facing a direction, facing away from the rear shell 39, of the display apparatus. A sound-emitting structure 59 is arranged inside the inclined portion 83, and a plurality of sound output holes 60 are provided on a surface, corresponding to the sound-emitting structure 59, of the inclined portion 83.

Specifically, since the requirement for frontward sound output has been reduced from a full-band speaker to a high-frequency speaker 56, a sound-emitting structure 59, such as a tweeter speaker may be used in the base 58. A plurality of sound output holes 60 are provided on the surface of the base 58, and a tweeter speaker is placed inside. The tweeter speaker is electrically connected to an interface between the base 58 and the display apparatus through wires, and may be electrically connected to the display apparatus through a socket. If an ultra-thin base 58 is used, a ceramic speaker may be arranged on the surface of the base 58, or the base 58 may be made into a hollowed structure and the ceramic speaker is embedded in the base 58, such that a thickness of the base 58 is uniform in appearance. In addition, after a middle of the base 58 is hollowed out, and a structure of embedding a thin metal sheet may be adopted. When the base 58 is mounted in the display apparatus, a vibration unit arranged inside the display apparatus may drive the thin metal sheet embedded in the base 58 to vibrate and emit sound, to achieve the effect that an internal driver drives an external device to emit sound, and then implement the sound effect of forward sound emitting.

Figure 93:
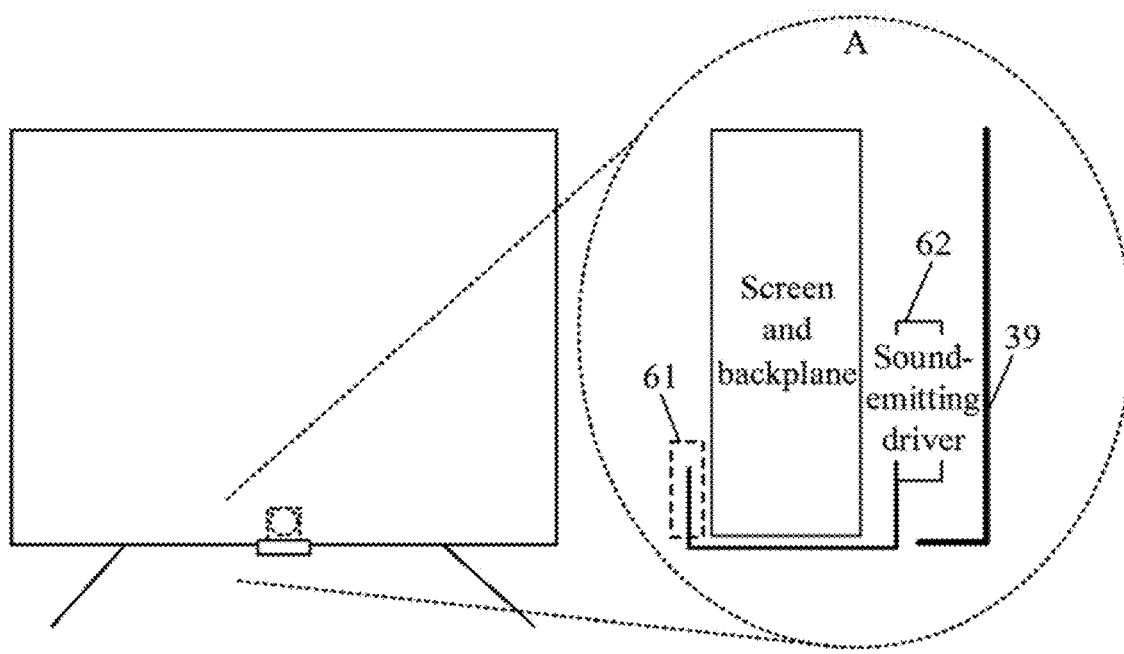
FIG. 93 is a schematic structural diagram of a perspective view of a display apparatus according to some embodiments of the disclosure.

In some embodiments, FIG. 93 is a schematic structural diagram of a perspective view of a display apparatus according to some embodiments of the disclosure. As shown in FIG. 93, A indicates a partially enlarged region, and the display apparatus further includes a metal sheet decoration member 61. The metal sheet decoration member 61 is located at a side, far away from the rear shell 39, of the display apparatus. A sound-emitting driver 62 is arranged in the rear shell 39, and the sound-emitting driver 62 is connected to the metal sheet decoration member 61 through a bottom space of the display apparatus and configured to drive the metal sheet decoration member 61 to emit sound.

Specifically, the decoration member at the bottom of the display apparatus, such as a region where a brand Logo is located, may be made into a thin metal sheet to form the metal sheet decoration member 61. The decoration member extends to the front of the display apparatus through a hollowed-out portion of the rear shell 39 at the bottom of the display apparatus. The metal sheet decoration member 61 is driven to emit sound by the sound-emitting driver 62, such as an electromagnetic driver, a ceramic vibrating plate and a magnetostrictive driver, placed in the rear shell 39 of the display apparatus. Thus, internal drive of the machine is transmitted to the front of an external device to emit sound. The sound-emitting plate may be made of other materials such as plastic, and metal and plastic through double-shot molding. The shape of the metal sheet needs to be designed reasonably according to frequency features, such as a shape with a smaller middle and two larger sides, to facilitate the formation of resonance with the same frequency at two sides of a U-shaped metal sheet.

It can be concluded from the technical solution described above that according to some embodiments of the disclosure, the sound-emitting board and the two sealed air cavities with internally viscous air are utilized, such that the sound-emitting exciter can transmit vibration to the liquid crystal display panel through the sound-emitting board, the backlight module, the second sealed air cavity and the first sealed air cavity successively, and the liquid crystal display panel vibrates and sounds accordingly. Since the vibration output terminal of the sound-emitting exciter is fixed to the surface, far away from the backlight module, of the sound-emitting board, an arrangement of the sound-emitting exciter has no influence on display on the display apparatus, so that sound emitting of a screen of a traditional liquid crystal display apparatus is made probable, the user is provided with audio-visual experience of sound-image synchronization that sound is emitted from an image, and an industrial bottleneck problem that sound emitting of the liquid crystal display screen is difficult to implement is overcome.

It should be noted that whether the display apparatus is a flexible display apparatus is not limited in some embodiments of the disclosure, and some embodiments of the disclosure may be applied to, for example, curved screens. In addition, reference can be made to the embodiments of the disclosure for the same and similar parts, and the relevant contents are not repeated herein. In addition, some embodiments of the disclosure do not enumerate all possible combination manners, and any combination of technical features in the embodiments of the disclosure should also fall within the protection scope of the disclosure. The feature combination manners include, but are not limited to: a combination of the liquid crystal display panel 1 and the Mini-LED; a combination of the sound-emitting exciter 6 and the Mini-LED; a combination of the sound-emitting exciter 6, the Mini-LED and the elastic support member 17; a combination of the sound-emitting exciter 6, the sound-emitting board 5 and the backlight board 30; a combination of the sound-emitting exciter 6, the sound-emitting board 5 and the light bar; a combination of the sound-emitting exciter 6, the sound-emitting board 5, the backlight board 30 and the elastic support member 17; and combinations of the tweeter speaker and woofer speaker into different embodiments, etc.

In specific implementations, the disclosure further provides a computer storage medium. The computer storage medium may store programs, and when executed, the programs may implement some or all steps in each embodiment of the method provided by the disclosure. The storage medium may be a magnetic disk, an optical disk, a read-merely memory (ROM) or a random access memory (RAM), etc.

For the convenience of explanation, the above description has been made in conjunction with specific implementations. However, the above illustrative discussion is not intended to be exhaustive or to limit the implementation to the specific forms disclosed above. Various modifications and variations can be made based on the above teachings. The above implementations have been chosen and described for better explaining principles and practical applications, such that those skilled in the art can make better use of the implementations and various modified implementations suitable for specific use.

What is claimed is:

1. A display apparatus, comprising:
a liquid crystal display panel and a backlight module; wherein a first sealed air cavity is formed in the liquid crystal display panel, and the backlight module is located at a side of the liquid crystal display panel and forms a second sealed air cavity with the liquid crystal display panel; and
a sound-emitting board and a sound-emitting exciter; wherein the sound-emitting board is fixed to a surface, far away from the liquid crystal display panel, of the backlight module; a vibration output terminal of the sound-emitting exciter is fixed to a surface, far away from the backlight module, of the sound-emitting board; and the sound-emitting exciter is configured to excite, through the vibration output terminal, the sound-emitting board to vibrate to drive the backlight module to vibrate.

2. The display apparatus according to claim 1, wherein the sound-emitting board is fixed to the backlight module through a first adhesive buffer structure, and the vibration output terminal is fixed to the sound-emitting board through a second adhesive buffer structure.

3. The display apparatus according to claim 1, wherein the liquid crystal display panel comprises a liquid crystal film layer and an optical diffusion film layer, a first annular sealing structure is arranged at a position that is between the liquid crystal film layer and the optical diffusion film layer and corresponds to a bezel of the liquid crystal display panel, and the liquid crystal film layer and the optical diffusion film layer form the first sealed air cavity through the first annular sealing structure; and
a second annular sealing structure is arranged at a position that is between the backlight module and the liquid crystal display panel and corresponds to the bezel of the liquid crystal display panel, and the backlight module and the liquid crystal display panel form the second sealed air cavity through the second annular sealing structure.

4. The display apparatus according to claim 3, wherein the first annular sealing structure comprises a plurality of low-frequency airflow channels; and
the low-frequency airflow channel is configured for communication of the first sealed air cavity with an external environment where the display apparatus is located.

5. The display apparatus according to claim 4, wherein along a plane parallel to the liquid crystal display panel, the first annular sealing structure comprises a plurality of rows of channel forming structures arranged in a first direction;
one row of the channel forming structures comprise a plurality of barrier structures spaced by a set distance; and
barrier structures in different rows of the channel forming structures are staggered;
wherein the first direction is perpendicular to an extension direction of the bezel of the liquid crystal display panel.

6. The display apparatus according to claim 1, wherein the backlight module is a mini light-emitting diode (Mini-LED) backlight module.

7. The display apparatus according to claim 1, further comprising: a plurality of elastic support members; wherein
the elastic support member is arranged between the backlight module and the liquid crystal display panel in an interference manner;
a side, adjacent to the liquid crystal display panel, of the backlight module comprises a plurality of light-emitting structures; and
the elastic support member is located between the plurality of light-emitting structures.

8. The display apparatus according to claim 7, wherein the elastic support member is fixed to the backlight module through a first adhesive structure; or,
a side, adjacent to the backlight module, of the elastic support member is provided with a welding structure, and the elastic support member is welded and fixed to the backlight module through the welding structure; or,
two ends of the elastic support member are provided with sucker structures, and the elastic support member is fixed to the backlight module and the liquid crystal display panel through the sucker structures at the two ends respectively; or,
one end of the elastic support member is fixed to the backlight module through a first adhesive structure, the other end of the elastic support member is provided with a sucker structure, and the elastic support member is fixed to the liquid crystal display panel through the sucker structure.

9. The display apparatus according to claim 1, further comprising: a plurality of elastic support members; wherein
the elastic support member is arranged between the sound-emitting board and the liquid crystal display panel in an interference manner;
a side, adjacent to the liquid crystal display panel, of the backlight module comprises a plurality of light-emitting structures; and
the elastic support member is located between the plurality of light-emitting structures.

10. The display apparatus according to claim 9, wherein the side, adjacent to the liquid crystal display panel, of the backlight module is provided with a fixation plate, the fixation plate is provided with a plurality of clamping holes, the backlight module is provided with a plurality of through mounting holes, and the clamping hole is configured to fix the elastic support member into the through mounting hole and onto the sound-emitting board; or,
the backlight module comprises a plurality of countersink holes, and the countersink hole is configured to fix the elastic support member onto the sound-emitting board.

11. The display apparatus according to claim 1, further comprising: a middle bezel backplane and a rear shell; wherein
the middle bezel backplane is located at a side, far away from the backlight module, of the sound-emitting board; a plurality of filling structures are arranged in the second sealed air cavity; a side, adjacent to the liquid crystal display panel, of the sound-emitting board comprises a plurality of light-emitting structures; and the filling structure is arranged on the sound-emitting board and between the plurality of light-emitting structures;
at least a part of the rear shell is located at a side, far away from the sound-emitting board, of the middle bezel backplane and at a side, far away from the sound-emitting board, of the sound-emitting exciter; and a separation wall is arranged between the middle bezel backplane and the rear shell; and
a backward radiation superposition cavity is formed among the separation wall, the rear shell and the middle bezel backplane; and the backward radiation superposition cavity is provided with a sound output opening facing a front or a lateral side of the display apparatus.

12. The display apparatus according to claim 11, wherein the backlight module comprises a plurality of light bars; the light-emitting structure is arranged on a surface, far away from the sound-emitting board, of the light bar; and the filling structure is arranged on the sound-emitting board and between adjacent light bars; or, the backlight module comprises a backlight board; the light-emitting structure is arranged on a surface, far away from the sound-emitting board, of the backlight board; and the filling structure is arranged on the backlight board.

13. The display apparatus according to claim 11, further comprising: a connection portion; wherein the connection portion is located on the sound-emitting board, the connection portion and the plurality of filling structures are integrally formed, and the connection portion is provided with a plurality of accommodation cavities;

the backlight module comprises a plurality of light bars; and the light-emitting structure is arranged on a surface, far away from the sound-emitting board, of the light bar; and the light bar is located in the accommodation cavity; and the accommodation cavity is a via hole penetrating the connection portion, and the light bar is arranged in contact with the sound-emitting board; or, the accommodation cavity is a recess provided on a surface of a side, adjacent to the display panel, of the connection portion, and the light bar is arranged in contact with the connection portion.

14. The display apparatus according to claim 11, wherein the filling structure serves as an elastic support member, and is arranged between the backlight module and the display panel in an interference manner.

15. The display apparatus according to claim 11, wherein an area of a cross section, parallel to the liquid crystal display panel, of the filling structure decreases in a direction away from the sound-emitting board; and/or, a surface of the filling structure is clad in a reflective film layer or coated with a reflecting material.

16. The display apparatus according to claim 11, wherein at least one sound-emitting exciter is arranged in the backward radiation superposition cavity.

17. The display apparatus according to claim 11, wherein the backward radiation superposition cavity is provided with a forward sound output opening facing the front of the display apparatus;

the rear shell is arranged to cover a bezel of the liquid crystal display panel; and a gap between the rear shell and the bezel of the liquid crystal display panel forms the forward sound output opening.

18. The display apparatus according to claim 11, wherein the backward radiation superposition cavity is provided with a lateral sound output opening facing the lateral side of the display apparatus;

the rear shell is located at the side, far away from the sound-emitting plate, of the middle bezel backplane;

a distance from a portion, adjacent to a bezel of the display apparatus, of the rear shell to the middle bezel backplane gradually decreases in a direction from a geometric center of the display apparatus to the bezel of the display apparatus; and a gap between the rear shell and the middle bezel backplane forms the lateral sound output opening at a position of the bezel of the display apparatus.

19. The display apparatus according to claim 11, wherein the separation wall is arranged in a direction perpendicular to the display apparatus;

a surface, perpendicular to the display apparatus, of the separation wall is a flat surface or a cambered surface; and a sound insulation buffer structure is arranged between the separation wall and the middle bezel backplane.

20. The display apparatus according to claim 11, wherein an area of a section, in a direction perpendicular to the display apparatus, of the backward radiation superposition cavity gradually increases in a direction from a geometric center of the display apparatus to the sound output opening.

* * * * *